US006560528B1

(12) United States Patent
Gitlin et al.

(10) Patent No.: US 6,560,528 B1
(45) Date of Patent: May 6, 2003

(54) PROGRAMMABLE INTERNAL COMBUSTION ENGINE CONTROLLER

(75) Inventors: Ronald D. Gitlin, Berthoud, CO (US); Darren O'Conner, Boulder, CO (US); Randy A. Gietzen, Boulder, CO (US)

(73) Assignee: Internal Combustion Technologies, Inc., Longmont, CO (US)

( * ) Notice: Subject to any disclaimer, the term of this patent is extended or adjusted under 35 U.S.C. 154(b) by 0 days.

(21) Appl. No.: 09/534,718

(22) Filed: Mar. 24, 2000

(51) Int. Cl.[7] .......................... G01F 19/00; F02D 41/14

(52) U.S. Cl. ....................... 701/115; 701/102; 701/114; 701/101; 123/480; 123/406.62

(58) Field of Search ................................ 701/102, 101, 701/114, 115; 123/406.18, 406.58, 406.6, 406.61, 406.62, 480, 479

(56) References Cited

U.S. PATENT DOCUMENTS 4,566,069 A * 1/1986 Hirayama et al. .......... 701/115
4,615,321 A * 10/1986 Haefner et al. ............. 123/479
5,490,064 A * 2/1996 Minowa et al. ................ 701/1
5,622,154 A * 4/1997 Worbel ....................... 123/476
5,638,272 A * 6/1997 Minowa et al. ................ 701/1
5,704,336 A * 1/1998 Worbel ....................... 123/494
5,794,165 A * 8/1998 Minowa et al. ................ 701/1
5,975,057 A 11/1999 Repplinger et al.
6,009,370 A * 12/1999 Minowa et al. ............. 701/102
6,016,794 A 1/2000 Hasimoto et al.
6,026,786 A 2/2000 Groff et al.
6,240,340 B1 * 5/2001 Minowa et al. ................ 701/1
6,240,772 B1 * 6/2001 Thomas ..................... 73/117.3

FOREIGN PATENT DOCUMENTS

DE 4210559 A1 * 10/1993 ........... F02D/41/26

* cited by examiner

*Primary Examiner*—John Kwon
*Assistant Examiner*—Hieu T. Vo
(74) *Attorney, Agent, or Firm*—Rick Martin; Patent Law Offices of Rick Martin PC

(57) ABSTRACT

A computerized 2 and 4 cycle internal combustion engine control and optimization/tuning system is disclosed, wherein fuel injector control is optimized to increase horsepower and fuel economy. The system is comprised of an on-board engine controller with communications software allowing technicians to change external sensors via an external computer. The technician may tune engine parameters on the fly as the engine is running. The engine control system displays engine-operating parameters in real time. Fuel mapping can be for the operator's choices of acceleration, maximum speed, gas mileage, altitude of operation and/or engine temperature.

56 Claims, 41 Drawing Sheets

ECM BLOCK DIAGRAM

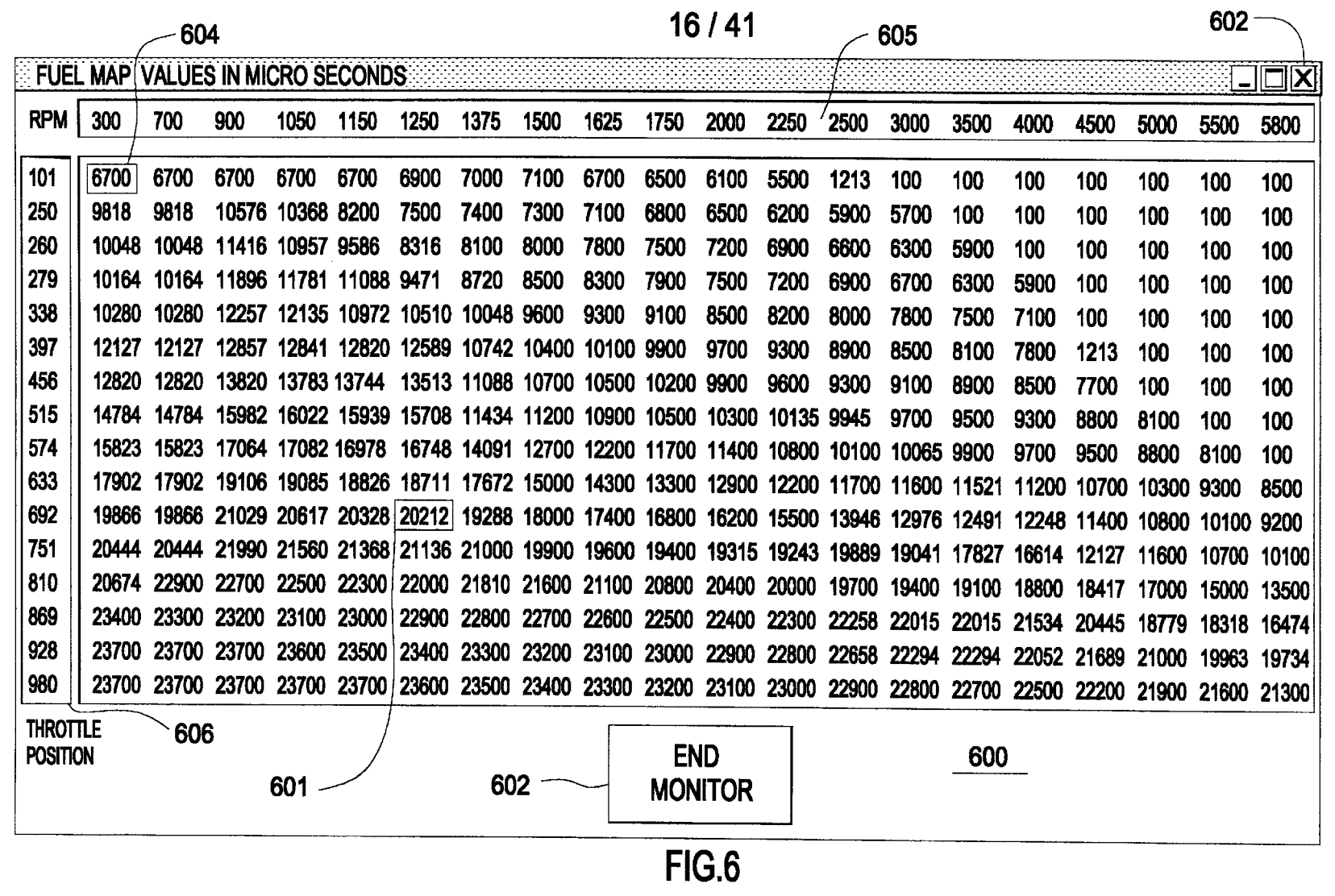

16 / 41

602 604 605

FUEL MAP VALUES IN MICRO SECONDS

| RPM | 300 | 700 | 900 | 1050 | 1150 | 1250 | 1375 | 1500 | 1625 | 1750 | 2000 | 2250 | 2500 | 3000 | 3500 | 4000 | 4500 | 5000 | 5500 | 5800 |
|---|---|---|---|---|---|---|---|---|---|---|---|---|---|---|---|---|---|---|---|---|
| 101 | 6700 | 6700 | 6700 | 6700 | 6700 | 6900 | 7000 | 7100 | 6700 | 6500 | 6100 | 5500 | 1213 | 100 | 100 | 100 | 100 | 100 | 100 | 100 |
| 250 | 9818 | 9818 | 10576 | 10368 | 8200 | 7500 | 7400 | 7300 | 7100 | 6800 | 6500 | 6200 | 5900 | 5700 | 100 | 100 | 100 | 100 | 100 | 100 |
| 260 | 10048 | 10048 | 11416 | 10957 | 9586 | 8316 | 8100 | 8000 | 7800 | 7500 | 7200 | 6900 | 6600 | 6300 | 5900 | 100 | 100 | 100 | 100 | 100 |
| 279 | 10164 | 10164 | 11896 | 11781 | 11088 | 9471 | 8720 | 8500 | 8300 | 7900 | 7500 | 7200 | 6900 | 6700 | 6300 | 5900 | 100 | 100 | 100 | 100 |
| 338 | 10280 | 10280 | 12257 | 12135 | 10972 | 10510 | 10048 | 9600 | 9300 | 9100 | 8500 | 8200 | 8000 | 7800 | 7500 | 7100 | 100 | 100 | 100 | 100 |
| 397 | 12127 | 12127 | 12857 | 12841 | 12820 | 12589 | 10742 | 10400 | 10100 | 9900 | 9700 | 9300 | 8900 | 8500 | 8100 | 7800 | 1213 | 100 | 100 | 100 |
| 456 | 12820 | 12820 | 13820 | 13783 | 13744 | 13513 | 11088 | 10700 | 10500 | 10200 | 9900 | 9600 | 9300 | 9100 | 8900 | 8500 | 7700 | 100 | 100 | 100 |
| 515 | 14784 | 14784 | 15982 | 16022 | 15939 | 15708 | 11434 | 11200 | 10900 | 10500 | 10300 | 10135 | 9945 | 9700 | 9500 | 9300 | 8800 | 8100 | 100 | 100 |
| 574 | 15823 | 15823 | 17064 | 17082 | 16978 | 16748 | 14091 | 12700 | 12200 | 11700 | 11400 | 10800 | 10100 | 10065 | 9900 | 9700 | 9500 | 8800 | 8100 | 100 |
| 633 | 17902 | 17902 | 19106 | 19085 | 18826 | 18711 | 17672 | 15000 | 14300 | 13300 | 12900 | 12200 | 11700 | 11600 | 11521 | 11200 | 10700 | 10300 | 9300 | 8500 |
| 692 | 19866 | 19866 | 21029 | 20617 | 20328 | 20212 | 19288 | 18000 | 17400 | 16800 | 16200 | 15500 | 13946 | 12976 | 12491 | 12248 | 11400 | 10800 | 10100 | 9200 |
| 751 | 20444 | 20444 | 21990 | 21560 | 21368 | 21136 | 21000 | 19900 | 19600 | 19400 | 19315 | 19243 | 19889 | 19041 | 17827 | 16614 | 12127 | 11600 | 10700 | 10100 |
| 810 | 20674 | 22900 | 22700 | 22500 | 22300 | 22000 | 21810 | 21600 | 21100 | 20800 | 20400 | 20000 | 19700 | 19400 | 19100 | 18800 | 18417 | 17000 | 15000 | 13500 |
| 869 | 23400 | 23300 | 23200 | 23100 | 23000 | 22900 | 22800 | 22700 | 22600 | 22500 | 22400 | 22300 | 22258 | 22015 | 22015 | 21534 | 20445 | 18779 | 18318 | 16474 |
| 928 | 23700 | 23700 | 23700 | 23600 | 23500 | 23400 | 23300 | 23200 | 23100 | 23000 | 22900 | 22800 | 22658 | 22294 | 22294 | 22052 | 21689 | 21000 | 19963 | 19734 |
| 980 | 23700 | 23700 | 23700 | 23700 | 23700 | 23600 | 23500 | 23400 | 23300 | 23200 | 23100 | 23000 | 22900 | 22800 | 22700 | 22500 | 22200 | 21900 | 21600 | 21300 |

THROTTLE POSITION 606

601 602

END MONITOR

600

FIG.6

| -REF. | Parameter Name | Parameter Units | Conversion |
|---|---|---|---|
| 1902 | RPS Period | Number of 1.526 μs periods in one revolution of the engine | 60/(RPS * 1.526 μs) |
| 716 | Crankcase Temperature | °C | Converted to °F |
| 713 | Intake Air Temperature | °C | Converted to °F |
| 714 | Head Temperature | °C | Converted to °F |
| 715 | Exhaust Gas Temperature | °C | Converted to °F |
| 712 | ECM Internal Temperature | °C | None |
| 717 | Barometric Pressure | in of Hg | None |
| 718 | RAM Pressure | in of Hg | None |
| 708 | Manifold Air Pressure | in of Hg | None |
| 109 | Throttle Position | % | 100 * (counts - minimum)/(maximum-minimum) |
| 707 | Throttle Position | Counts | None |
| 709 | Injector Pulse Width | Number of 1.526μs periods | Injector Pulse Width * 1.526, displayed in μs |
| 710 | Fuel Map Pulse Width Value | Table lookup index | Row = floor( index / 25)Column = index – floor(index / 25) |
| 705 | Battery Voltage | Volts | None |
| 704 | Engine Run Time | hours/min/sec | None |
| 711 | Cylinder One Firing Angle | Degrees | None |
| 706 | RPM | | The measured revolutions per minute (RPM) of the engine. |

ECM READ PARAMETERS

FIG.19

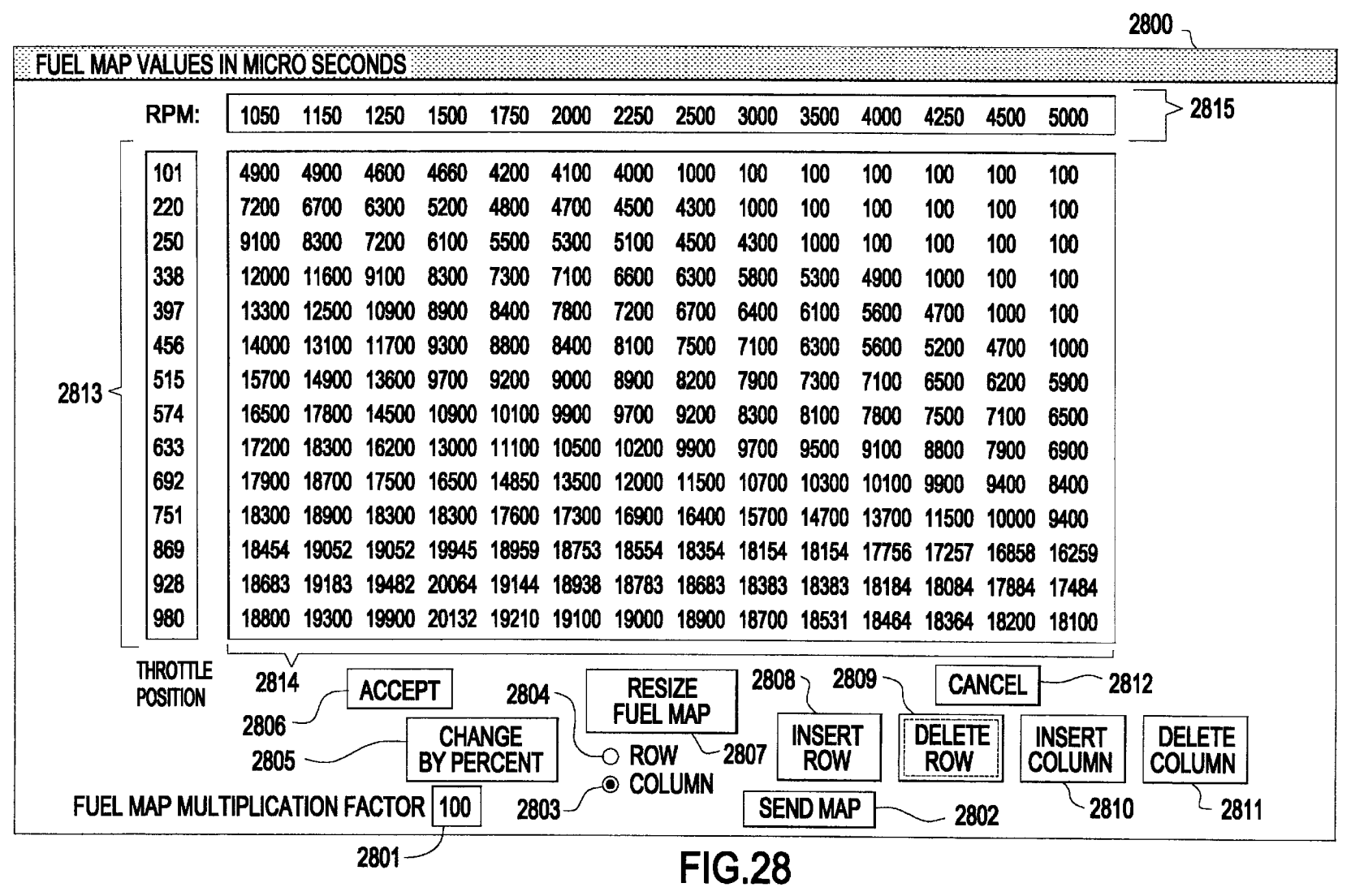

2800

FUEL MAP VALUES IN MICRO SECONDS

| THROTTLE POSITION / RPM: | 1050 | 1150 | 1250 | 1500 | 1750 | 2000 | 2250 | 2500 | 3000 | 3500 | 4000 | 4250 | 4500 | 5000 |
|---|---|---|---|---|---|---|---|---|---|---|---|---|---|---|
| 101 | 4900 | 4900 | 4600 | 4660 | 4200 | 4100 | 4000 | 1000 | 100 | 100 | 100 | 100 | 100 | 100 |
| 220 | 7200 | 6700 | 6300 | 5200 | 4800 | 4700 | 4500 | 4300 | 1000 | 100 | 100 | 100 | 100 | 100 |
| 250 | 9100 | 8300 | 7200 | 6100 | 5500 | 5300 | 5100 | 4500 | 4300 | 1000 | 100 | 100 | 100 | 100 |
| 338 | 12000 | 11600 | 9100 | 8300 | 7300 | 7100 | 6600 | 6300 | 5800 | 5300 | 4900 | 1000 | 100 | 100 |
| 397 | 13300 | 12500 | 10900 | 8900 | 8400 | 7800 | 7200 | 6700 | 6400 | 6100 | 5600 | 4700 | 1000 | 100 |
| 456 | 14000 | 13100 | 11700 | 9300 | 8800 | 8400 | 8100 | 7500 | 7100 | 6300 | 5600 | 5200 | 4700 | 1000 |
| 515 | 15700 | 14900 | 13600 | 9700 | 9200 | 9000 | 8900 | 8200 | 7900 | 7300 | 7100 | 6500 | 6200 | 5900 |
| 574 | 16500 | 17800 | 14500 | 10900 | 10100 | 9900 | 9700 | 9200 | 8300 | 8100 | 7800 | 7500 | 7100 | 6500 |
| 633 | 17200 | 18300 | 16200 | 13000 | 11100 | 10500 | 10200 | 9900 | 9700 | 9500 | 9100 | 8800 | 7900 | 6900 |
| 692 | 17900 | 18700 | 17500 | 16500 | 14850 | 13500 | 12000 | 11500 | 10700 | 10300 | 10100 | 9900 | 9400 | 8400 |
| 751 | 18300 | 18900 | 18300 | 18300 | 17600 | 17300 | 16900 | 16400 | 15700 | 14700 | 13700 | 11500 | 10000 | 9400 |
| 869 | 18454 | 19052 | 19052 | 19945 | 18959 | 18753 | 18554 | 18354 | 18154 | 18154 | 17756 | 17257 | 16858 | 16259 |
| 928 | 18683 | 19183 | 19482 | 20064 | 19144 | 18938 | 18783 | 18683 | 18383 | 18383 | 18184 | 18084 | 17884 | 17484 |
| 980 | 18800 | 19300 | 19900 | 20132 | 19210 | 19100 | 19000 | 18900 | 18700 | 18531 | 18464 | 18364 | 18200 | 18100 |

2815
2813
2814

THROTTLE POSITION

ACCEPT 2806
CHANGE BY PERCENT 2805
2804 ROW
2803 COLUMN
RESIZE FUEL MAP 2807
2808 INSERT ROW
2809 DELETE ROW
CANCEL 2812
INSERT COLUMN 2810
DELETE COLUMN 2811
SEND MAP 2802
FUEL MAP MULTIPLICATION FACTOR 100
2801

FIG.28

PROGRAMMABLE INTERNAL COMBUSTION ENGINE CONTROLLER

COPYRIGHT NOTICE/AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

REFERENCE TO COMPUTER PROGRAM LISTING APPENDIX

This application includes a computer program listing appendix on a single compact disc, the contents of which are herein incorporated by reference. The single compact disc labeled 09-534718 contains 35 files.

FIELD OF THE INVENTION

The present invention relates generally to the field of internal combustion engine control and fuel metering technology and more particularly to methods of attaining optimal engine control.

BACKGROUND OF THE INVENTION

Application of computers to engine control is well understood. In order to operate properly, engines need different amounts of fuel based on their temperature, atmospheric temperature, atmospheric pressure, RPM etc. for a given throttle setting. Application of various sensors is used to meter and regulate fuel flow and air mass to achieve stoicheimetric combustion. The primary purpose is to achieve high fuel average efficiency and minimize combustion byproducts. A comprehensive description of the prior art is found in U.S. Pat. No. 6,016,794 (2000) to Hasimoto et al. incorporated herein by reference.

The present invention herein named the ECM is a computer commanded device that measures engine parameters and calculates how much fuel the engine should receive, then it supplies that amount of fuel by opening fuel injectors for a calculated length of time. These fuel injectors are opened so that the fuel is injected into the intake manifold and hence the engine piston cylinders at the proper time. Once the fuel has been delivered, spark plug firing is executed at user specified angles during each combustion cycle (may not be used in diesel application). The ECM maximizes engine performance by setting the firing angle based on the currently measured RPM value. The ECM is housed in a small box attached to the vehicle. The box contains a computer with its program and many parameters that control how it operates saved in a non-volatile FLASH memory device. The ECM has a connector that attaches to a wiring harness that is wired to the necessary places in the engine where the thermistors, transducers, ignition coils and fuel injectors reside, as well as an RS-232 serial port.

A key feature of the present invention is a communications link from the ECM to a remote computer running custom developed software. This software allows the operator to observe and change all of the operating parameters for the ECM. In this manner, the operation of the ECM can be optimized for the engine it is controlling and can be customized for the particular engine and driver of the vehicle.

Prior art engine control systems fixed sensor calibration, linearization and gross approximation to fuel requirements over various engine speeds. Prior art controls are designed for "good" performance within the variability of various sensor and transducer error, aging of the controller electronics, variation of mechanical and dimensioned surface finishes. In addition the prior art controller must perform over the life of the product which could be 200,000 miles, wherein wear of fuel injector parts, timing chains, and other parts cause a drift away from initial operating parameters. Serious constraints are put on the prior art engine performance. The non-programmable prior art requires the performance to be fixed for "minimal average" to work within sensor and engine variation.

The user may over the life of the engine change components such as injectors, manifold, and engine displacement. The engine with the "stock" controller may run poorly as a result. Without access to alter critical engine parameters the full benefit of installing "high performance" components to prior art controllers is not realized. The instant invention allows the user or technician to optimize all critical parameters over the life of the engine. It also allows the addition or changing of sensors, thermistors, and transducers. Access to real-time engine parameters and historical data not available in the prior art.

SUMMARY OF THE INVENTION

The main aspect of the present invention is to provide a "user programmable" method to tune engine parameters.

Another aspect of the present invention is to provide a method for users to replace or upgrade "stock" or factory installed sensors.

Another aspect of the present invention is to provide a jumper configuration adapter to allow installation on various manufactures motorcycles.

Another aspect of the present invention is to electronically generate a "phantom" or missing tooth.

Another aspect of the present invention is to provide a "user programmable" fuel map table.

Another aspect of the present invention is to provide a "user programmable" automatic mixture enrichment to protect the engine from overheating.

Another aspect of the present invention is to provide a "user programmable" sensor calibration method.

Another aspect of the present invention is to provide a "user programmable" transducer calibration method.

Another aspect of the present invention is to provide an automatically reduced injector current to a hold level approximately 25% speeding closure, giving a more accurate fuel measurement.

Another aspect of the present invention is to apply the technology to 2 or 4 stroke engines.

Another aspect of the present invention is that it is applicable to diesel engines.

Another aspect of the present invention is to provide a downloadable performance history log of 30–60 seconds.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 6 is a graphic for the fuel map monitor.

FIG. 19 is a table of parameters read by ECM.

FIG. 28 is a screen graphic for editing the ECM fuel map.

Before explaining the disclosed embodiment of the present invention in detail, it is to be understood that the invention is not limited in its application to the details of the particular arrangement shown, since the invention is capable of other embodiments. It is to be understood that the invention is not limited to motor bikes or gasoline fueled engines. Also, the terminology used herein is for the purpose of description and not of limitation.

DESCRIPTION OF THE PREFERRED EMBODIMENTS

Certain terms used herein are defined below:

ADC: analog to digital converter

ASCII:

BARO: Barometric Pressure sensor

BAUD: Serial communication data rate in bits per second.

Byte: Digital data word 8 bits in length

Character: a symbol from the ASCII set.

Checksum: An numerical sum of the hexadecimal representation of the characters in a list.

Choking: enrichment of fuel air mixture to assist engine starting at low temperatures.

CPU: Central processing unit.

CT: Crankcase Temperature

ECM: Electronic control module.

EEPROM: electronically erasable programmable read only memory.

EFI: electronic fuel injection.

EGT: Exhaust gas temperature

FLASH Memory: Electrically alterable read only memory. (see EEPROM)

GUI: Graphical user interface.

HT: Head Temperature

Hexadecimal: Base 16 representation of integer numbers.

ICT: Internal Combustion Technology, developer of the engine control, system.

Injector: An electromechanical device used to meter a liquid or gas, in this case liquid fuel.

IAT: Intake Air Temperature

IC: Integrated circuit.

I/O: Input output.

Interrupt: Signal the computer to perform another task.

IR: Infer Red (invisible long wavelength light)

LED: Light emitting diode, solid state light source.

Long word: Digital data word 32 bits in length.

LSW: Least significant word

Mb: Millibar systems international unit of pressure.

MCPWM: Simultaneous multi-channel pulse-width modulation of digital output pins.

MSW: Least significant word

Nonvolatile: retains information after power loss.

OC: Open collector.

PC: Personal computer.

PCB: Printed circuit board

PLL: Phase locked loop.

PSI: Pounds per square inch.

PWM: Pulse width modulation.

RFI: Radio frequency interference.

ROM: read only memory.

RPM: revolutions per minute.

RS-232: Serial communication format standard.

TDC: Top dead center, mechanical center of cylinder #1.

TPS: Throttle Position Sensor

TPU: Time processing unit. A sophisticated set of hardware timers and counters optimized for engine control applications.

Word: Digital data word 16 bits in length

Figure 1:
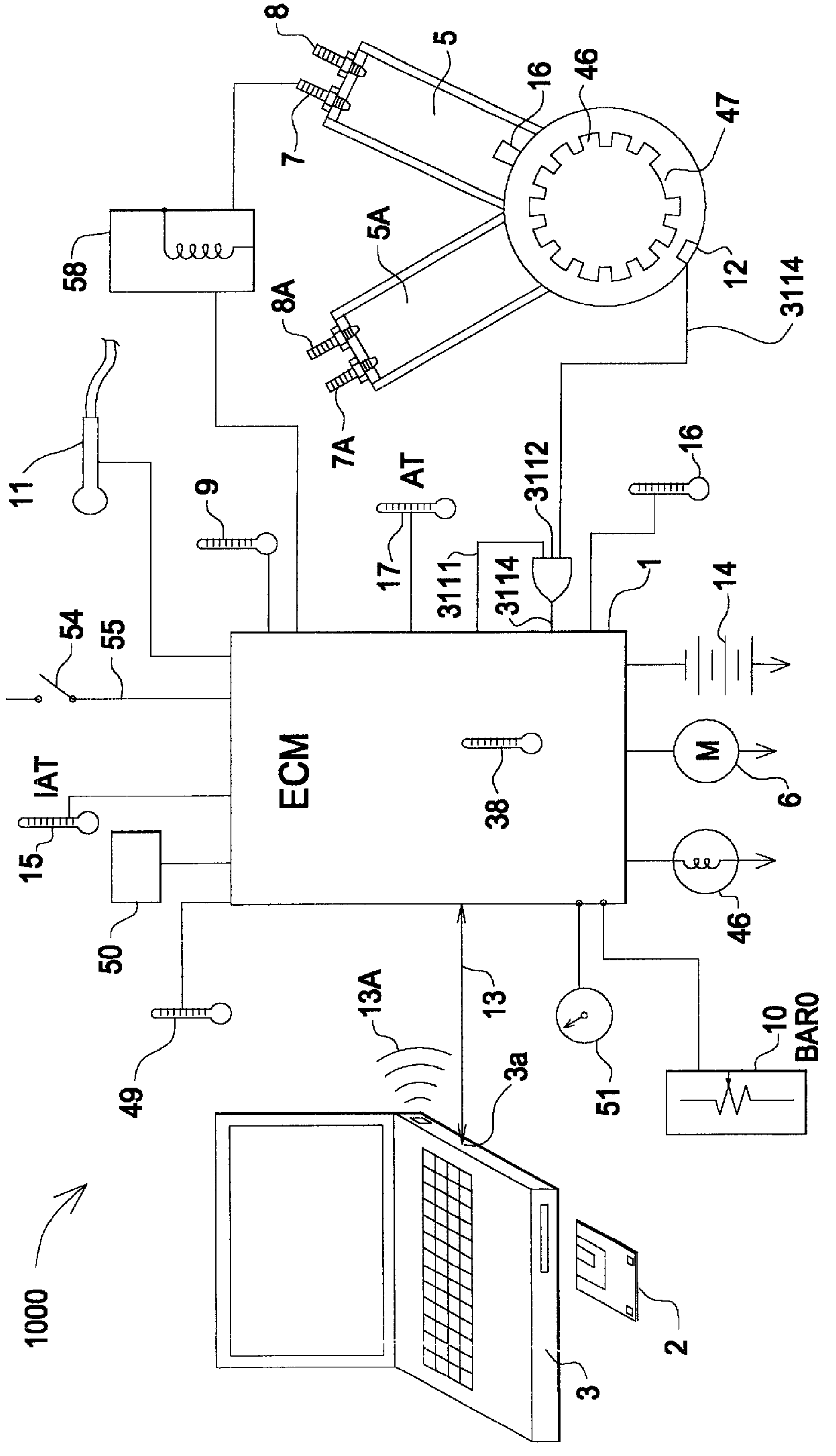
FIG. 1 is a block diagram overview of the engine, controller and terminal.

FIG. 1 is a block overview of the engine control system. Engine controller 1 is at the heart of the EF1 system 1000 and will be discussed in detail in FIGS. 2, 3 and 4. Battery 14 connects to controller 1 providing power to the system. Throttle position sensor 11 provides the engine command input from idle to maximum RPM. Air temperature sensor 15 provides controller 1 outside air temperature used to calculate air density. EGT sensor 9 provides controller 1 with exhaust temperature used to calculate fuel mixture. HT temperature sensor 16 provides controller 1 with engine temperature used to calculate choke levels. Stepper motor 6 drives the throttle valve. Magnetic switch (crankshaft sensor) 12 feeds back engine angle used to determine RPM and timing. Engine 4 is an internal combustion engine. The present preferred embodiment is applied to a two-cylinder four-stroke engine. It is offered by way of example, as this device may be adapted to one or more cylinder four/two stroke engines. Two cylinders 5 and 5A are part of engine assembly 4 and are included for clarity and are not a limitation. Controller 1 inserting fuel into cylinders 5 and 5A respectively controls injectors 8 and 8A. Sparkplugs 7 and 7A are fired by coil(s) 58 providing a high-energy spark to ignite mixture in cylinders 5 and 5A respectively. Note in most diesel applications spark plugs are not used. The present invention will work with diesel engines. The instant invention gives the user a flexible fully programmable IC (Internal Combustion) control system. This system may be adapted to a variety of engine types geometry's. It allows prototyping and characterization of IC engines, a capability previously unavailable in prior art. Software 2 may be encoded on magnetic disc as shown or other media. This media is not identified by way of limitation. Other media such as CDROM or solid-state memory are substantially equivalent and may be used to store software 2. Computer 3 reads the binary/executable software 2 executing the instructions. Computer program listing appendix contains the source listing of the binary code 2. Controller 1 communicates to computer 3 over serial cable 13 to computer RS-232 communications port 3A. This communication method is not identified by way of limitation. Other methods such as IR 13A, and radio links are substantially equivalent and may be used to transfer data.

Figure 1A:
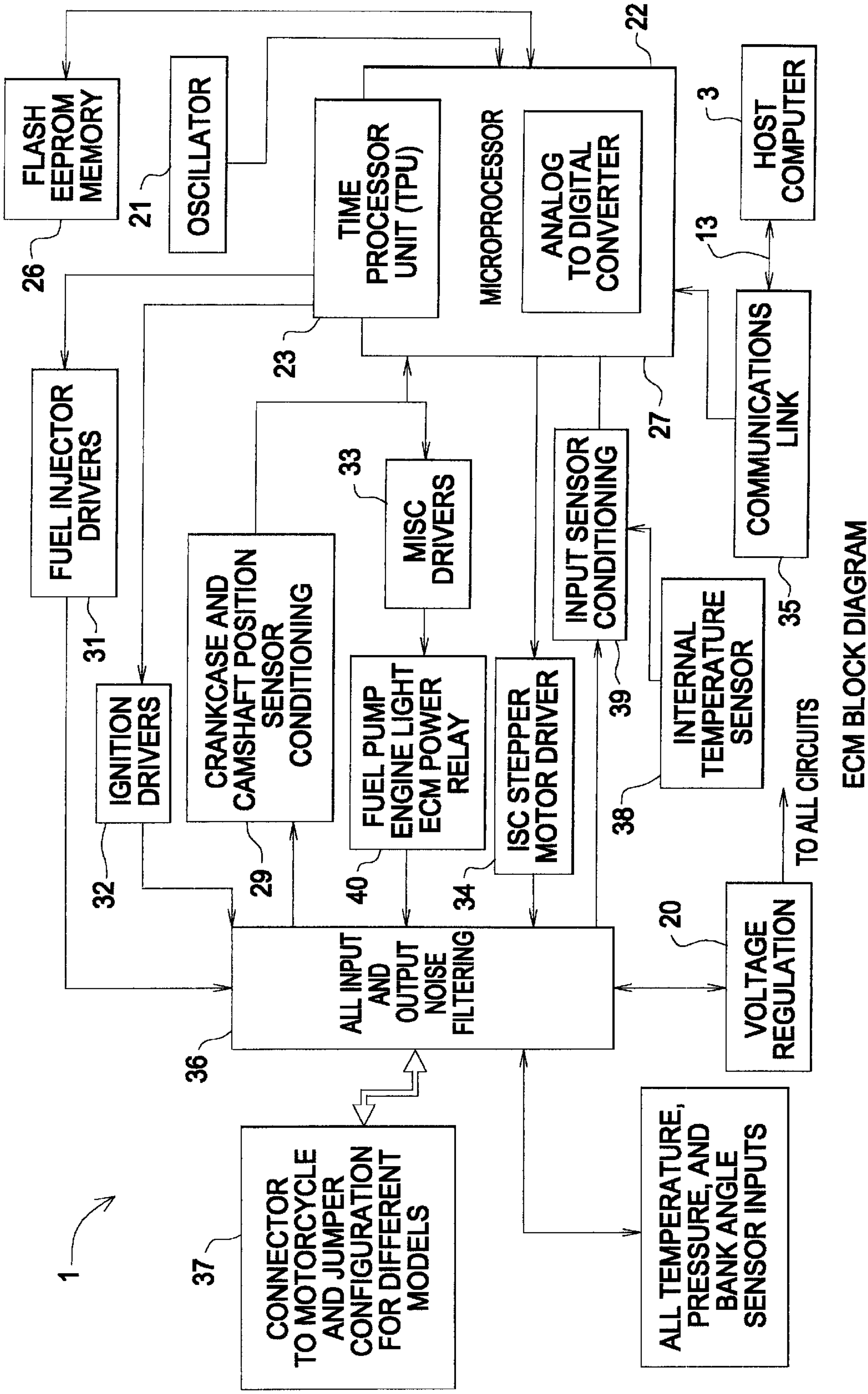
FIG. 1A is a block diagram overview of the engine controller and computer interface.
Figure 2:
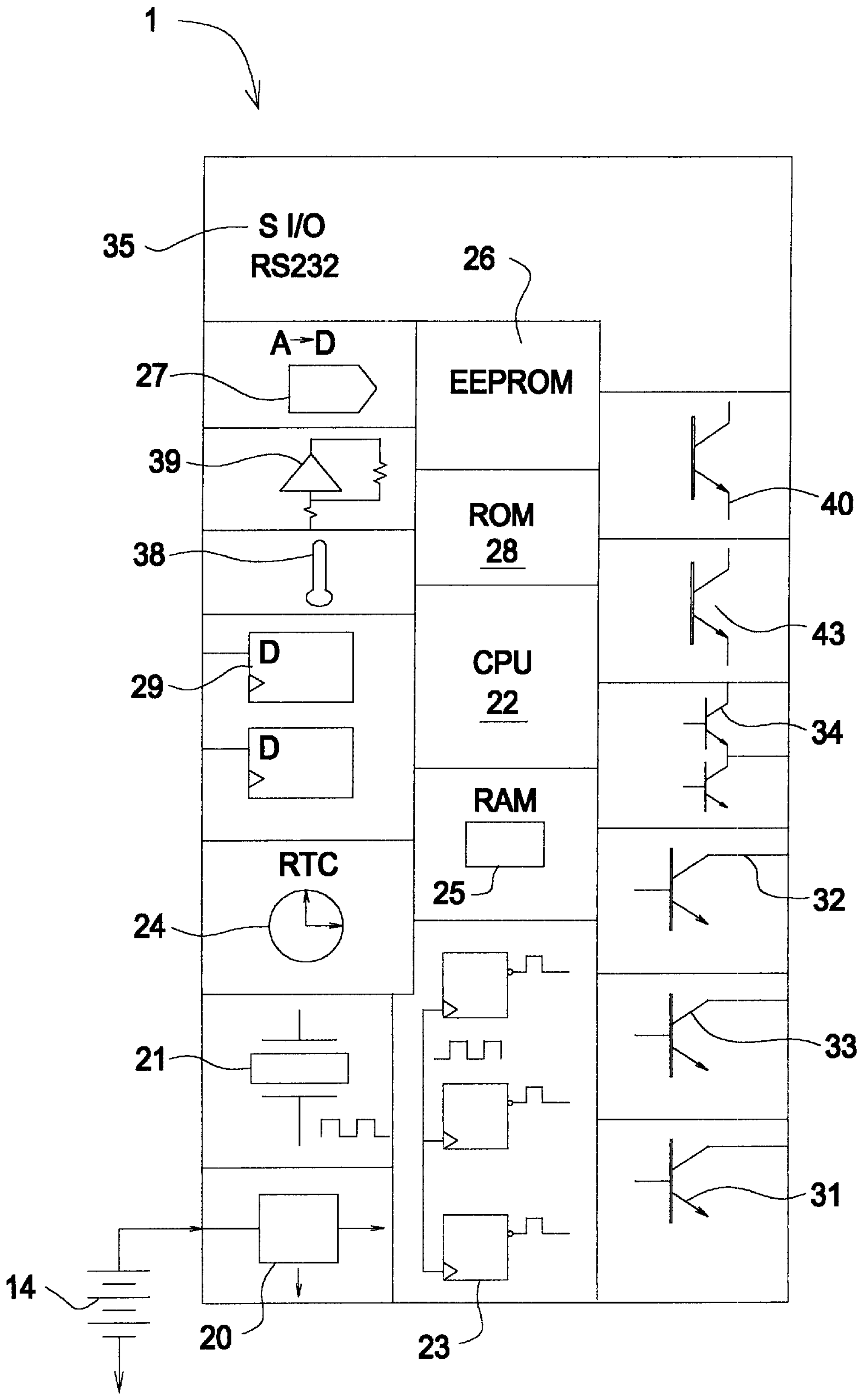
FIG. 2 is a flow chart of the engine control software.
Figure 30:
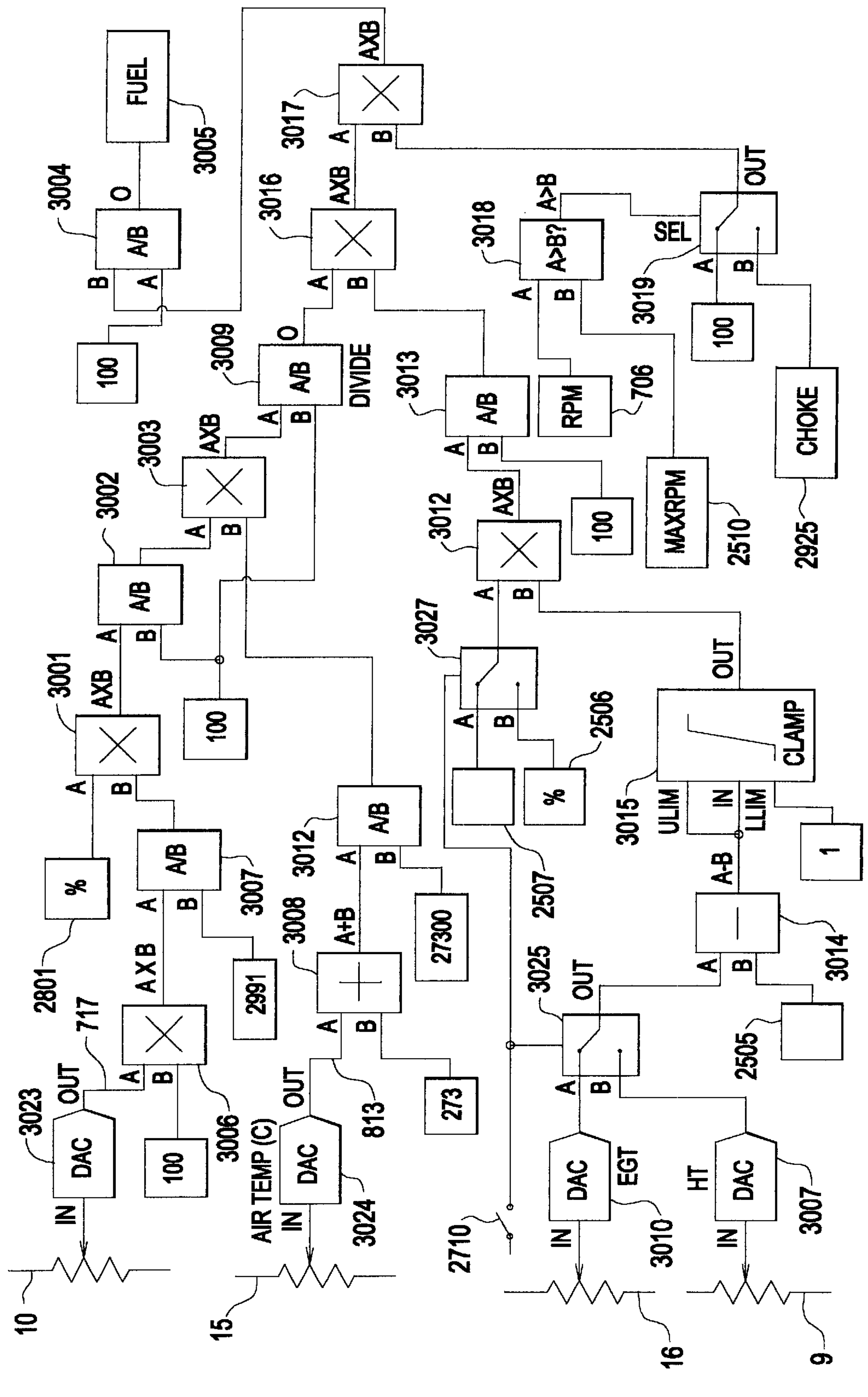
FIG. 30 is a data flow diagram for the fuel algorithm.

FIG. 2 is a schematic block diagram of the engine controller system. Engine controller 1 consists of conventional circuitry including a power supply section 20 to provide regulated power to internal circuitry and noise removal. Internal oscillator 21 provides the high frequency clock to the CPU 22, time base for TPU 23 and real time clock 24. The Master Program is stored for execution in ROM 28, local RAM 25 stores temporary variables generated during operation. EEPROM 26 stores factory and user programmable values used to calibrate sensors and engine operating parameters. Analog to digital converter section 27 buffers and converts external analog sensor data to digital levels to be read by CPU 22. Digital inputs 29 read external digital sensors such as switches and engine rotation sensors. Bi-directional communications port 35 provides external RS-232 serial to external PC 3 (FIG. 1). High current drivers 31 provide direct drive to injector(s) 8 and 8A; ignition coil(s) and fuel pump (not shown). FIG. 1A is a block diagram of the ECM 1. Jumper section 37 contains the main connector to the engine. All signals and power, to and from the ECM 1 pass through this connector. It also contains a series of jumpers to facilitate different types of engines such as Ducati® (Via della Salute, 14/2 Bologna Italy), Moto Guzzi® (S.P.A Via Parodi 57, Mandello Del Lar "Lecco" Italy) in addition to the standard models from Rarley Davidson® (Milwaukee, Wis., USA). For example, if a Harley® has an after market additional sensor for example Exhaust Gas Temperature sensor can be mapped from the wiring harness to the appropriate input on the PCB. Due to the electrically noisy nature of engine environments noise filter 36 conditions all input and output signals. Most of this noise is generated from the spark plugs 7, and 7A (FIG. 1), wiring, and the ignition coils 58. The absence of spark plugs in most diesel engines greatly reduces this source of interference. There are three voltage regulators used in this design, all of them reduce the 12–15 volt battery 14 (FIG. 1) power present on the motorcycle to 5 volts used by the ECM 1. The power supply circuit 20 is further comprised of linear regulator U26; and it delivers 5 volts to various external sensors throttle position sensor 11, and barometric pressure sensor 10. This power supply is referred to as +5Vext. This power is separate from +5Vint to keep external noise from entering the ECM 1 internal power supply and to keep digital noise from the ECM 1 being radiated as RFI. The power supply also has a linear regulator; and it delivers 5-volts to the analog to digital converter 27 (contained in the processor 22) as a reference signal, and other internal analog circuits such as the internal temperature sensor 38. The analog to digital converter 27 may also be implemented as an external device. This power supply is referred to as +5Vref. The ignition drivers 32 are specifically designed to drive the ignition coils on the motorcycle that generate the high voltage for the spark plugs 7 and 7A (FIG. 1). These power supply circuits are self-contained and automatically shutdown in the case of short circuit or thermal overload. The ignition drivers 32 are driven by the microprocessor 22. Four ignition drivers are shown in this embodiment for simplicity. This is offered as an example not as a limitation. Additionally the ignition coil drivers would drive glow plugs in diesel applications. The fuel injector drivers 31 consist of a fuel injector driver IC U19 and a Darlington transistor Q8. The fuel injector driver 31 monitors the current drawn by the fuel injector solenoid 8 and 8A, through a sense resistor. A fuel injector 8 and 8A requires a full amount of current to get to open. After it opens, only 25% (approximately) of the initial current is required to hold it open. After the injector opens, the current to the injector is reduced so that when it is shut down, it will close faster, giving a more accurate fuel measurement. The fuel injector IC LM1949 (National Semiconductor® Santa Clara, Calif. USA) handles this function by monitoring the current, after a set period of time, reduces the current to the injector to the "hold" level. The microcontroller 22 is the heart of the ECM 1, and with the associated firmware handles all of the functions of the ECM. The microprocessor is a Motorola® (Schaumburg, Ill. USA) MC68376 single chip 32-bit microcontroller, with built-in RAM 25, analog to digital converter 27, time processor unit 23, various other timer counter functions, and communication interfaces. This is not offered as a way of limitation as the microcontroller may be implemented with separate function blocks such as RAM to implement the similar functionality. Other CPU embodiments may include the external flash EEPROM 26 in the single chip. The microcontroller controls discrete output signals such as the engine light driver 43, fuel pump relay driver 40, and external power relay not shown. The microcontroller 22 monitors digital inputs such as the bank angle sensor 50, and the on key switch. The time processor unit (TPU) 23 controls the fuel injector drivers 31 and the ignition drivers 32 based on inputs from the crankshaft position sensor 12 (FIG. 1) and the camshaft position sensor 16 (FIG. 1) It also drives the tachometer gauge on some models of motorcycles. The TPU 23 is able to do this without substantial interaction from the microprocessor. The TPU is designed to handle complex engine timing tasks thus freeing up the microprocessor 22 to perform other tasks. In summary the TPU 23 monitors the crankshaft position sensor 12, which detects a "missing tooth" on the crankshaft gear. When the missing tooth is detected, the camshaft position is checked to determine which phase the engine is in (4 stroke engine, the crankshaft rotates twice for every rotation of the camshaft). After being programmed by the microprocessor, all of the output pulses for the fuel injectors and the ignition coils are automatically generated in reference to the missing tooth by the TPU 23. The gear teeth are counted by the TPU 23. The TPU loads an internal compare register with the current tooth duration forcing digital output 3111 high. The digital output is connected to OR gate 3112. The second OR input is connected to crank shaft sensor 12, thus allowing the TPU input 3114 to track the engine position during the missing tooth period. The speed of the engine is measured by the TPU 23 updating the microprocessor. The TPU microprocessor periodically automatically reprograms the TPU pulse counters. Ignition drivers 32 and fuel injector drivers 31 buffer TPU outputs. The calculated counter/injector pulse widths and timing are a function of engine speed, engine temperature, air temperature, barometric pressure, battery voltage and throttle position as detailed in FIG. 30. The Harley® crankshaft gear has two consecutive missing tooth, and the Motorola® microcontroller TPU was designed only to detect a single missing tooth. Microcode and circuitry has been developed in this instant invention to generate an electrical "virtual tooth" signal to insure correct operation of the TPU. This signal 3114 is fed back into the TPU (U14C FIG. 31) to give the illusion only one tooth is missing. The TPU was originally designed to work with only one missing tooth. The Motorola® TPU will not work with two or more missing teeth. Fuel injector drivers consist of a fuel injector driver IC (U19 FIG. 31D) and a Darlington transistor (Q8 FIG. 31D). The fuel injector driver monitors the current drawn by the fuel injector solenoid, through a sense resistor (R30 FIG. 31D). A fuel injector requires a full amount of current to get it to open. After it opens, only 25% (approximately) of the current is required to hold it open. After the injector opens, the current to the injector is automatically reduced so that when it is commanded closed, it will shut faster, giving a more precise fuel measurement. The fuel injector IC handles this function by monitoring the current, and after a set period of time, reduces the current to the injector to a "hold" level.

The microcontroller 22 is the heart of the ECM, and with the associated firmware compiled from source (computer program listing appendix) files "MainECM.c", "MainECM.h, "Global.c", "Global.h", "Ecm.h", "flashld.c", "flasher.c", "Reg-376.h", "Ecm.s", "ECMboot.s", "Flash-as.s", "Reg-376.s" and "EcmBoot.prm", performs all of the functions of the ECM 1. The microprocessor 22 is a Motorola® MC68376, 32-bit, microcontroller, with built-in RAM, analog to digital converter 27, time processor unit (TPU) 23, various other timer counter functions, and communication interfaces 35. This is offered by way of example and should not be considered a limitation as other microcontrollers could be used. The microcontroller controls discrete output signals such as the engine light driver 46 fuel pump relay driver 33, and ECM power relay 40. The microcontroller monitors digital inputs such as the bank angle sensor 50, and the key on powerswitch.

The time processor unit (TPU) 23 controls the fuel injector drivers 31 and the ignition drivers 32, based on inputs from the crankshaft position sensor 12 and the camshaft position sensor 16. It also drives the tachometer gauge on some models of motorcycles. The TPU is able to do this without substantial interaction from the microprocessor. The TPU is designed to handle these specific engine tasks and frees up the microprocessor to perform other tasks. The TPU has a separate microcontroller (231 FIG. 17) that is optimized for monitoring the timer inputs and reloading the counters with minimal intervention from the main microcontroller 22. In summary the TPU 23 monitors the crankshaft position sensor which detects a missing tooth on the crankshaft gear. When the "missing tooth" (47 FIG. 1) is detected, the camshaft position is checked to determine which phase the engine is in (for example in a 4-stroke engine, the crankshaft rotates twice for every rotation of the camshaft). After being programmed by the microprocessor, all of the output pulses for the fuel injectors and the ignition coils are automatically generated by the TPU 23 in reference to the "missing tooth" (47 FIG. 1). The gear teeth (46 FIG. 1) are counted by the TPU 23 to track the engine position while between the missing tooth (47 FIG. 1) The speed (RPM) of the engine is measured by the TPU 23 updating the microprocessor 22. The TPU also generates pulses to drive optional external RPM/tachometer 51 displays used in some models. The microprocessor 231 periodically reprograms the PWM counters (237 FIG. 17) (the fuel injectors and the ignition coils) based on engine speed, engine temperature, air temperature, barometric pressure, battery voltage and throttle position. Unique to Harley® the crankshaft gear has two consecutive missing teeth (47 FIG. 1). Through the sensor configuration 2405 (FIG. 24) the microcontroller 231 knows when to generate the "virtual tooth".

The 10-bit, 16-channel, analog to digital converter (ADC) 27 continuously monitors a variety of analog signals from sensors that may be installed on the motorcycle. Not all sensors are installed on all motorcycles. The sensor configuration table/screen 2704–2711 (FIG. 27) selects which sensors are installed. The sensors include the Throttle Position Sensor (TPS) 11 (FIG. 1), Intake Air Temperature (IAT) 15 (FIG. 1), engine Head Temperature (HT) 17, engine Crankcase Temperature (CT) 16, Barometric Pressure (BARO) 10, Manifold Air Pressure (MAP), Exhaust Gas Temperature (EGT) 9, Battery Voltage (BV) 14 and the temperature internal to the ECM enclosure. These ADC values are automatically stored in memory locations for access by the microprocessor 22 and for display in the various monitoring windows such as 700.

Figure 7:
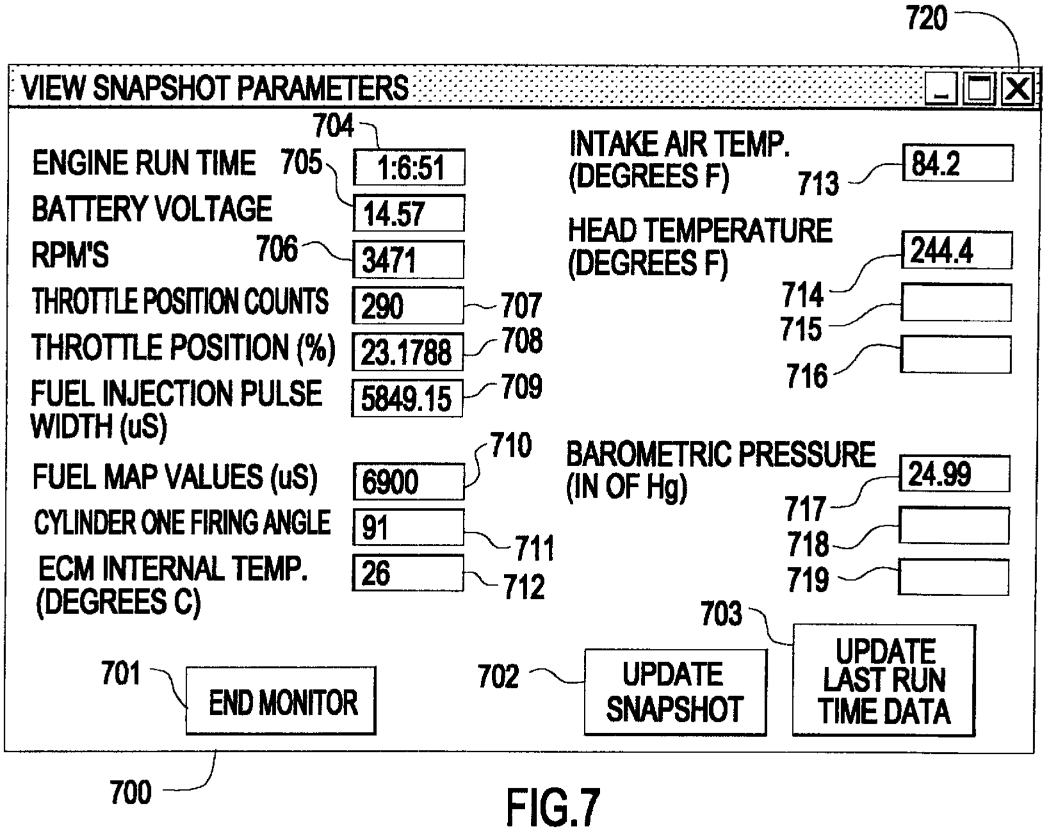
FIG. 7 is a graphic for the engine Snapshot parameters.

The microcontroller contains a serial communications interface 35, which in this embodiment is an RS-232 protocol. Links such as RF or optical are substantially equivalent. The communications link 13 used to communicate with a host computer 1, allowing fuel 2814 (FIG. 28) and sensor selection 2700 (FIG. 27) to be sent to the ECM. The ECM 1 may send diagnostic and real-time data to the host computer 1 for display and storage. The communications interface 35 (FIG. 1) is wired to the diagnostic connector on the ECM. A host computer is rarely connected during normal usage, the communications interface circuitry is also used to detect the connection of a "snapshot" switch 54 (FIG. 1) to the diagnostics port. The snapshot switch 54 (FIG. 1) is a diagnostic tool used to troubleshoot problems with a fuel map 2814 (FIG. 28). Momentarily closing "snapshot" switch 54 (FIG. 1) instructs the microcontroller to save current engine parameters for display in window 700 (FIG. 7).

Additionally the microcontroller contains a serial peripheral interface, which is used to communicate with the Stepper Motor Driver circuit 34 (FIG. 1*b*). This circuit drives the Idle Speed Control stepper motor 6 (FIG. 1*a*) on the engine. Function block 311 (FIG. 3*b*) instructs the Idle Speed motor to the new position.

Figure 3A:
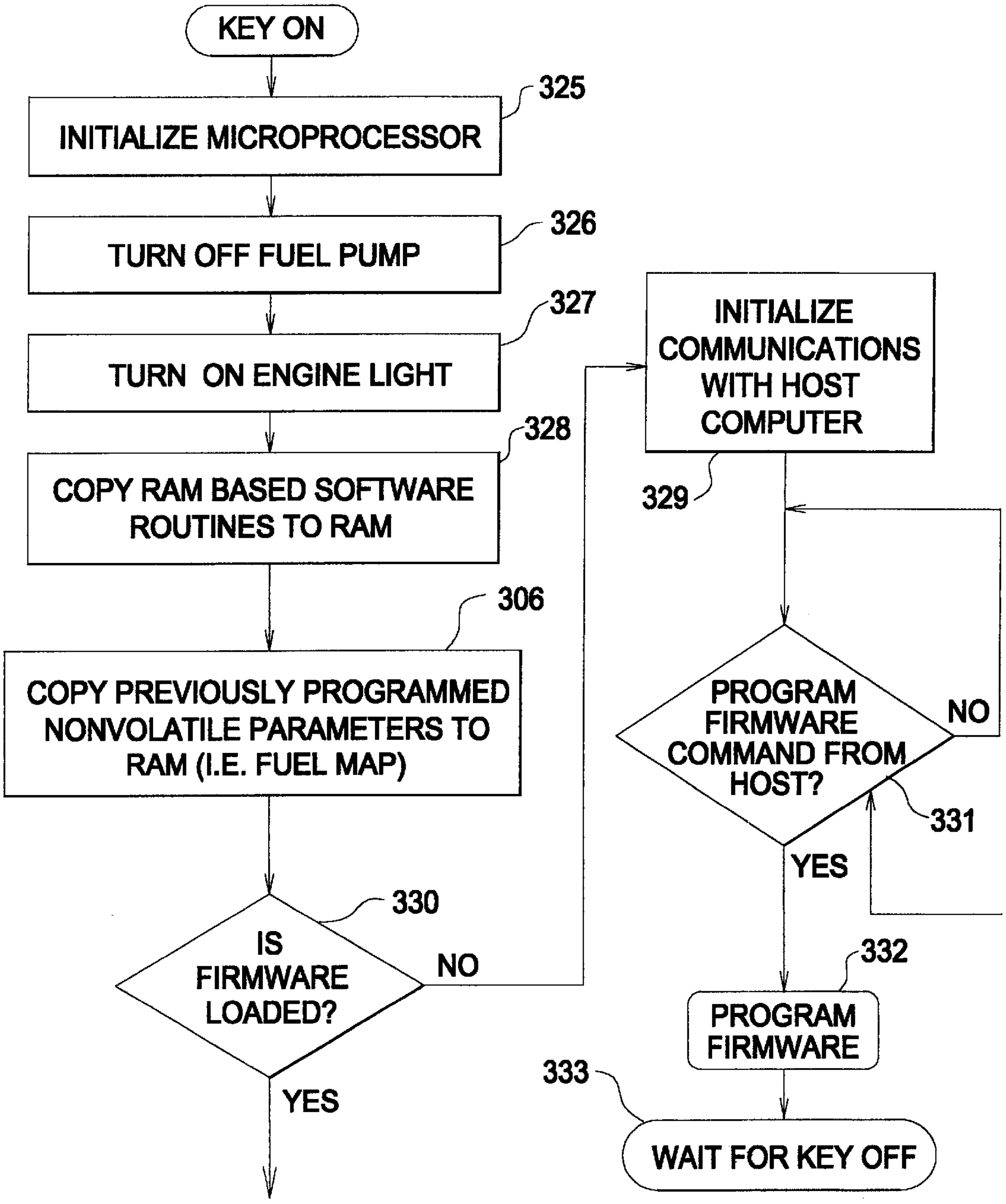
FIG. 3A is a logic flow diagram of the ECM power up process.

The microcontroller contains counter/timer circuits that are used to generate various time delays, and to generate one-second periodic interrupt 313 for internal timing. The Flash EEPROM 26 (FIG. 2) serves multiple functions, and is divided into a number of separately erasable memory blocks. One or more blocks of the EEPROM 26 (FIG. 2) can be erased without altering the contents of other blocks. Each block is used for program storage, variables, and historic data. The Boot Firmware block is programmed once at the factory and cannot be erased. New firmware may be downloaded in 332 (FIG. 3A). This firmware 302 (FIG. 3*a*) is executed when the engine is first turned on. The boot firmware checks the Normal Firmware block for valid firmware code and begins executing it. If no code is present, the ECM will wait for a host computer 3 to be connected and handles loading and programming new firmware in FIG. 21. The Normal Firmware block stores the normal firmware that controls the ECM 1. This block can be reprogrammed by the host computer 3. The Sensor and Fuel Map block stores all of the operating parameters for the engine, including fuel map 2814, ignition 2607 map, sensor maps 2700, the number of cylinders of the engine 2502, the camshaft timing, etc. All of these parameters can be reprogrammed from the host computer 3. The Non-volatile data block contains variable data that must be stored between each use of the engine. This data is copied into RAM 25 when power is first turned on to the ECM, then stored back to the EEPROM 26 when power is removed. Examples of this type of data are engine run time 704 (total number of hours the engine has run) snapshot data, and diagnostic error codes table 1.

The microcontroller 22 (FIG. 1*b*), internal programmable phased locked loop (PLL) circuit in the microcontroller that multiplies the external crystal 21 frequency of 4.192 MHz by five to generate the 20.972 MHz internal clock. In this application, the oscillator frequency is set to the maximum value of 20.972 MHz and not changed. The frequency of 4.192 MHz was chosen because it is an even power of two, which allows a precise time unit of 1.00-second using binary counters.

Serial interface 35 circuit comprises the RS-232 electrical interface. It converts the 0-volt and 5-volt serial data signals into +10-volt and −10-volt signals defined by the RS-232 specification. The received data signal (Diag_RX) also doubles as the snapshot switch 54 signal. When the ECM 1 powers up, it tests state the (Diag_RX) line to determine if a host computer 3 (FIG. 1) is connected. If a host computer is connected, the idle state level would be approximately +10-volts. If this state does not exist, then it is assumed that no computer is connected or a snapshot switch is connected. When the snapshot switch is activated, it momentarily connects +12-volts to the Diag_RX signal 55 (FIG. 1). Otherwise the Diag_RX signal is pulled to ground within the receiver. Temperature sensor 38 monitors the internal temperature of the ECM 1. It is utilized as a diagnostic function to determine if ECM 1 failure is due to excessive heat. Unity gain buffer amplifiers interface the A/D converter 27 (within the microcontroller) to the various sensors on the motorcycle. The buffers protect the microcontroller A/D 27 from damaging transient signals that may be present on the sensor lines (FIG. 31B). The amplifiers also convert the high impedance temperature sensors to the low impedance inputs of the A/D converter. Output drivers are necessary to boost the weak outputs from the microprocessor for driving external devices on the engine such as the "engine light", tachometer, and the relays for the fuel pump and the ECM power.

The ECM power is switched through an external relay on the motorcycle. The relay is controlled by a combination of the ECM and the keyswitch on the motorcycle. The keyswitch is responsible for initially energizing the ECM power relay. The relay is held-on by the microcontroller in the ECM. When the keyswitch is turned off, the ECM relay stays on until the microcontroller is finished erasing and storing the non-volatile data to the Flash EEPROM. Once the data is stored, the microcontroller turns off the relay, thus shutting the power off to the ECM itself.

The motorcycle contains a stepper motor 6 for adjusting the idle speed when the engine is first started. The ECM updates the stepper motor 6 position. This consists primarily of an IC that is interfaced to the microcontroller using a serial peripheral interface. The IC contains all of the drivers and diagnostics needed to drive the stepper motor 6.

The crankshaft 12 and camshaft engine sensors 16 report the angular position of the cam and crankshaft to the ECM. The camshaft sensor does not require much conditioning and is inverted by a Schmidt trigger for greater noise immunity before being fed directly to the microcontroller. The crankshaft sensor 12 is an inductive type of sensor that outputs an AC type of signal. This differential signal is converted to a digital signal by using an RS-485 receiver type of circuit (MAX488, U29) This novel approach utilizes a communications type of receiver to condition the inductive signal, and provides a small amount of balanced hysterisis for noise immunity, with the fewest number of components. The flexible engine control system allows precise control of a variety of IC engines. The hardware offers improved input protection and filtering. The instant invention offers flexible sensor selection and calibration methods not available in prior art.

Figure 21:
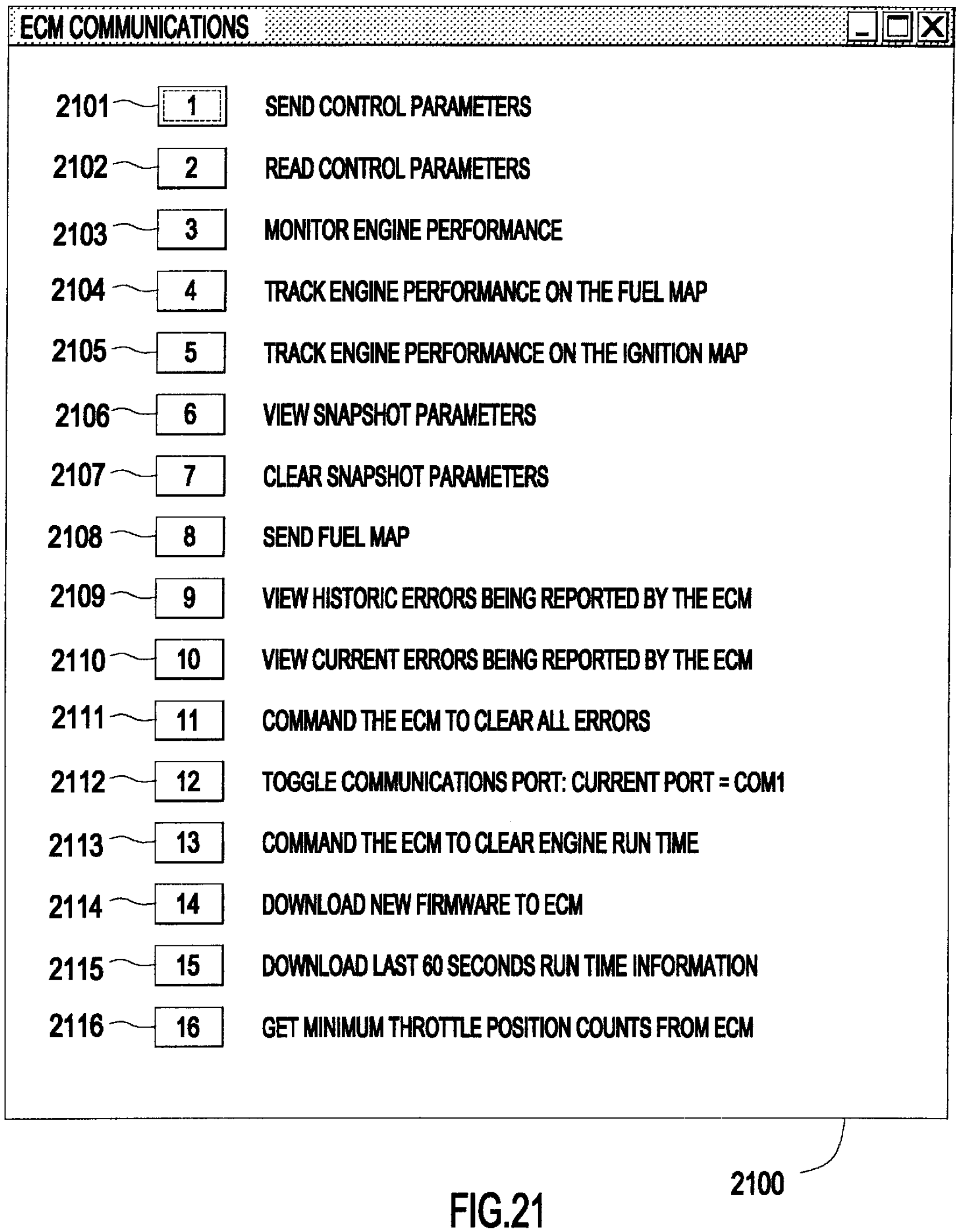
FIG. 21 is a graphic for the ECM communication interface.

Referring next to FIG. 3A logic flow shows the process carried out by the ECM 1 at power up. This process or "boot code" executes out of ROM. Application of battery power forces the processor 22 (FIG. 1) to reset then start execution of code operation 301. The processor is initialized in 325 configuring internal timers of the TPU 23 (FIG. 2) and setting direction of I/O ports. The fuel pump 48 (FIG. 1*a*) is turned off in block 326. The engine check lamp 46 (FIG. 1) is turned on in operation 327. Operation 328 copies RAM based software to from ROM and EEROM to RAM. Last saved fuel map, ignition and choke variables from slow nonvolatile memory (EEROM) 26 (FIG. 2) are copied to fast internal RAM (25 FIG. 2). Decision block 330 checks the presence and integrity of the firmware. If test 330 fails ECM establishes communications with computer 3. Decision 331 waits until the user starts the software download process in window 2100 button 2114 (FIG. 21). Firmware downloaded to the ECM is saved to EEROM in operation 332. ECM waits for the power down in operation 333. The ability to down load new firmware to the ECM is novel to this instant invention. The capability to customize the ECM to different engine types is unique in the art, allowing suppliers to stock one unit for a variety of applications.

Figure 3B:
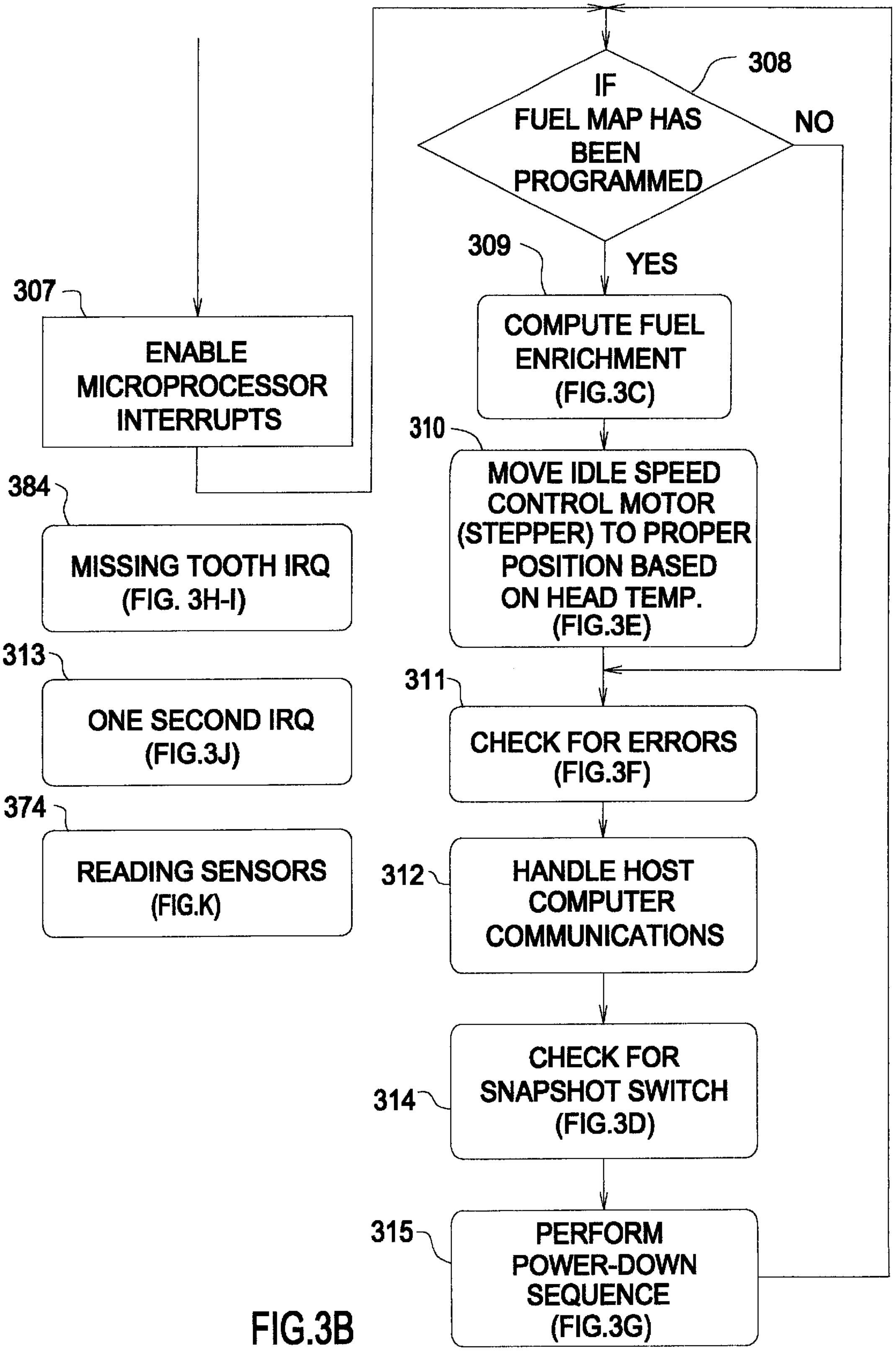
FIG. 3B is a continuation of FIG. 3A.
Figure 3C:
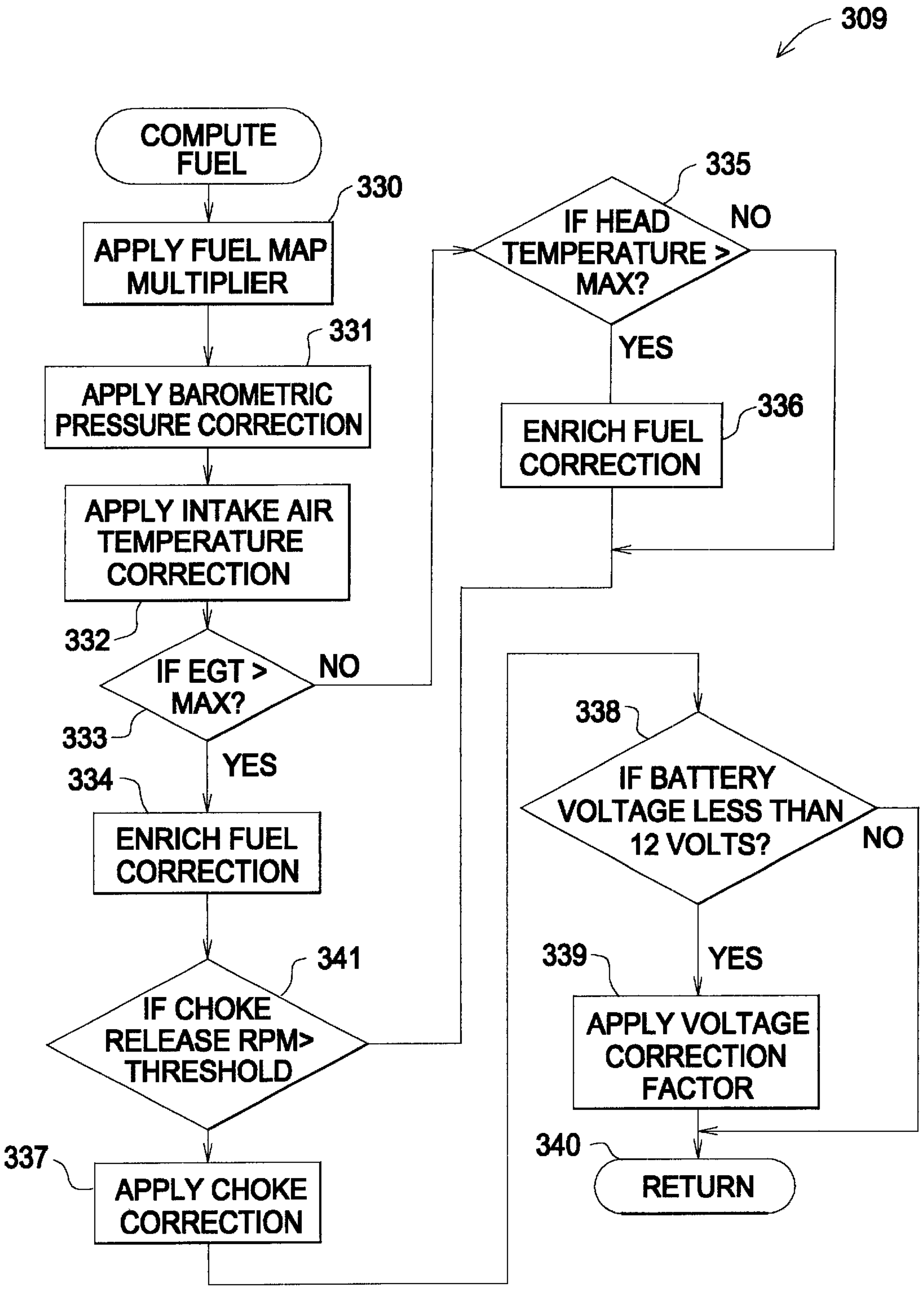
FIG. 3C is a flow diagram computing the fuel injector pulse widths.

FIG. 3B is a continuation of FIG. 3A. Operation 307 enables the processor interrupts to allow the computer to respond to external service requests. Decision 308 verifies if the fuel map edited by window 2800 (FIG. 28) was down loaded to memory. If the fuel map is empty error block 311 is executed. With a correct fuel map loaded fuel injector on time subroutine is calculated in 309 (FIG. 3C). Idle speed motor position is moved to its position in operation 310. Error checking subroutine 311 (FIG. 3F) checks errors. Subroutine 312 handles communications with the computer 3 (FIG. 1) over serial cable 13. Operation 312 updates screens 2900 (FIG. 29), screen 2400 (FIG. 24), screen 2500 (FIG. 25), screen 2600 (FIG. 26), and screen 2800 (FIG. 28). Operation 314 checks for presence of snap shot switch 54 (FIG. 1). If snap shot switch 54 is closed, snap shot parameters are saved to memory 26 (FIG. 2). Pressing Graphic screen 2100 button 2106 opens window 700 (FIG. 7) to view the saved parameters at a later time. Operation 315 checks the ignition key if off the ECM executes shut down code. If the ignition switch is on the program next executes 308. Program execution continues in this loop until the ignition key is turned off. Interrupt tasks such as 313, 374 and 384 run concurrently in the background.

Figure 24:
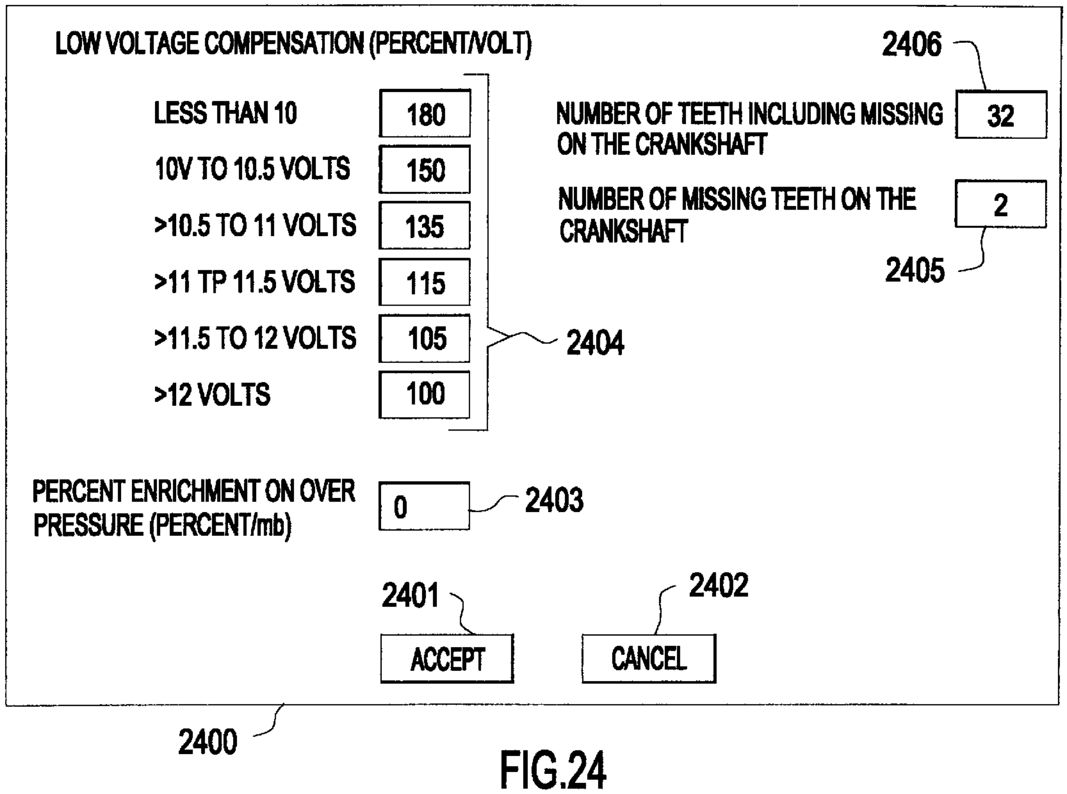
FIG. 24 is a screen graphic for editing page one of the ECM control table.
Figure 30A:
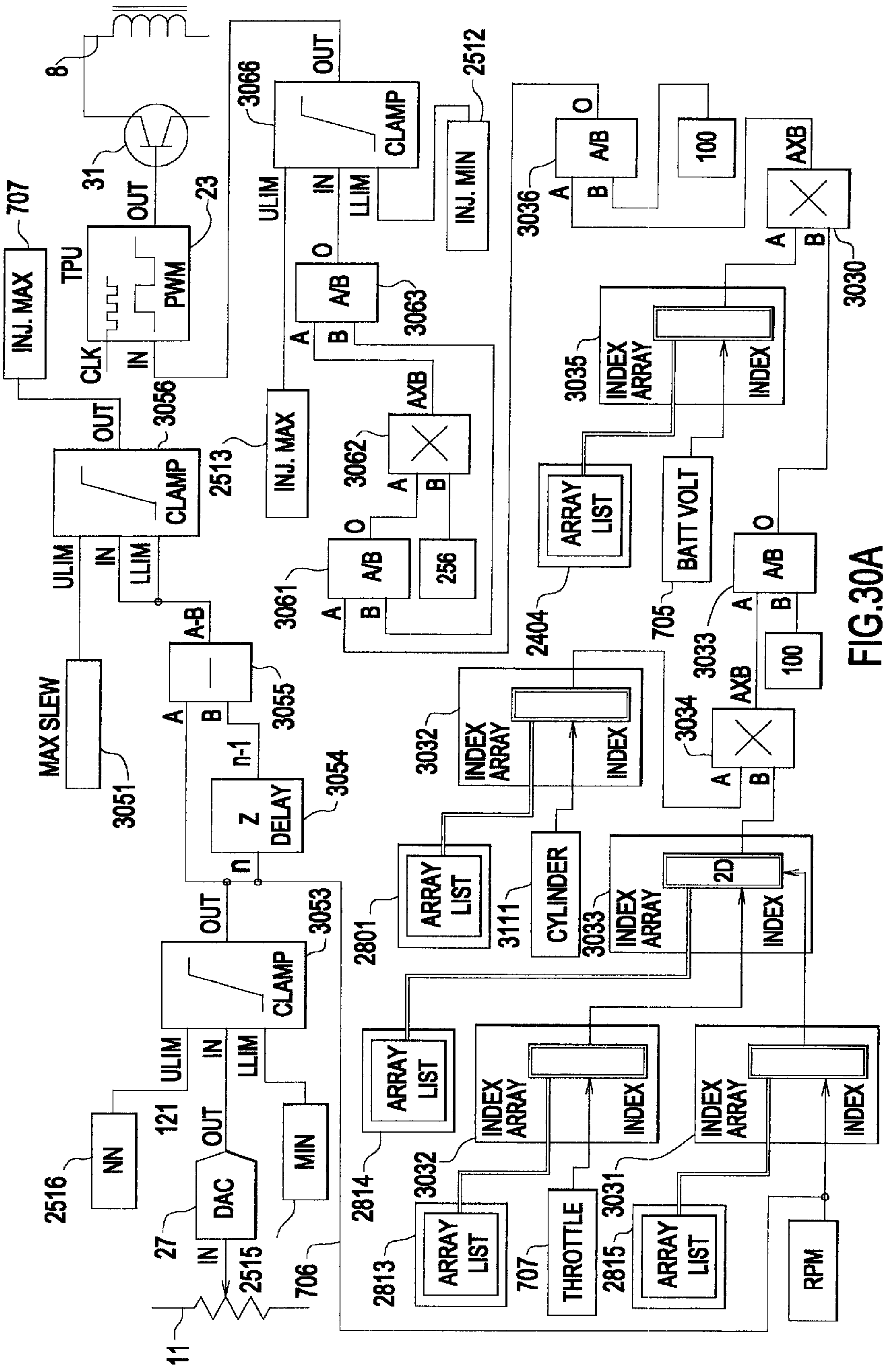
FIG. 30A is a data flow diagram for the fuel algorithm.

Referring to FIG. 3C flow diagram 309 is the subroutine to compute the fuel injector pulse widths. FIG. 30A details the math operations used to compute the injector commands. Instantaneous engine RPM and throttle position is used to look up the fuel map value stored in RAM. Window 2800 (FIG. 28) allows the user to edit the fuel maps. Fuel map multiplier 2801 (FIG. 28) is applied to scale the instantaneous fuel map value. Operation 331 reads barometric pressure from sensor 10 (FIG. 1) and applies pressure correction. Operation 332 reads intake air temperature sensor 15 compensating for air density. Decision 333 compares EGT 9 against enrichment temperature 2506 (FIG. 25) if greater compensation value 2507 is applied in operation 334. Decision 335 compares head temperature sensor 17 against enrichment temperature 2505 if greater compensation is applied in operation 336. Decision 341 compares RPM against choke release setting parameter 2510. If RPM is greater the choke compensation is turned off. Operation 337 applies choke compensation. Decision 338 compares battery 14 voltage. If current battery voltage is less than 12-volts injector times are increased by the values in table 2404 (FIG. 24). Operation 340 returns control back to the calling program. The instant invention allows the user to customize fuel parameters for individual cylinders, enrichment rates to keep engine temperatures in a safe range. Additionally the novel low battery injector parameters 2404 allow for correction of non-linear injector characteristics at low voltages.

Figure 3D:
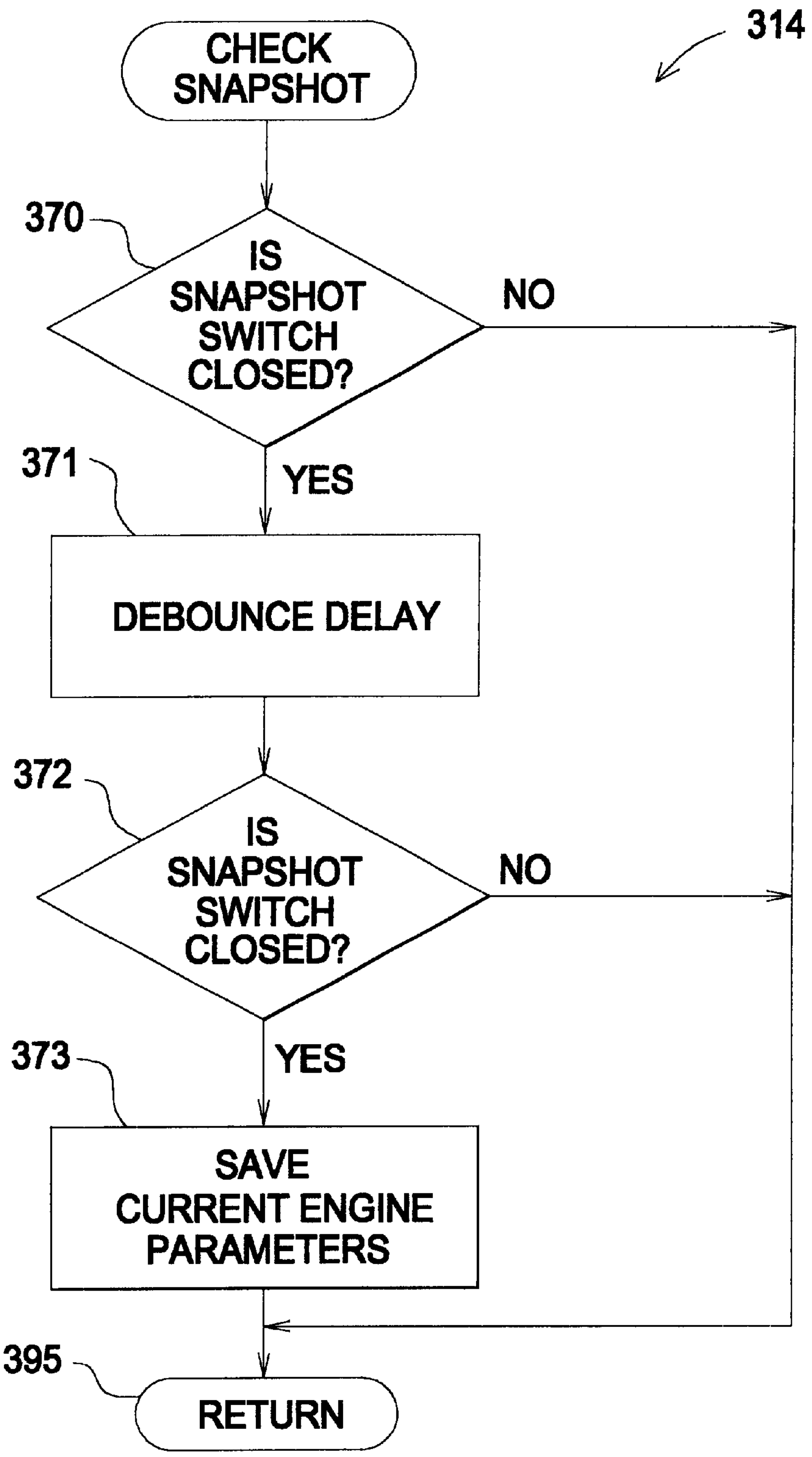
FIG. 3D is a flow diagram of the ECM "snap shot" data collection procedure.

Referring to FIG. 3D flow diagram 314 outlines the saving of the snap shot subroutine. Decision 370 checks the "snap shot" switch, if open the program exits to return to calling program via return 395. If the switch is closed a short delay is introduced in step 371 where decision 372 checks the switch again. If the switch is still closed the snap shot parameters are saved to memory for viewing in window 700 at a later time. This is a unique trouble shooting tool to the art.

Figure 3E:
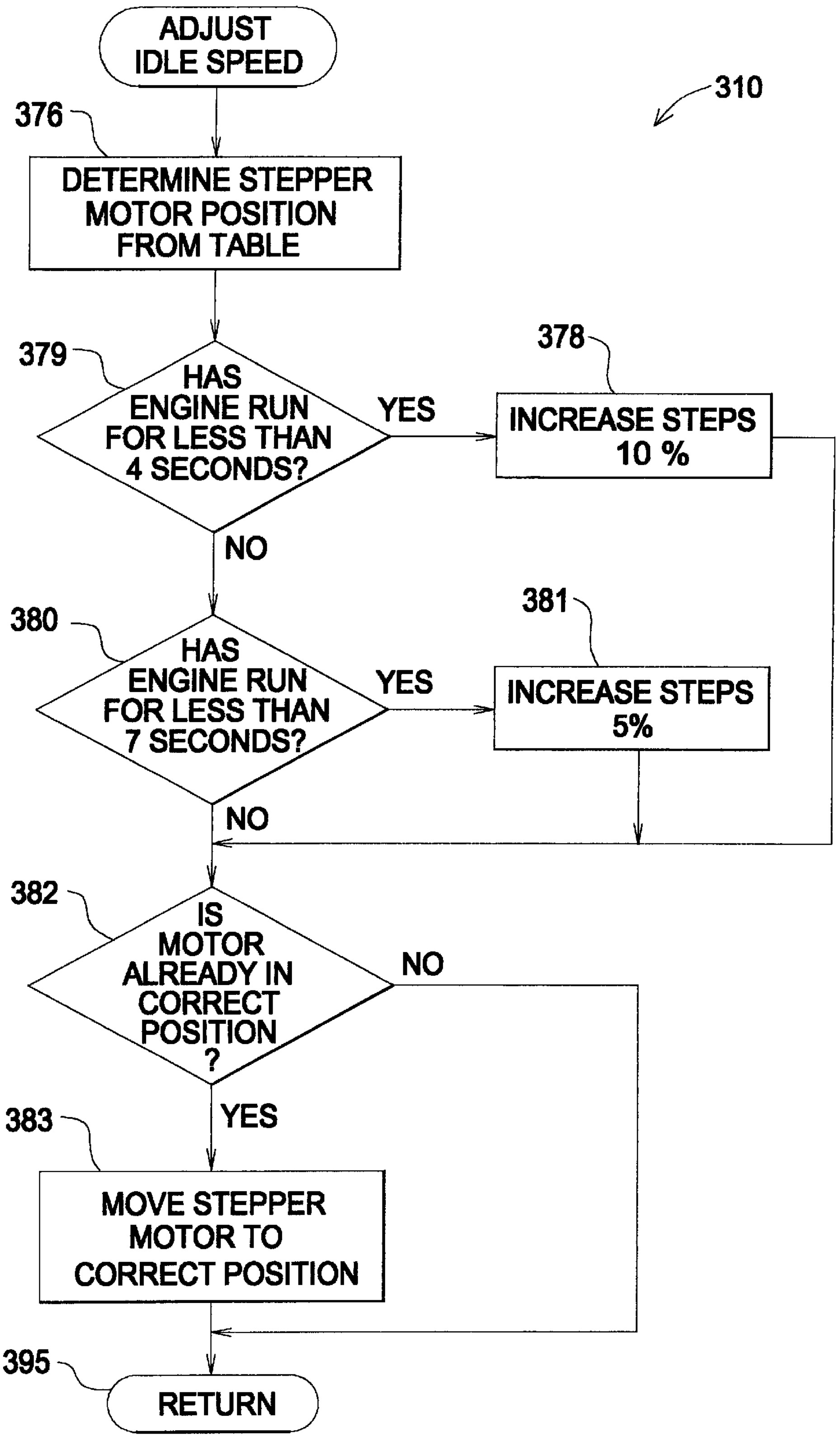
FIG. 3E is the flow chart for the idle speed subroutine.

FIG. 3E is the flow chart for the idle speed subroutine 310. Operation 376 looks up the correct stepper motor position. Operation 379 checks the engine run internal timer. If the engine has been on for less that 4 seconds operation 378 increases the stepper by 10%. Operation 380 checks the engine run internal timer. If the engine has been on for less that 7-seconds operation 381 increases the stepper by 5%. Operation 382 compares the current stepper position to the computed value. If different, operation 383 moves the stepper to the desired position. Operation 395 returns to the calling program.

Figure 3F:
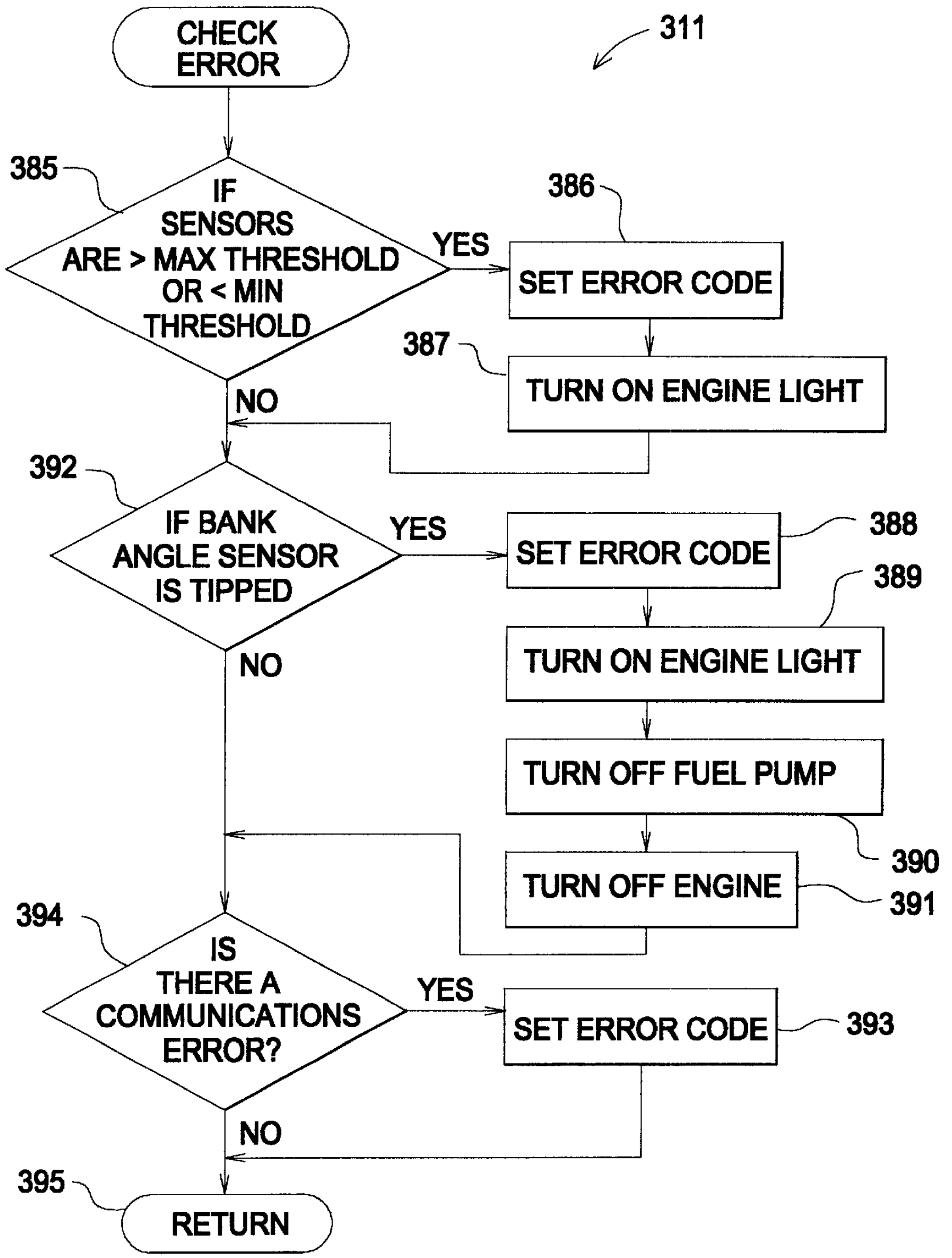
FIG. 3F is a flow chart of the error reporting software.
Figure 14:
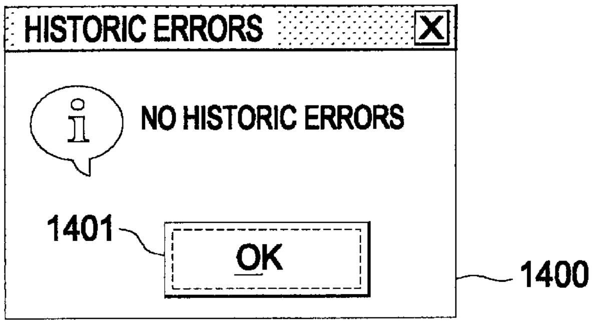
FIG. 14 is a graphic for the current errors.

FIG. 3F is a flow chart of the error reporting software. Decision operation 385 verifies sensor readings are in normal range. If out of range, appropriate error code(s) are set and saved to memory. The error codes may be read out and displayed in window 1400 (FIG. 14). The check engine lamp is turned on to alert the operator. Operation 392 checks the bank angle sensor. If tripped operations 388, 389, 390 are executed. Operation 388 stores the bank angle error code. Operation 389 turns on the check engine lamp. Operation 390 turns off the fuel pump. Operation 391 turns off the ignition and injectors. In the event of a fall the engine is turned off to protect the operator. Operation 394 checks the status of the communication system. If an error is found, appropriate error codes are stored to memory in operation 393. From window 2100 (FIG. 21) buttons 2109 and 2110 current and historical errors may be viewed.

Figure 3G:
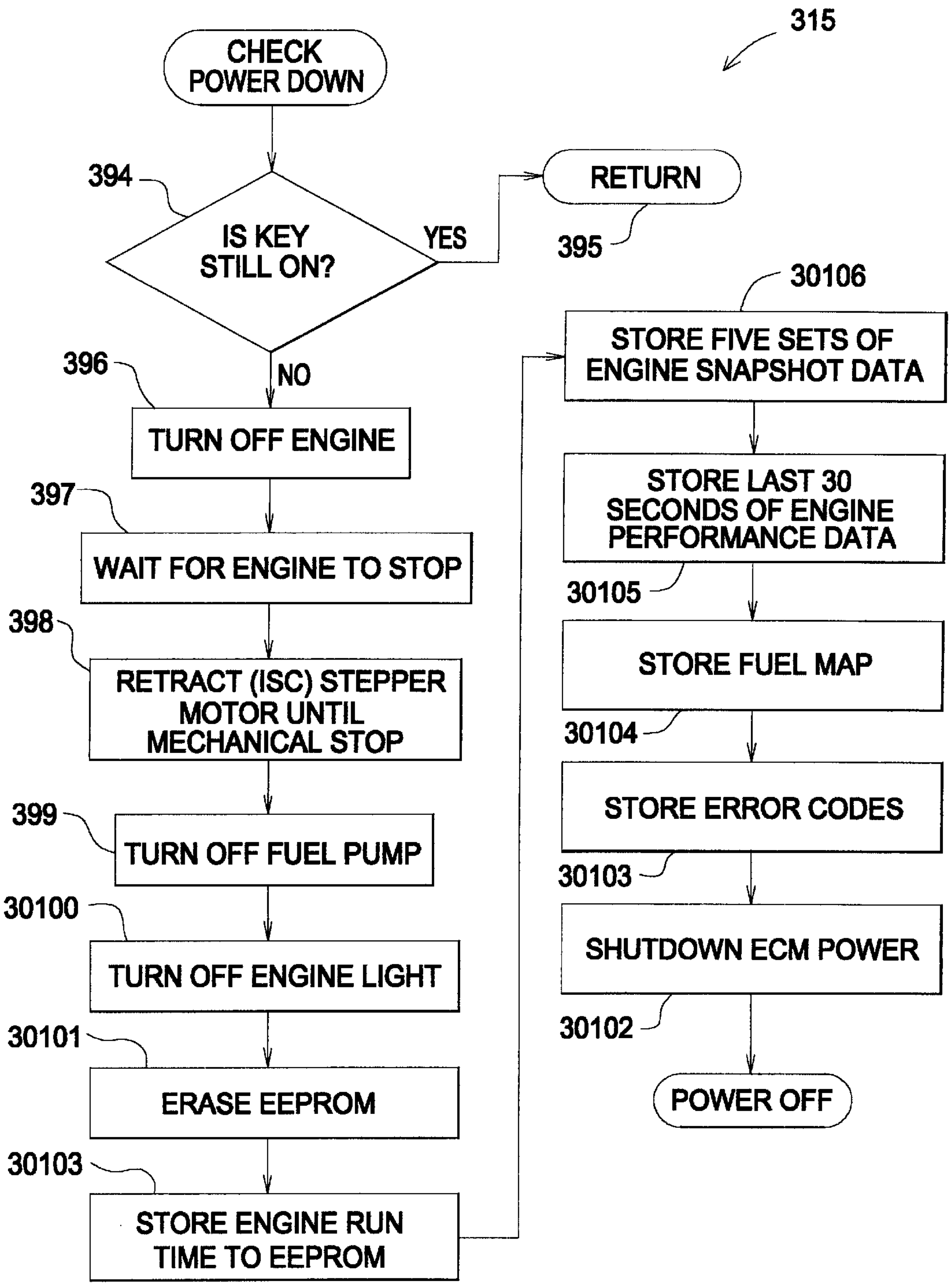
FIG. 3G is the flow chart of the ECM power down sequence.

FIG. 3G is the flow chart 315 detailing the steps executed prior to power down. Operation 394 checks the ignition-key, if on, program control returns to calling program via 395. If switch is off, operation 396 turns off the ignition and injector drive. Operation 397 waits for RPM 706 to go to less than 50 RPM. Operation 398 moves the throttle stepper motor to mechanical stop. Operation 399 turns off the external fuel pump. Operation 30100 turns off the engine light. Operation 30101 clears unneeded data from EEPROM. Operation 30103 saves runtime data to EEPROM for viewing data from 2100 (FIG. 21) by pressing 2115. Operation 30106 saves the last five sets of run time data to EEPROM. The snap shot data may be viewed in window 700 (FIG. 7). Operation 30104 saves the current fuel map stored in RAM to EEPROM. Window 2800 (FIG. 28) allows viewing and editing fuel map 2814. Operation 30103 stores error codes to EEPROM memory for later retrieval by 2100 and clearing by 2111 (FIG. 21). Operation 30102 turns off power to the ECM power relay. The instant invention allows editing while the engine is running fuel map array. Additionally the invention has the unique capacity to save critical engine parameters in snapshot memory and the last 30–60 seconds of run time data.

Figure 3H:
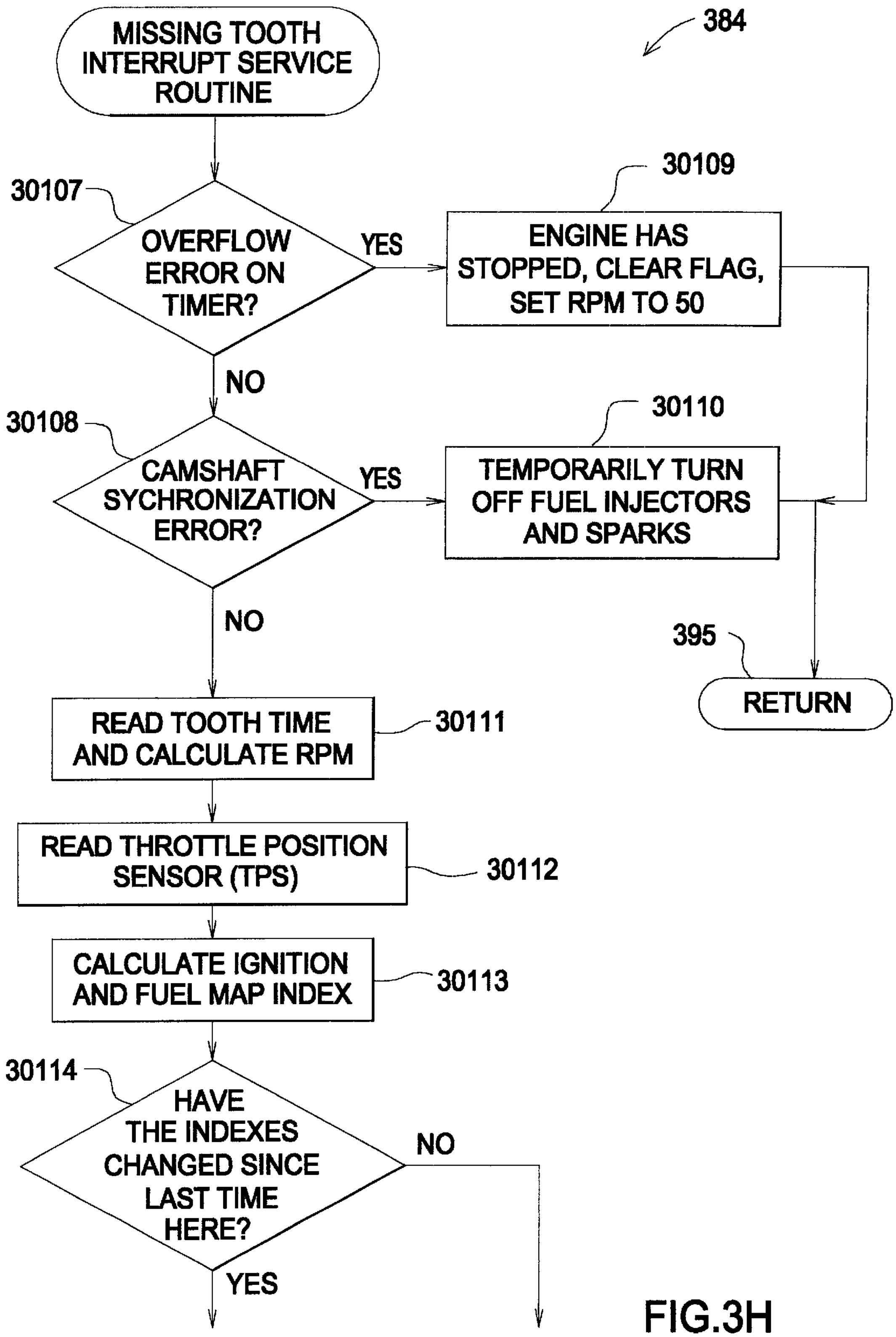
FIG. 3H is a flow chart detailing the missing tooth service routine.
Figure 25:
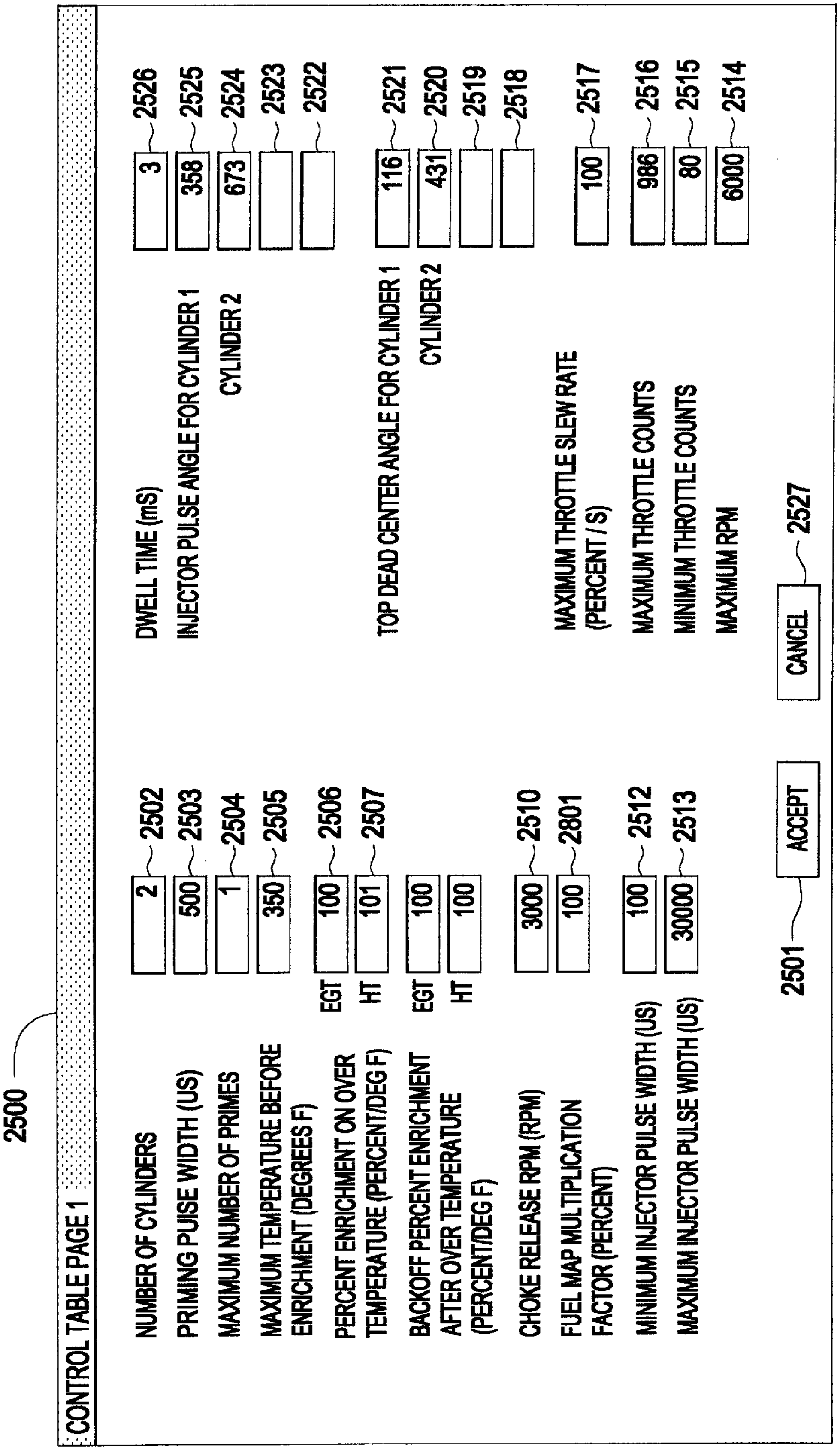
FIG. 25 is a screen graphic for editing page two of the ECM control table.
Figure 26:
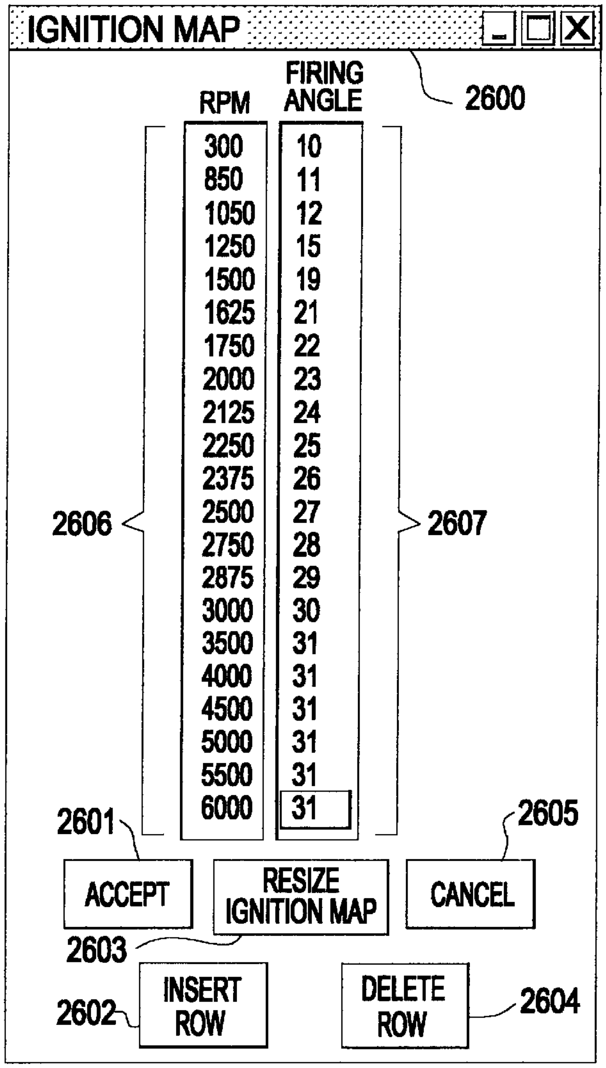
FIG. 26 is a screen graphic for editing the ECM ignition map.
Figure 29:
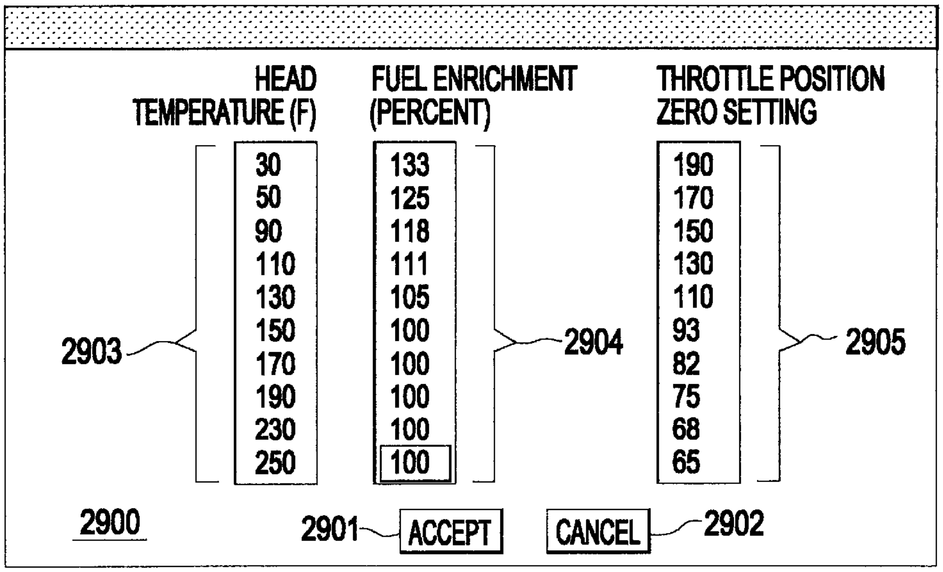
FIG. 29 is a screen graphic for editing the ECM choke table.

FIG. 3H is a flow chart detailing the "missing tooth" service routine 384. Operation 30107 checks an internal timer for a overflow flag. If set, the engine has stopped or the RPM is under 50. Operation 30109 sets the RPM value 706 (FIGS. 7 and 8) to 50. It is set to a minimum non-zero value to prevent division by zero errors in other routines that use RPM. Return to calling routine is done in operation 395. If no over flow error exists operation 30108 check for synchronization error. It not synchronized, operation 30110 disables spark and injectors to prevent damage to the engine. Loss of synchronization occurs when starting the engine. Operation 30111 reads tooth time from the TPU 23 and updates the instantaneous RPM value. The RPM is used by the TPU to determine spark advance 2606 (FIG. 26). Operation reads and scales the TPS value used to index the fuel map 2813 (FIG. 28) and throttle position 2905 (FIG. 29). Operation 30113 uses the RPM and throttle position to index or look up the fuel map value from table 2814 stored in RAM. The invention supports custom maps for each injector. Individual injector maps allows compensation for cylinder displacement variation, injector sizes or characteristics or cylinder operating temperatures due to engine geometry. Operation 30114 checks if the fuel map value is different from the last update. If different, operation 30115 updates the TPU with the new injector value. Operation 30116 compares the RPM again with user definable maximum RPM 2514 (FIG. 25). If an over speed condition exists, operation 30117 turns off fuel and spark to one cylinder. If the RPM is below max RPM 2514 (FIG. 25), operation 30119 checks if one cylinder was disabled. If one cylinder was off, operation 30118 restores spark and fuel to that cylinder. This provides a user definable RPM limiter to protect the engine and or operator. Operation 30120 generates the synthetic tachometer signal to drive the tachometer display. Operation 30121 sets a digital output high to generate the virtual tooth. This digital output is logically "OR"ed with the crank shaft sensor output. In this embodiment and "OR" gate was used. With inverters or different polarity crank sensors "NAND", "AND", "EXOR" or "NOR" gates may be used to generate the "virtual tooth". See FIG. 31A for a schematic regarding operation of the "virtual tooth". Operation 395 returns to the calling program. The TPU automatically generates injector and spark signal with no processor intervention. The processor only updates the TPU as required. The novel virtual tooth generation method allows the TPU to operate with one or more missing teeth. The TPU will not function with more than one tooth missing. The ECM code begins executing as soon as it has power. At start up, the on board microprocessor writes all pertinent parameters to its timer processor unit (TPU). The TPU then achieves synchronization, when the engine is turned over, when it sees a full stream of crankshaft teeth. Once synchronization occurs, the fuel injectors 8 and ignition coils 58 are activated at the programmed points.

Figure 3I:
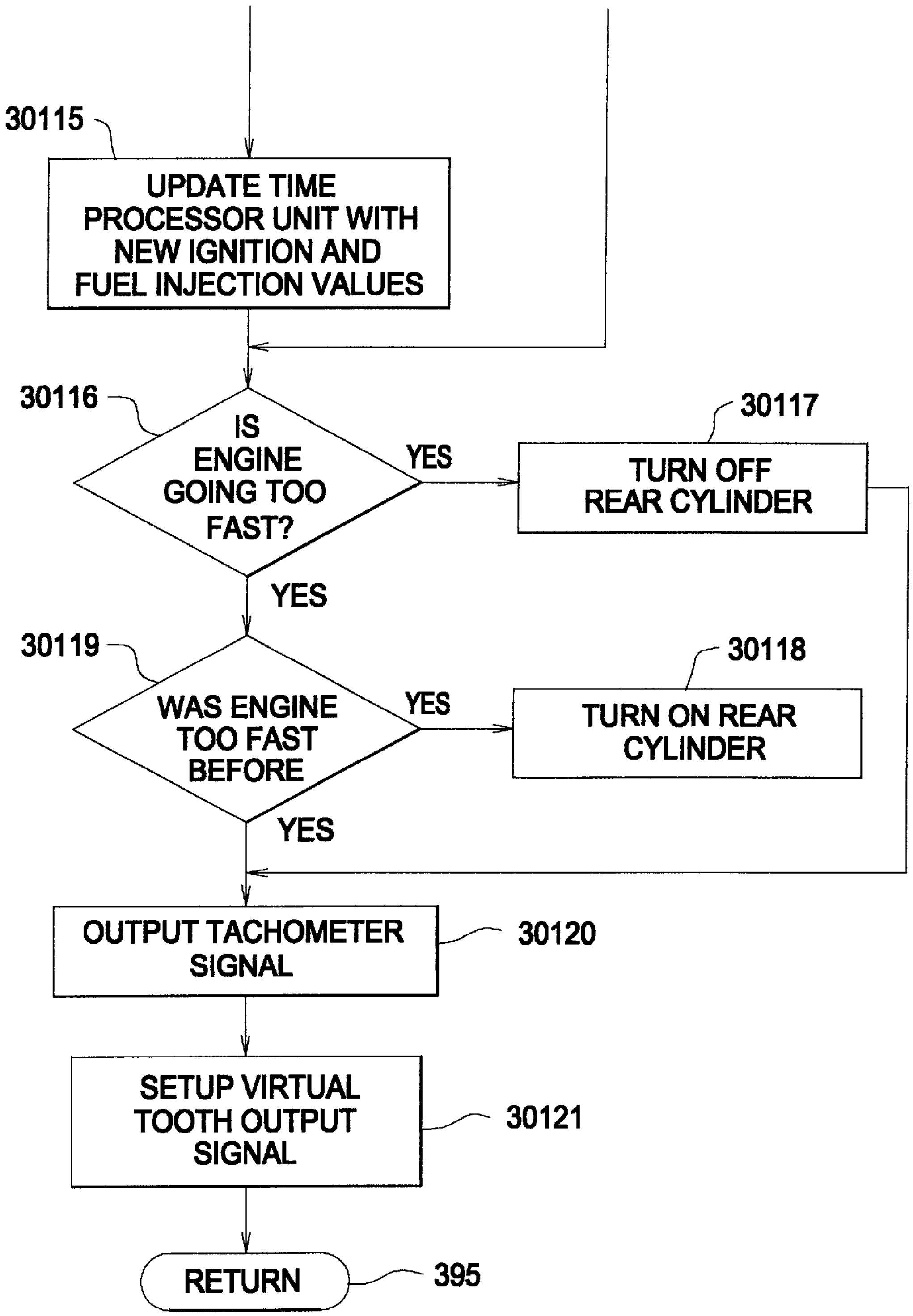
FIG. 3I is a continuation of FIG. 3H.
Figure 3J:
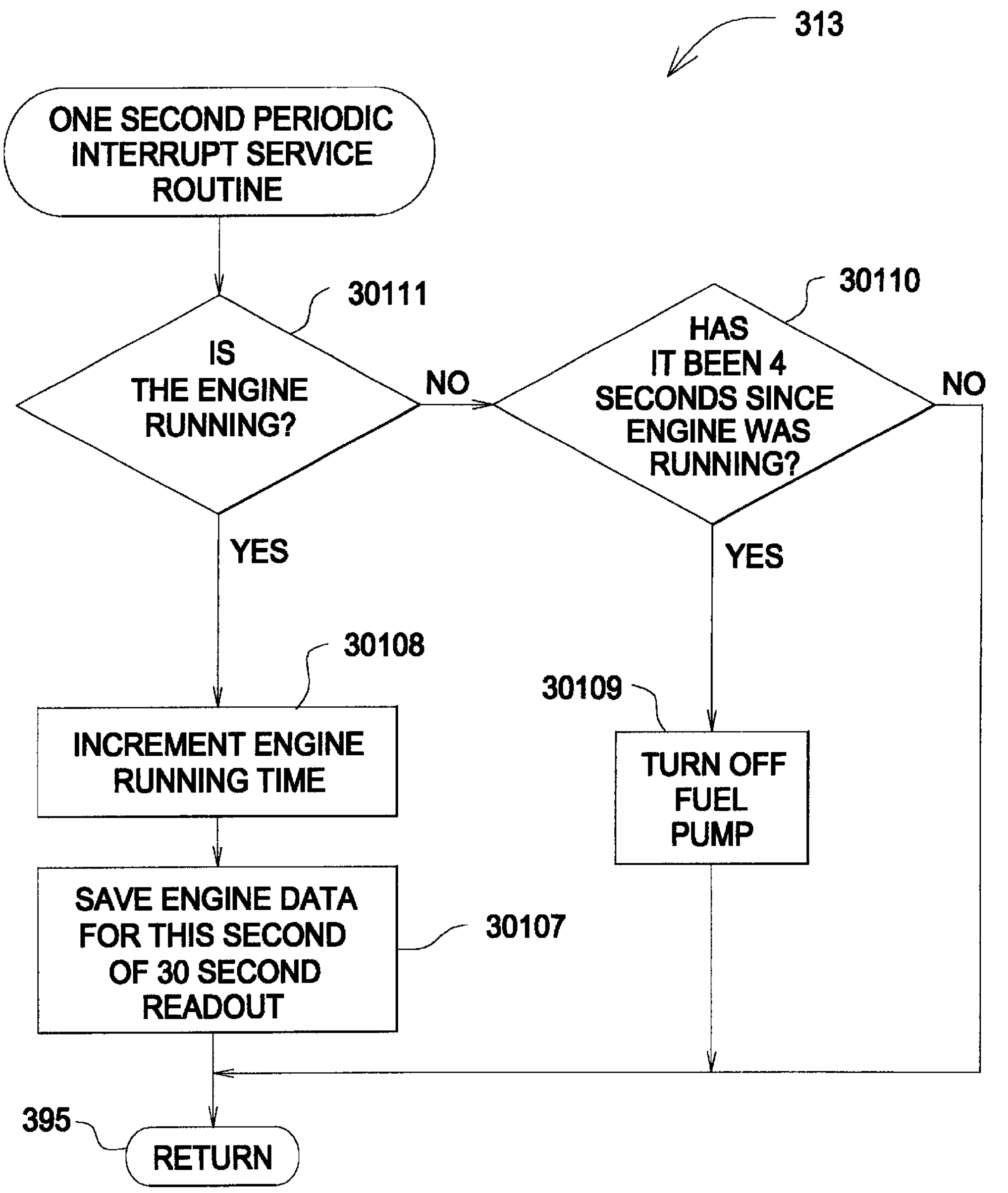
FIG. 3J is a flow chart of the one-second-timer routine.
Figure 8:
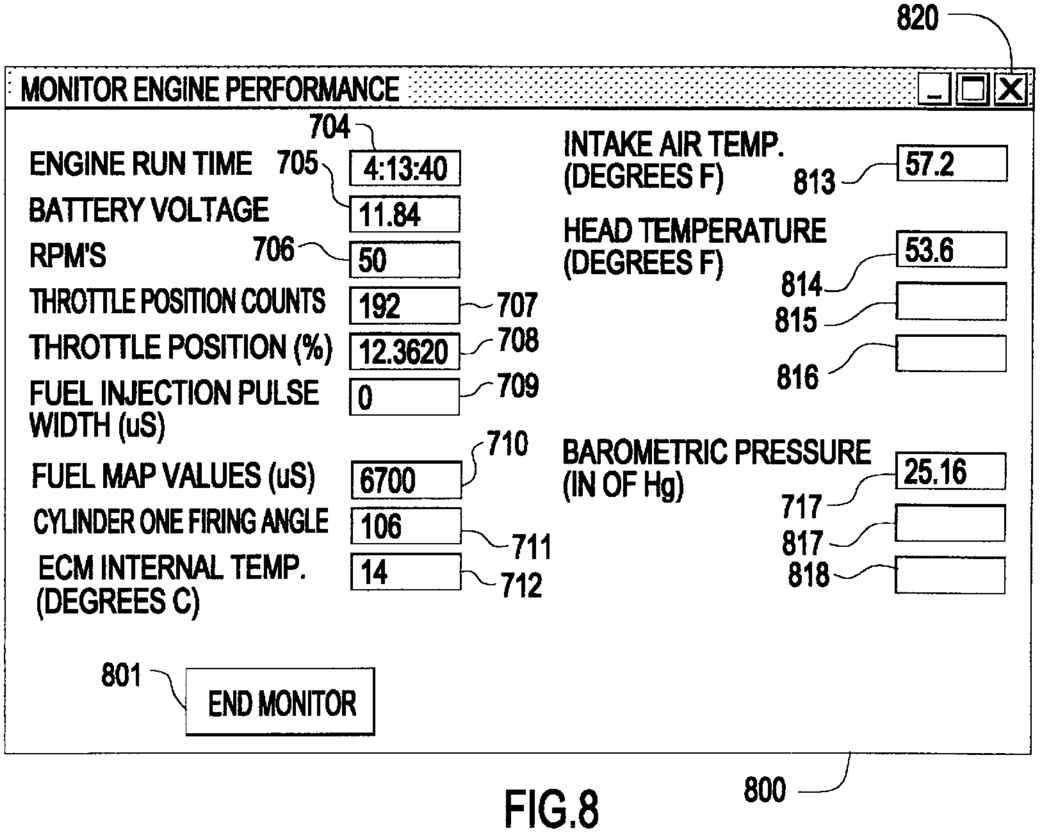
FIG. 8 is a graphic to monitor engine performance.

FIG. 3J is a flow chart of the one-second-timer routine 313. Decision 30111 checks if the engine is running. If not running, decision 30110 checks if the engine was running within the last 4-seconds. If less than 4-seconds return operation 395 is executed. Operation 30109 turns off the fuel pump. If the engine is running operation 30108 increments the run time counter 810 (FIG. 8). Operation 30107 saves the snap shot data to memory. The last 30–60 seconds of run time data is saved for up load and viewing. Operation 395 returns to the calling routine. The invention provides the capability to review historical engine parameters. This information may be useful in accident investigation or engine trouble shooting.

Figure 3K:
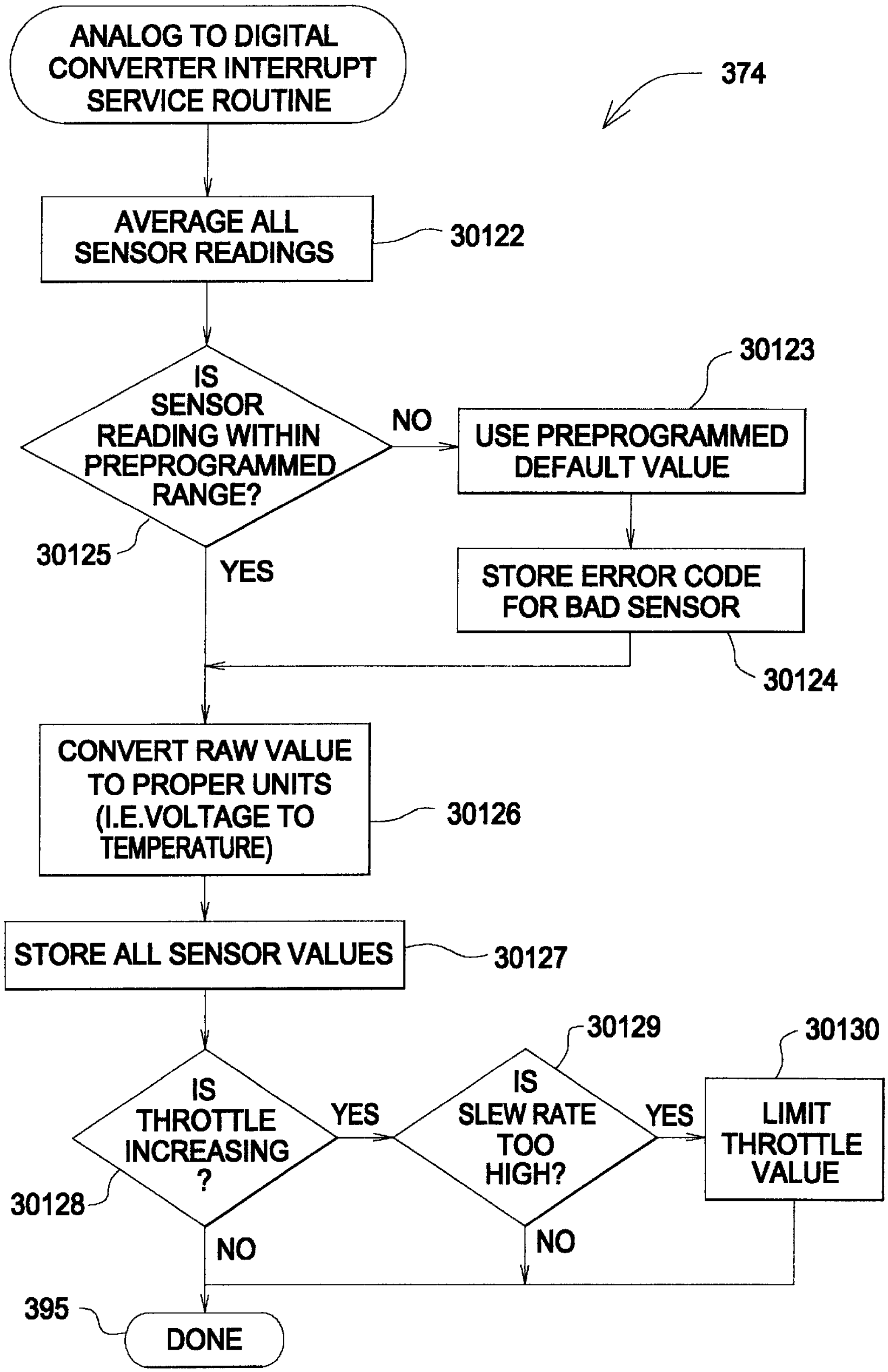
FIG. 3K is a flow chart of the analog input routine.

FIG. 3K is a flow chart of the analog input routine 374. Operation 30122 performs averaging on the sensor readings. Operation 30125 checks the sensor readings to be within a valid range. If not, operation 30123 uses default value to replace the questionable reading. Default values are entered into 2704–2710C in FIG. 27. Operation 30124 writes an error code to memory. Operation 30126 scales the reading to engineering units for display and internal computations. Operation 30127 writes the sensor values to memory. Operation 30128 checks for increasing throttle position. If increasing, operation 30129 checks the maximum rate of change. If too high, operation 30130 limits the maximum rate of change. If the maximum rate has not been exceeded the program returns to the calling program. The throttle limiter serves to protect the operator from excessive acceleration. FIGS. 3A–K are flowchart overviews of ECM operation. Computer program listing appendix are source listings of the ECM "C" and assembler code before compilation into executable binary code that is stored in ROM 28.

Figure 4:
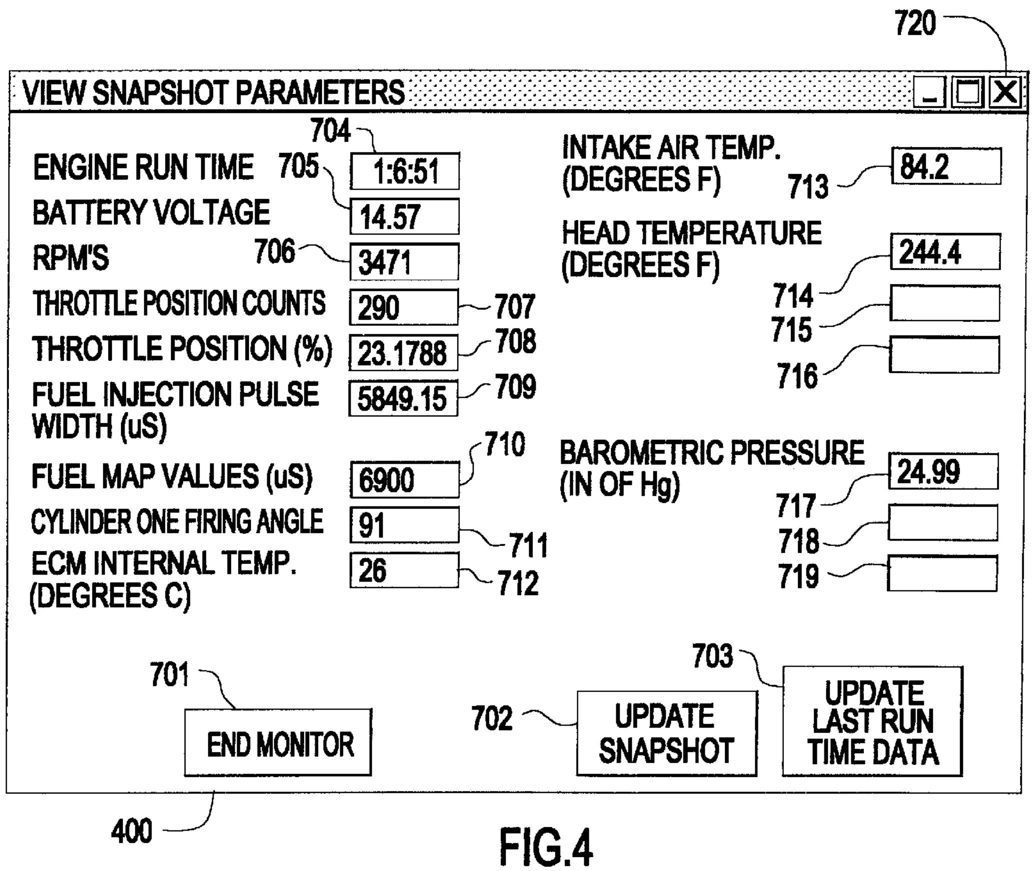
FIG. 4 is a graphic to display the run time data.

FIG. 4 is a screen graphic 400 of the run time data. Upon issue of this command 2115 from window 2100 (FIG. 21) the host computer sends the following data stream, which requests the last 30–60 seconds of run time information: 001B (ASCII Escape Character) 000F (Command number 15–Download 30–60 seconds run time information), 002A (Checksum). Once the ECM has received download run time information command, it replies with the following message:

TABLE 1

| Hex Value | Description |
|---|---|
| 001B | Escape Character |
| XXXX | Battery Voltage |

TABLE 1-continued

| Hex Value | Description |
|---|---|
| XXXX | Run Time-hours |
| XXXX | Run Time-minutes |
| XXXX | Run Time-seconds |
| XXXX | Engine Speed (RPM) least significant word |
| XXXX | Engine Speed (RPM) most significant word |
| XXXX | Throttle Position |
| XXXX | Throttle Counts |
| 0000 or 0001 | 0000 = fuel pump off; 0001 = fuel pump on |
| XXXX | Fuel injection pulse width |
| XXXX | Ignition firing angle (cylinder 1) |
| Sensor Code | Code for each active sensor will be sent, followed by that sensor's reading |
| Sensor Reading | Snapshot value of sensor whose code precedes this value |
| FFFF | End of sensor readings |
| Checksum1 | Last two words comprise a 32-bit checksum over the 16 bit words preceding. |
| Checksum2 | Checksum1 is the LSW, Checksum2 is the MSW. |

The parameters in table 1 are formatted and displayed in screen graphic 400. This is a unique feature and valuable aid in trouble shooting performance problems. Graphic 400 is opened after user selects 2115 (FIG. 21) Run time data window 400 displays the last 30–60 seconds of ECM history. Including parameter engine run time 704, Battery Voltage 705, RPM 706, throttle position counts 707, throttle position percent 708, injector pulse width 709, fuel map value 710, cylinder one firing angle 711 and ECM internal temperature 712. Additional sensors may be selected in 2700 such as intake-air temperature 713, head temperature 714, EGT 715 barometric air-pressure 717. Additional sensors selected in window 2700 (FIG. 27) will appear in fields 715, 716, 718 and 719. Button 702 selects the latest data point. Pressing 703 and 702 loads the next oldest data point. Engine runtime parameter 704 reflects when in time the snapshot data was recorded. Selecting button "End monitor" 701 or 720 closes window 400. This invention allows the technician to review historical run engine parameters for analysis. The user may down load the run time data by pressing 2113 in window 2100 (FIG. 21).

Figure 5:
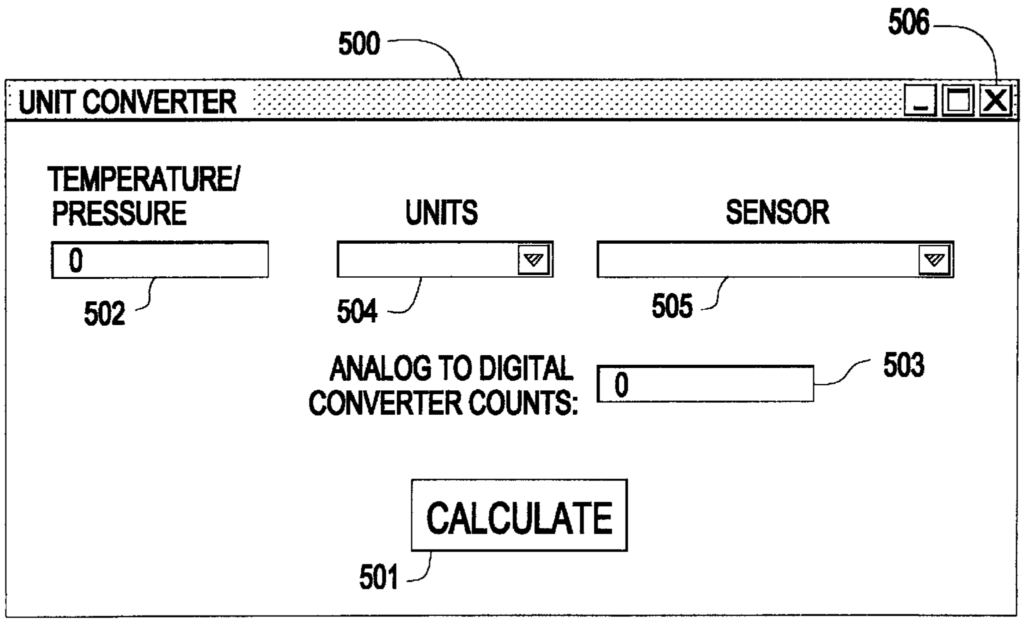
FIG. 5 is a graphic to for unit conversion.
Figure 27:
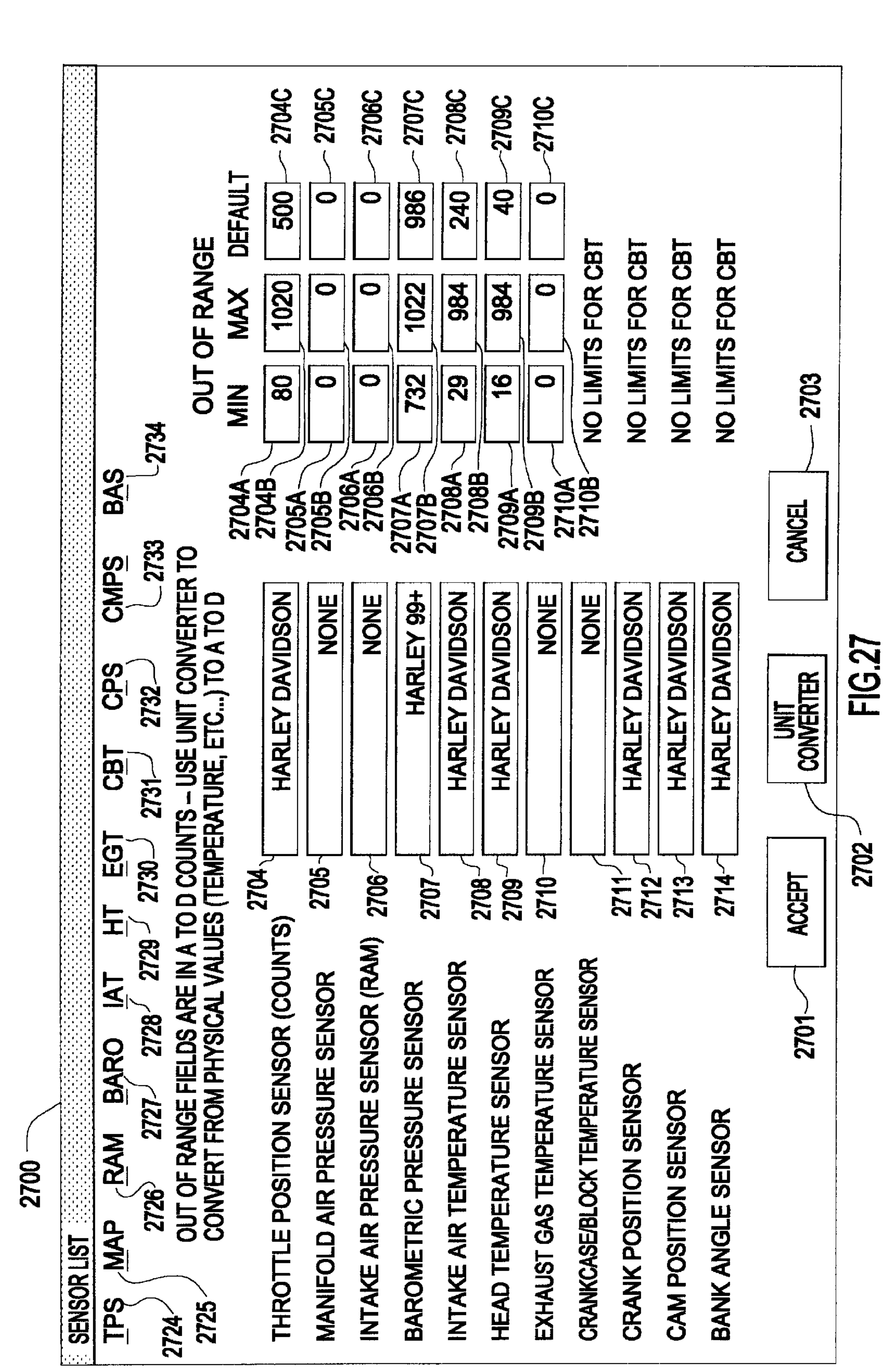
FIG. 27 is a screen graphic for editing the ECM sensors.

Referring now to FIG. 5 graphic 500 is opened after user selects 2702 (FIG. 27). User enters measurement to be converted into field 502, then selects appropriate units from pull down list 504. User selects applicable sensor from list 505. Pressing "calculate" button 501 invokes software to compute the corresponding analog to digital converter value displayed in 503. This instant invention allows the technician to verify sensor performance. Pressing button 506 closes window 500.

Referring now to FIG. 6 graphic 600 is opened after user selects 2104 (FIG. 21). Fuel map window 600 displays current ECM fuel map 601 array values stored in memory 25 (FIG. 2). The highlight box 604 location follows the intersection of the instantaneous engine RPM array 605 and throttle position array 606 in real time. The current fuel map value in use is enclosed in box 604. Selecting button "End Monitor" 602 or 603 closes window 600. This instant invention allows the technician to observe in real time the fuel map value used by the ECM. FIG. 3 details the computation of the final injector value. Computer program listing appendix files "mainECM.c", 'MainECM.h, "Global.c", "Global.h" "Ecm.h", "flashld.c", "flasher.c", "Reg-376.h" "Ecm.s", "ECMboot.s", "Flash-as.s", "Reg-376.s" and "Ecmboot.prm" are ECM source listings. The user may edit the fuel map with window 2800 (FIG. 28) and reload new values by pressing 2108 (FIG. 21). The invention allows the fuel map to be reloaded while the engine is running.

Referring now to FIG. 7 graphic 700 is opened after user selects 2106 (FIG. 21). Snap shot window 700 displays current ECM parameters engine run time 704, Battery Voltage 705, RPM 706, throttle position counts 707, throttle position % 708, injector pulse width 709, fuel map value 710, cylinder one firing angle 711, ECM internal temperature 713 intake-air temperature 713, head temperature 714, and barometric air pressure 717. Additional sensors selected in window 2700 (FIG. 27) will appear in fields 715, 716, 718 and 719. Button 702 up dates all the parameters in window 700. Button 703 sends a command to the ECM to up date the run time parameters. Selecting button "End monitor" 701 or 720 closes window 700. This invention allows the technician to capture real time critical engine parameters for analysis at a latter time. The user may down load the run time data by pressing 2115 in window 2100 (FIG. 21).

Referring now to FIG. 8 graphic 800 is opened after user selects 2103 (FIG. 21). Snap shot window 800 displays current ECM parameters engine run time 804, Battery Voltage 805, RPM 806, throttle position counts 807, throttle position percent 808, injector pulse width 809, fuel map value 810, cylinder one firing angle 811 and ECM internal case temperature 813, intake-air temperature 813, head temperature 814, and barometric air pressure 717. Additional sensors selected in window 2700 (FIG. 27) will appear in fields 815, 816, 818 and 819. Selecting button "End monitor" 801 or 820 closes window 800. This invention allows the technician to monitor in real time critical engine parameters.

Figure 9:
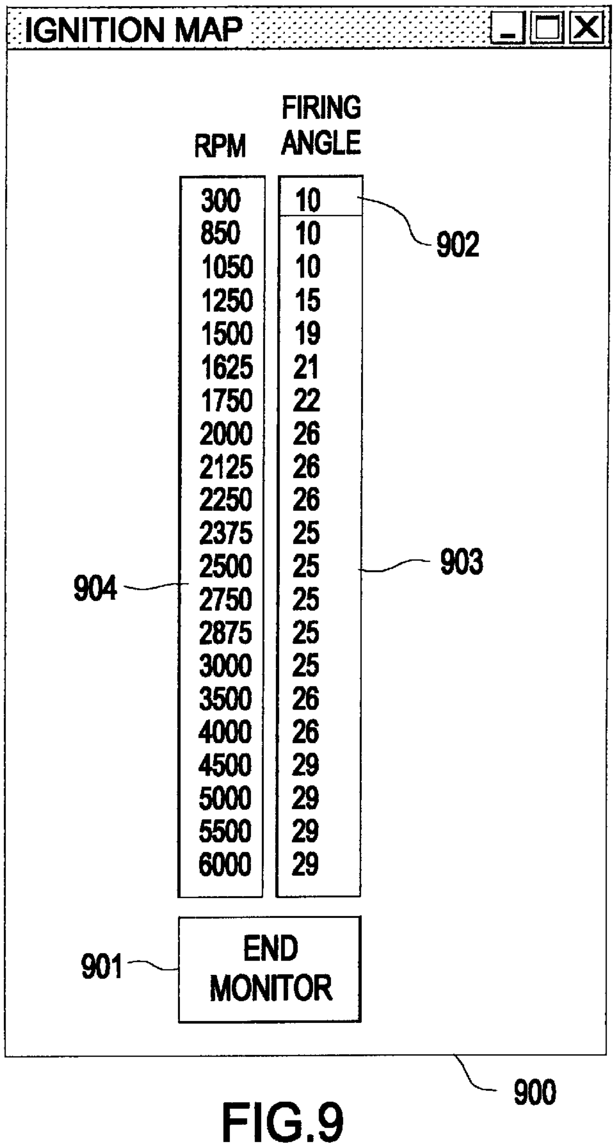
FIG. 9 is a graphic to monitor ignition parameters.

Referring now to FIG. 9 graphic 900 is opened after user selects 2105 (FIG. 21). Ignition map window 900 displays current ECM RPM 904 and firing angle 903 array values stored in memory 25 (FIG. 2). The current firing angle is a function of the instantaneous engine RPM, the highlight box 902 location follows the RPM in real time. Selecting button "OK" 901 closes window 900. This instant invention allows the technician to "see" in real time the spark advance used by the ECM. The user may edit the firing angle with window 2600 (FIG. 26) and reload new values by pressing 2101 (FIG. 21).

Figure 10:
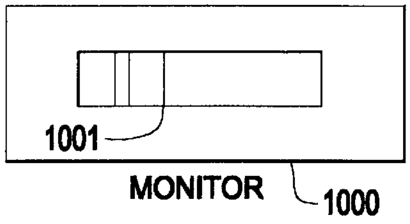
FIG. 10 is a graphic to for sending and receiving control parameters.

FIG. 10 shows screen graphic 1000. Window 1001 displays the progress of data transfers to and from the ECM over communications link 13 (FIG. 1). Window 1000 is activated when sending control parameters 2101, receiving control parameters 2102 and sending fuel map 2108.

Figure 11:
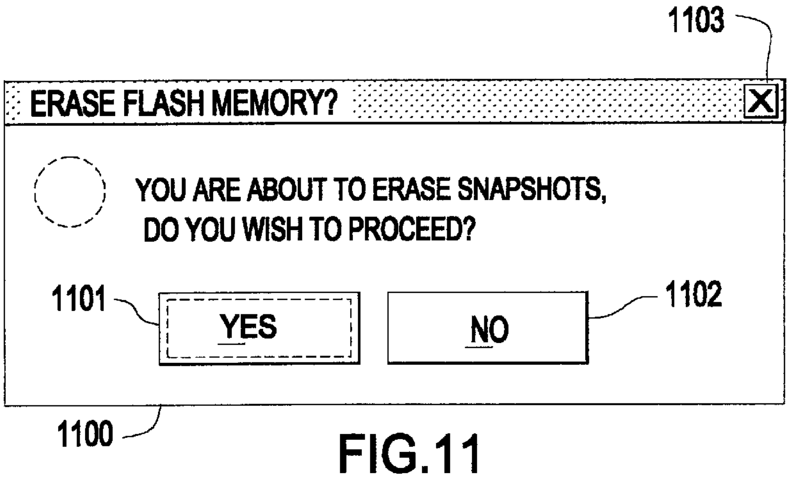
FIG. 11 is a graphic for erase Snapshot data graphic.

Referring next to FIG. 11 a screen graphic is shown. Graphic 1100 is opened after user selects button 2107 (FIG. 21). Window 1100 controls the erasure of snap shot data stored in ECM memory 25 (FIG. 2). Selecting button "No" 1102 closes window 1300. Selecting 1101 sends a command to the ECM 1 over the communication channel 13 (FIG. 1) directing the ECM to clear snap shot data stored in memory 25 (FIG. 2).

Figure 12:
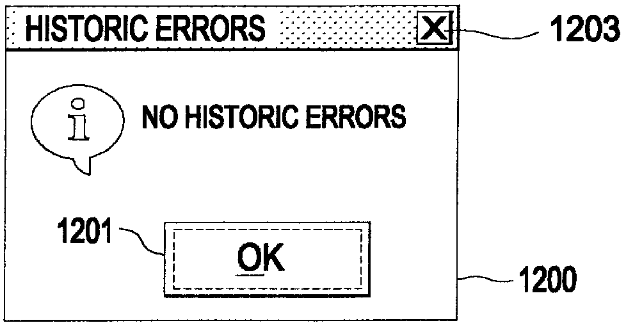
FIG. 12 is a graphic for requesting stored historic errors graphic.

Referring next to FIG. 12 a screen graphic is shown. Graphic 1200 is opened after user selects button 2109 (FIG. 21) requesting stored historic errors if none are to be reported. If errors are present window 1210 (FIG. 12A) will be opened. Window 1100 (FIG. 11) controls the erasure of snap shot data stored in ECM memory 25 (FIG. 2) Selecting button "OK" 1201 or 1203 closes window 1200.

Figure 12A:
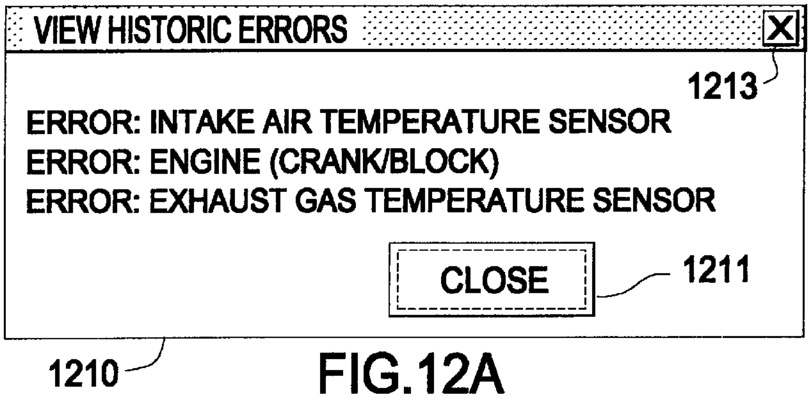
FIG. 12A is a graphic for viewing historic errors.

Referring next to FIG. 12A a screen graphic is shown. Graphic 1210 is opened after user selects button 2109 (FIG. 21) requesting stored historic errors, with errors to be stored are to be reported. If no errors are present window 1200 (FIG. 12) will be opened. Window 1100 (FIG. 11) controls the erasure of snap shot data stored in ECM memory 25 (FIG. 2). Selecting button "OK" 1211 or 1213 closes window 1210. This instant invention is an improvement over prior art as the stored codes are translated into meaningful text messages.

Figure 13:
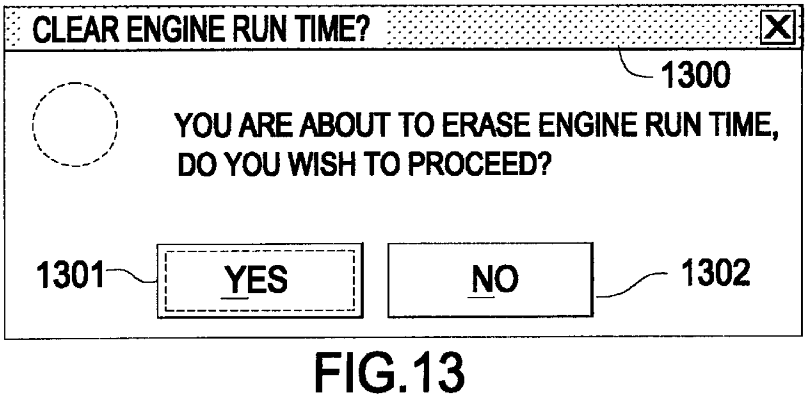
FIG. 13 is a graphic to clear the engine run time errors.

Referring next to FIG. 13 a screen graphic is shown. Graphic 1300 is opened after user selects button 2113 (FIG. 21). Window 1300 controls the erasure of historical runtime data stored in ECM 1 memory 25 (FIG. 2). Selecting button "No" 1302 closes window 1300. Selecting 1301 sends a command to the ECM 1 over the communication channel 13 (FIG. 1) directing the ECM to clear run time data stored in memory 25 (FIG. 2).

Referring now to FIG. 14 graphic 1400 is opened if no ECM errors are stored in the ECM after user selects 2110 (FIG. 21 Selecting button "OK" 1401 closes window 1400.

Figure 14A:
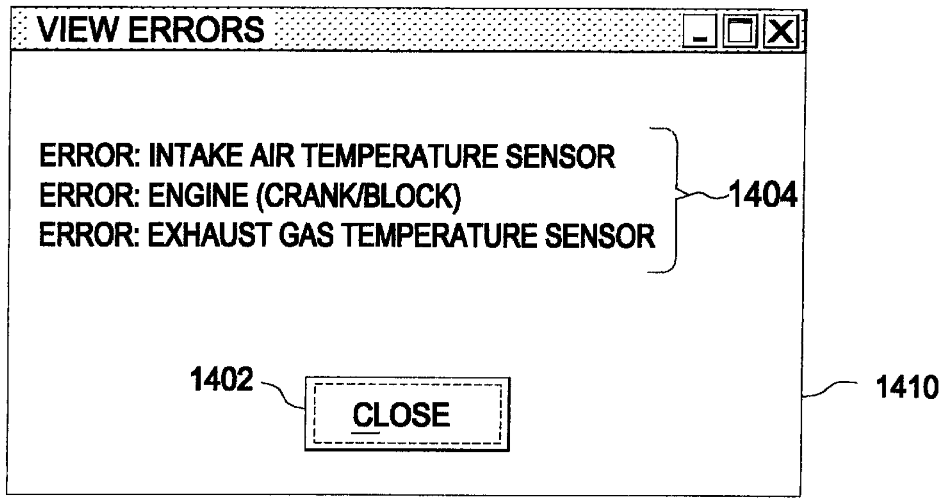
FIG. 14A is a graphic for historic errors.

Referring now to FIG. 14A graphic 1410 is opened if historic ECM errors are stored in the ECM after user selects 2110 (FIG. 21) Current errors are listed in table 1404. Table 2 is a listing of the error codes reported by the ECM.

TABLE 2

| Trouble Code | Fault Condition |
|---|---|
| 11 | Throttle Position Sensor |
| 12 | Barometric Pressure Sensor |
| 14 | Engine Temperature Sensor |
| 15 | Intake Air Temperature Sensor |
| 16 | Battery Positive Voltage |
| 23 | Front Injector |
| 24 | Front Ignition Coil |
| 25 | Rear Ignition Coil |
| 32 | Rear Injector |
| 33 | Fuel Pump Relay |
| 35 | Tachometer |
| 41 | Crankshaft Position Sensor |
| 42 | Camshaft Position Sensor |
| 44 | Bank Angle Sensor |
| 52 | ECM RAM error |
| 53 | ECM ROM error |
| 54 | EEPROM error |
| 55 | Microprocessor Malfunction |
| 56 | Crank/Cam position sensor signal Error |

Selecting button "Close" 1402 closes window 1410.

Figure 15:
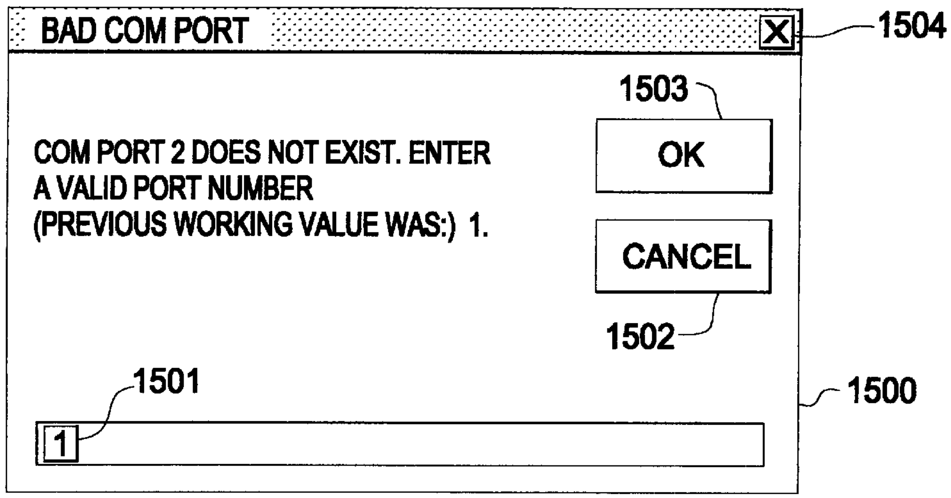
FIG. 15 is a graphic to select communication port.

Referring now to FIG. 15 graphic 1500 is when an error occurs when selecting a communications port. The serial communications is offered by way of example. Window 1501 selects the communications port number. Button 1502 cancels the operation and closes window 1500 with out changing selected communications port 1501. Button 1503 accepts the user input to field 1501. Radio or optical communications offer the same functionality. Selecting button "OK" 1503 or 1504 closes window 1500.

Figure 16:
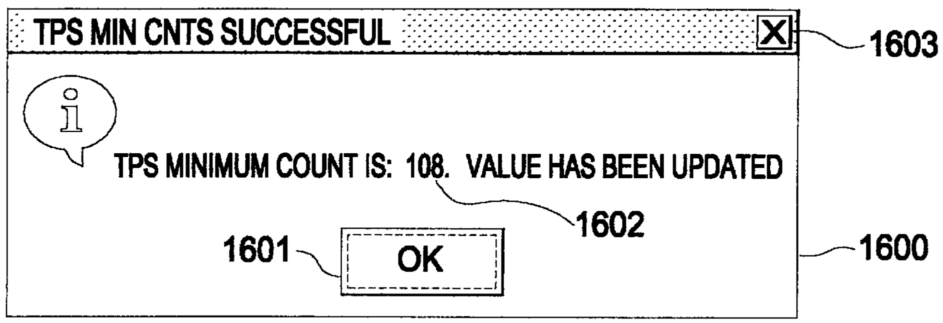
FIG. 16 is a graphic for the minimum throttle position counts.

Referring now to FIG. 16 graphic 1600 is opened after user selects 2116 (FIG. 21). Since it is difficult to install the throttle sensor so that its counts are exactly zero when it is sitting idle, two control parameters are used to handle this offset in the throttle, after it is installed. The installer should choose to monitor engine parameters from the ECM communication menu 2100. The installer should apply full throttle and write down the number of counts being displayed. This reading should then be entered in the control parameter menu 2516. The installer should then send the Get Minimum Throttle Position Counts from ECM command to the ECM 2116. The ECM will set the stepper motor on the throttle then, the TPS analog to digital converter counts are measured and sent back to the host computer, which updates this parameter in the control table 2515. A command is send to the ECM directing the ECM to move the throttle stepper to the minimum mechanical stop and read the throttle position. The reading is transmitted and displayed in position 1602. Window 1600 is closed by selecting button 1601 or 1603.

Figure 17:
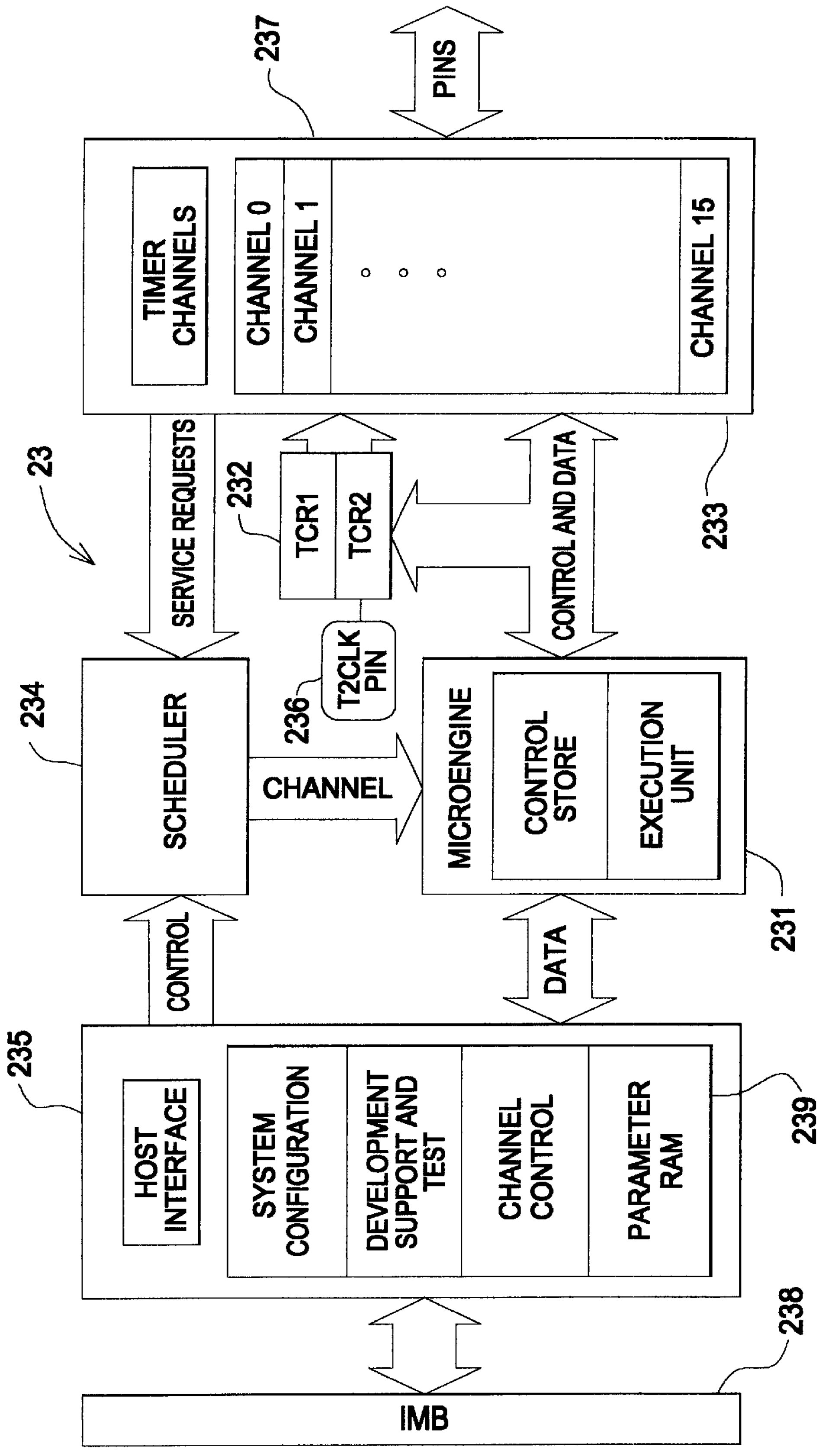
FIG. 17 is a block diagram of the TPU.
Figure 18:
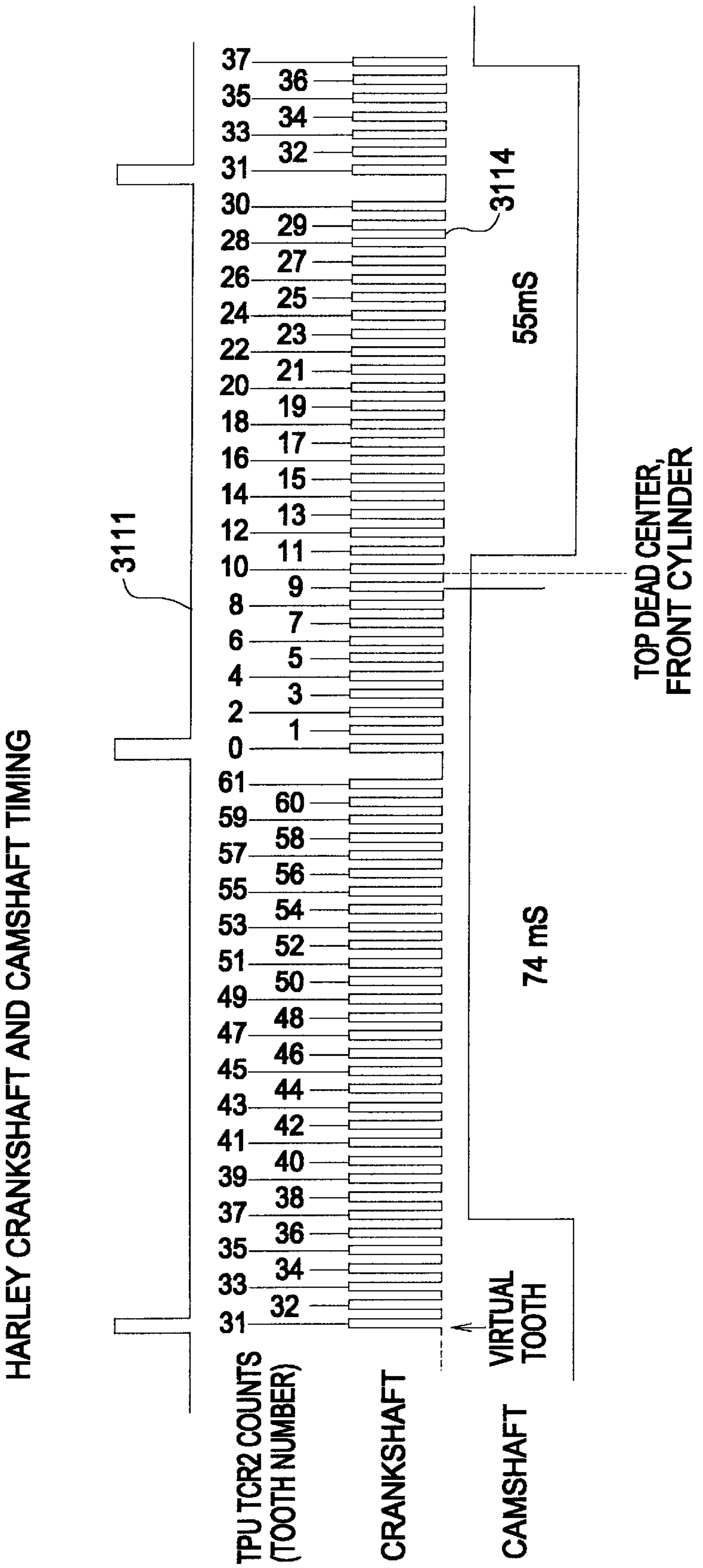
FIG. 18 is a timing diagram of the virtual tooth system.

Referring now to FIG. 17 the Time Processor Unit (TPU) is shown. The time processor unit (TPU) 23 is an intelligent, semi-autonomous microcontroller designed for timing control. Operating simultaneously with the CPU 22, the TPU schedules tasks, processes micro-code ROM instructions, accesses shared data with the CPU 22, and performs input and output functions. FIG. 17 is a simplified block diagram of the TPU. The TPU can be viewed as a special-purpose microcomputer that performs a programmable series of two operations, match and capture as a sub-section to the CPU. Each occurrence of either operation is called an event. A programmed series of events is called a function. The functions replace software functions that would require CPU 22 interrupt service. The TPU 23 consists of two 16-bit time bases 232, sixteen independent timer channels 237, a task scheduler 234, a microengine 231, and a host interface 235. In addition, a dual-ported parameter RAM is used to pass parameters between the module and the CPU 22. Two 16-bit counters provide reference time bases for all output compare and input capture events. Pre-scaler 232 for time bases are controlled by the CPU 22 via bit fields in the TPU module configuration register (TPUMCR). Timer count registers TCR1 and TCR2 provide access to the current counter values. TCR1 and TCR2 232 can be read by TPU microcode, but are not directly available to the CPU 22. The TCR1 clock is derived from the system clock 21 (FIG. 1). The TCR2 clock can be derived from the system clock or from an external clock input via the T2CLK pin 3114. The TCR2 clock input pin is synthesized by external gate 3112. The TPU will not work correctly with more than one missing teeth on the crankshaft clock. This invention is a remedy for this. Allowing the full power of the TPU to be used with multiple missing teeth. FIG. 18 as a timing graphic depicting the missing tooth. FIG. 31A is a schematic of the CPU and missing tooth circuitry. The TPU 23 has 16 independent channels 237, each connected to a CPU 22 pin. The channels have identical hardware. Each channel consists of an event register and pin control logic. The event register contains a 16-bit capture register, a 16-bit compare/match register, and a 16-bit greater-than-or-equal-to comparator. The direction of each pin, either output or input, is determined by the TPU microengine 231. Each channel can either use the same time base for match and capture, or can use one time base for match and the other for capture. When a service request is received, the scheduler 234 determines which TPU channel is serviced by the microengine 231. A channel can request service (interrupt) for one of four reasons: for host service, for a link to another channel, for a match event, or for a capture event. The host system assigns each active channel one of three priorities: high, middle, or low. When multiple service requests are received simultaneously, a priority-scheduling mechanism grants service based on channel number and assigned priority. The microengine 231 is composed of a control store and an execution unit. Control-store ROM holds the microcode for each factory-masked time function. When assigned to a channel by the scheduler, the execution unit executes microcode for a function as signed to that channel by the CPU 22. Microcode can also be executed from the TPU RAM module instead of the control store. The TPURAM allows emulation and development of custom TPU microcode without the generation of a microcode ROM mask. The host interface registers 235 allow communication between the CPU 22 and the TPU 23, both before and during execution of a time function. The registers are accessible from the IMB 238 through the TPU bus interface unit. Parameter RAM 239 occupies 256 bytes at the top of the system address map. Channel parameters are organized as 123 16-bit words. Although all parameter word locations in RAM can be accessed by all channels, only 100 are normally used: channels 0 to 13 use six parameter words, while channels 14 and 15 each use eight parameter words. The CPU 22 specifies function parameters by writing to the appropriate RAM address. All TPU functions are related to one of the two 16-bit time bases Functions are synthesized by combining sequences of match events and capture events. Because the primitives are implemented in hardware, the TPU can determine precisely when a match or capture event occurs, and respond rapidly. An event register for each channel provides for simultaneity of match/capture event occurrences on all channels. When a match or input capture event requiring service occurs, the affected channel generates a service request to the scheduler. The scheduler determines the priority of the request and assigns the channel to the microengine at the first available time. The microengine performs the function defined by the content of the control store or emulation RAM, using parameters from the parameter RAM. Match and capture events are handled by independent channel hardware. This provides an event accuracy of one time-base clock period, regardless of the number of channels that are active. The instant invention is only using a fraction of the TPU capacity for a two-cylinder engine. The Motorola® TPU is offered by way of example and not as limitation. The autonomy of the TPU 22 is enhanced by the ability of a channel to affect the operation of one or more other channels without CPU 22 intervention. Inter-channel communication can be accomplished by issuing a link service request to another channel, by controlling another channel 237 directly, or by accessing the parameter RAM 235 of another channel. The TPU 22 provides a programmable service priority level to each channel. Three priority levels are available. When more than one channel of a given priority requests service at the same time, arbitration is accomplished according to channel number. To prevent a single high-priority channel from permanently blocking other functions, other service requests of the same priority are performed in channel order after the lowest-numbered, highest-priority channel is serviced. When the TPU wins arbitration, it must respond to the CPU 22 interrupt acknowledge cycle by placing an interrupt vector number on the data bus. The output compare function generates a rising edge, a falling edge or a toggle of the previous edge in one of three ways:

1. Immediately upon CPU 32 initiation, thereby generating a pulse with a length equal to a programmable delay time.

2. At a programmable delay time from a user-specified time.

3. As a continuous square wave. Upon receiving a link from a channel, OC references, without CPU 22, interaction, a specifiable period and calculates an offset:

where "RATIO" is a parameter supplied by the user. This algorithm generates a 50% duty-cycle continuous square wave with each high/low time equal to the calculated offset. Due to offset calculation, there is an initial link time before continuous pulse generation begins. The TPU can generate a pulse-width-modulated waveform with any duty cycle from zero to 100% (within the resolution and latency capability of the TPU). To define the PWM, the CPU 22 provides one parameter that indicates the period and another parameter that indicates the high time, Updates to one or both of these parameters can direct the waveform change to take effect immediately, or coherently beginning at the next low-to-high transition of the pin. The fuel injector 7 (FIG. 1) ON time is controlled by The ECM uses the PWM functions of the TPU 22 to modulate the ignition coils and fuel injector.

Synchronized Pulse-Width Modulation (SPWM)

The TPU generates a PWM waveform in which the CPU32 can change the period and or high time at any time. When synchronized to a time function on a second channel, the synchronized PWM low-to-high transitions have a time relationship to transitions on the second channel. The TPU synchronizes the firing of the injectors and spark to the missing teeth of the crankshaft. Parameter 2526 (FIG. 25) controls the "ON" time for the PWM signal. The delay time is a function of the location of the missing teeth, engine RPM, timing advance table 2607, cylinder number and engine type i.e. 2/4 stroke. This function and the following function are used primarily in toothed-wheel speed-sensing applications, such as monitoring rotational speed of an engine. The period measurement with additional transition detect function allows for a special-purpose 23-bit period measurement. It can detect the occurrence of an additional transition (caused by an extra tooth on the sensed wheel) indicated by a period measurement that is less than a programmable ratio of the previous period measurement.

Once detected, this condition can be counted and compared to a programmable number of additional transitions detected before TCR2 is reset to $FFFF. Alternatively, a byte at an address specified by a channel parameter can be read and used as a flag. A non-zero value of the flag indicates that TCR2 is to be reset to $FFFF once the next additional transition is detected.

Period Measurement with Missing Transition Detect (PMM)

Period measurement with missing transition detect allows a special-purpose 23-bit period measurement. It detects the occurrence of a missing transition (caused by a missing tooth on the sensed wheel) indicated by a period measurement that is greater than a programmable ratio of the previous period measurement. Once detected, this condition can be counted and compared to a programmable number of additional transitions detected before TCR2 is reset to $FFFF. In addition, one byte at an address specified by a channel parameter can be read and used as a flag. A non-zero value of the flag indicates that TCR2 is to be reset to $FFFF once the next missing transition is detected.

Position-Synchronized Pulse Generator (PSP)

Any channel of the TPU can generate an output transition or pulse, which is a projection in time based on a reference period previously calculated on another channel. Both TCRs are used in this algorithm: TCR1 is internally clocked, and TCR2 is clocked by the crankshaft sensor. An example of a TCR2 clock source is a sensor that detects special teeth on the flywheel of an automobile using PMA or PMM. The teeth are placed at known degrees of engine rotation; hence, TCR2 is a coarse representation of engine degrees. For example, each count represents some number of degrees. Up to 15 position-synchronized pulse generator function channels can operate with a single input reference channel executing a PMA or PMM input function. The input channel measures and stores the time period between the flywheel teeth and resets TCR2 when the engine reaches a reference position. The output channel uses the period calculated by the input channel to project output transitions at specific engine degrees. Because the flywheel teeth might be 30 or more degrees apart, a fractional multiplication operation resolves down to the desired degrees. Two modes of operation allow pulse length to be determined either by angular position or by time.

Position-Synchronized Pulse Generator (PSP). TPU.

FIG. 18 is the timing diagram for the virtual tooth operation. TPU generates synthetic tooth signal 3111 to be "Ored" with the crankshaft sensor 12 signal 3114. The composite signal 3114 is applied to TPU clock input. With out replacing the missing tooth the TPU will not operate correctly. See FIG. 31A for the electrical schematic. See FIG. 3H for a flow diagram of the virtual tooth software.

FIG. 19 is a table of variables used by the ECM system. Parameter 1902 is the calculated engine rotation period in microseconds variable. Parameter 716 is the crank case temperature 16 variable. Parameter 713 is the intake air temperature. Parameter 715 is the engine head temperature 17 variable. Parameter 715 is the optional exhaust gas temperature 9 variable. Parameter 712 is the internal ECM temperature variable. Parameter 718 is the intake air pressure variable. Parameter 719 is the manifold pressure variable. Parameter 708 is the throttle position percent variable. Parameter 707 is the throttle position 11 variable. Parameter 709 is the injector 8-pulse width variable. Parameter 710 is the fuel map pulse width variable. Parameter 705 is the battery 14 variable. Parameter 704 is the engine run time variable. Parameter 711 is the TDC or cylinder #1 angular location relative to the timing tooth. Parameter 706 is the engine RPM variable. The instant invention gives the technician access to parameter not available in prior art.

Figure 20:
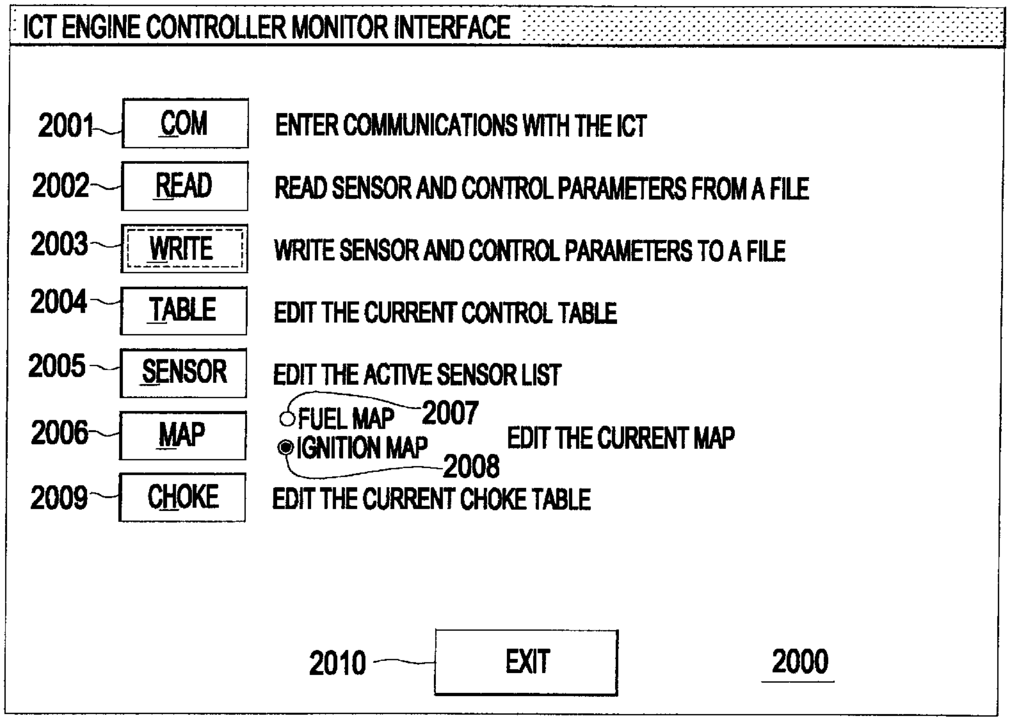
FIG. 20 is a graphic for the main ECM control interface.
Figure 22:
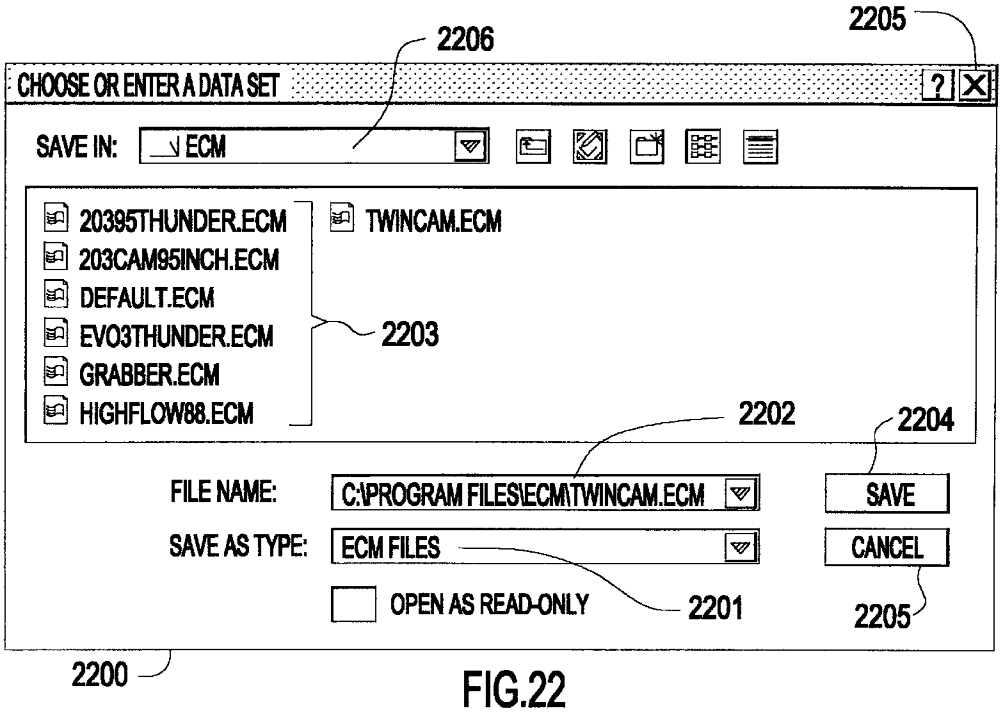
FIG. 22 are graphic interfaces for reading sensor and control files.
Figure 23:
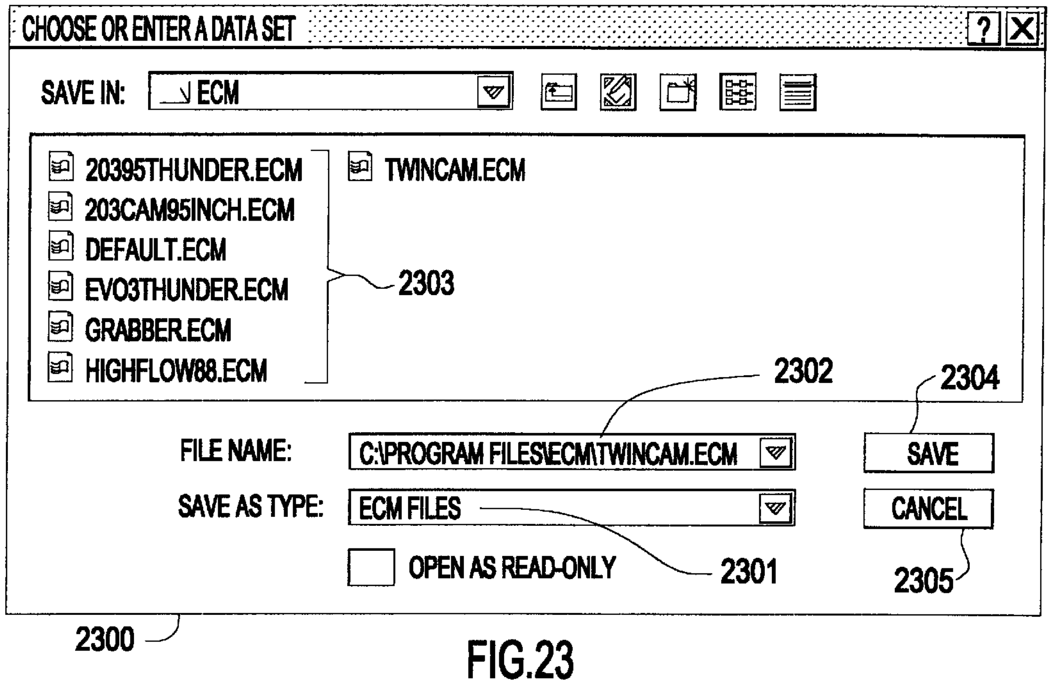
FIG. 23 are graphic interfaces for saving sensor and control files.

FIG. 20 is a GUI controlling the selection of the various ECM tables and file operation described in detail below. Window 2000 allows the user to select the various buttons with mouse or keyboard commands is offered by of example. Closing the graphic windows described below will return the user to the main window 2000. User activation of "Com" Graphic button 2001 opens window 2100 (FIG. 21). User activation of "Read" Graphic button 2002 opens window 2200 (FIG. 22). User activation of "Write" Graphic button 2003 opens window 2300 (FIG. 23). User activation of "Table" Graphic button 2004 opens control table windows 2400 and 2500 (FIGS. 24, 25). User activation of "Sensor" Graphic button 2005 opens window 2700 (FIG. 27). User activation of "Choke" Graphic button 2009 opens window 2900 (FIG. 29). User activation of "Fuel Map" radio button 2007 or "Ignition Map" radio button 2008 determines which map is opened when "Map" 2006 is activated. With "Fuel Map" radio button 2007 selected window 2800 (FIG. 28) is opened, "Ignition Map" radio button 2008 selects window 2600 (FIG. 26). Graphic "Exit" button 2010 closes all open windows 2000 (FIG. 20). Designing the user controls in this manner enables the user to quickly navigate the various data entry windows. Referring next to FIG. 21. Window graphic 2100 directs the user to select the functions to the ECM. Button 2101 directs the computer 1 send the control parameters from windows 2400 (FIG. 24) and 2500 (FIG. 25) to the ECM. A small screen graphic 1000 (FIG. 10) shows the progress of the transfer. Button 2102 directs the computer 3 to read the control parameters from ECM 1 into windows 2400 (FIG. 24) and 2500 (FIG. 25). A small screen graphic 1000 (FIG. 10) shows the progress of the transfer. Button 2103 directs the ECM 1 to upload to computer 3 engine parameters for display in windows 800 (FIG. 8). Button 2104 directs the ECM 1 to upload to computer 3 engine parameters for display in windows 600 (FIG. 6) Button 2105 directs the ECM 1 to upload to computer 3 engine ignition parameters for display in windows 900 (FIG. 9). Button 2106 directs the ECM 1 to upload to computer 3 snap shot parameters for display in windows 700 (FIG. 7). Button 2107 directs the ECM 1 to clear snap shot parameters stored in ECM memory. Button 2108 directs the computer 3 to download fuel map parameters from table 2814 (FIG. 28) to ECM 1. Button 2109 directs the ECM 1 to upload historic errors stored in the ECM errors for display in window 1210 (FIG. 12A), no errors are in memory window 1200 (FIG. 12). Button 2110 directs the ECM 1 to upload current ECM errors for display in window 1410 (FIG. 14A), no errors are in memory window 1400 (FIG. 14). Button 2111 sends a command to the ECM to clear all stored errors. Button 2112 opens window 1500 allowing the user to select the desired communications port. Button 2113 sends a command directing the ECM to clear stored run time data. Button 2114 opens dialog window 1800 (FIG. 18) to down load new firmware to ECM flash memory 26. Button 2115 commands the ECM to upload run time data for display in window 800. Button 2116 commands the ECM to automatically determine the minimum throttle position and return the result for display in window 1600 (FIG. 16).

Referring next to FIG. 22. FIG. 22 is an GUI for reading sensor and control files. Window graphic 2200 is a standard Microsoft® file dialog box. This is offered by way of example and not as limitation, as other file dialog windows offered by Apple®, and Linux® perform the same functionality. Optional box 2201 is used to select the file type or extension in this case "*.ecm". This acts as a filter to allow selection of the specific file extension from list 2203. The desired file may be selected from list 2203 by appropriate key or mouse operations. The selected file name and directory path appears in 2202. The selected directory path appears in 2206. Computer 3 Mouse or key operations to activate button 2204 will open the file selected in 2202 or return an error message. Mouse or key operations to activate button 2205 will cancel the read file operation and close window 2200 returning user to main window 2000 (FIG. 20). Reading the file into memory updates choke table 2900 (FIG. 29) sensor table 2300 (FIG. 23), ignition map 2600 (FIG. 26), control table page one 2400 (FIG. 24), control table page two 2500 (FIG. 25), fuel map 2800 (FIG. 28) sensor table 2700 (FIG. 27).

Referring next to FIG. 23. FIG. 23 is a GUI for saving sensor and control files to disc. Window graphic 2300 is a standard Microsoft file open dialog box. This is offered by way of example and not as limitation, as other file dialog windows offered by Apple®, and Linux® perform the same functionality. Optional box 2301 is used to select the file type or extension in this case "*.ecm". This acts as a filter to allow selection of the specific file extension from list 2303. The desired file name may be saved from list 2303 by appropriate key or mouse operations. The selected file name and directory path appears in 2302. Computer 3 Mouse or key operations to activate button 2304 will write the file selected in 2302 or return an error message. Mouse or key operations to activate button 2305 will cancel the write file operation and close window 2300 returning user to main window 2000 (FIG. 20). Current parameters loaded choke table 2900 (FIG. 29), sensor table 2300 (FIG. 23) ignition map 2600 (FIG. 26), control table page one 2400 (FIG. 24), control table page two 2500 (FIG. 25), fuel map 2800 (FIG. 28) and sensor table 2700 (FIG. 27) are written to selected file.

FIG. 24 is a GUI for editing page 2 of control Table. Window 2400 is opened when commanded by button 2004 from window 2000 (FIG. 20). Parameters to be modified are uploaded from ECM 1 or read from disc files detailed in FIG. 22, loading parameters 2403, 2404, 2405 and 2606 into memory. Injector voltage compensation entries in table 2404 may be edited by mouse/key strokes. Compensating the injector performance for low battery voltage gives the user capability not available in prior art. The number of teeth on the crank shaft is determined by the specific engine manufacture parameter "Number of Teeth" in cell 2406 and "number of missing teeth" cell 2405 may be edited. More than one missing tooth is unique to Harley Davidson®. The TPU 23 with novel 3112 (FIG. 31A) circuitry generates one or more "virtual teeth". If the engine has a device such as a turbo-charger parameter 2403 sets the percent enrichment per Millbar boost (see FIG. 30). Pressing the "Accept" button 2401 saves the edited values into the computers 3 local memory and closes window 2400. Pressing the "Cancel" button 2402 closes window 2400 without saving parameter changes. Edited parameters may be saved to disc and or transmitted to the ECM. FIG. 21 controls communications with the ECM 1. Parameters 2406, 2404, 2403 and 2405 are loaded into EEPROM for storage and into RAM for execution next time the engine is started. FIG. 23 details saving parameters to disc files. The instant invention provides the technician/user full control of critical parameters allowing ECM 1 to be installed on virtually any Internal combustion engine. Parameters 2406 and 2405 are used in FIG. 31 to compute engine timing and in generation of the "missing tooth". Thus giving the technician an easy to use GUI with the capability to modify and monitor previously unavailable critical operating parameters. In addition the ability to save parameters to disc and download to the ECM.

FIG. 25 is a GUI for editing page one of control Table. Window 2500 is opened when commanded by button 2004 from window 2000 (FIG. 20). Parameters to be modified are uploaded from ECM 1 or read from disc files detailed in FIG. 22, loading parameters 2503–2525 into memory. All parameter entries may be edited by mouse/key strokes. Parameter "Number of Cylinders" 2502 configures the number of cylinders/injectors in the engine. Parameter 2502 also enables the required cells and disables extra parameter cells 2518–2525. The maximum number of cylinders/injectors is offered as four, this is offered by way of example and not as a limitation. Depending on the specific engine geometry the technician enters the starting angle for firing each injector. For engines that support multiple injectors per cylinder the technician may enter the number of cylinders times the number of injectors per cylinder into parameter 2502. The technician may assign any "injector pulse angle" parameter 2517–2521 to installed injectors. The technician typically adjusts injector timing to coincide with maximum intake-port air velocity. The parameter angle range is in the range 0–720 degrees to accommodate a four-cycle engines, 0–360 degrees for two cycle engines. The flexible ignition and injector timing implementation is a substantial improvement over prior art. Making the instant invention easily adaptable to any internal combustion engine. Like wise the technician enters the "top dead center" angle for each cylinder. This is commonly known as the top of the compression cycle. This angle is converted to number teeth and fractions of a "tooth" for use by the TPU 23. The TPU uses this reference angle in calculations regarding ignition timing in detailed in FIG. 31. Parameter 2526 is the dwell time in milli-seconds for the ignition coil to charge, this number is published by the coil manufactures. Allowing the user to replace (stock) factory coils with higher performance devices and to modify parameter 2526 for maximum spark energy with minimal coil heating is an improvement over prior art. Parameter "maximum throttle slew rate" 2517 limits the throttle command rate of change to a fixed percent change per second. Parameter 2517 may be set to a larger value for racing and lower for city operation. Parameter 2516 "Maximum throttle counts" sets the maximum throttle command to the fuel control loop. This may be used as an auxiliary speed/RPM limiter used in conjunction with parameter 2514. Parameter 2515 "Minimum throttle counts" sets the minimum throttle command to the fuel control loop typically used to set the idle RPM. Parameter 2514 "Maximum throttle counts" sets the maximum RPM above this speed the ECM 1 turns off the fuel and spark to the second cylinder thus limiting the engine speed. Normal operation resumes once the RPM drops below the value set by 2514. Note for single cylinder engines the fuel and spark would be disabled until the RPM was below 2514. Parameter "Maximum pulse width" 2503 sets the length or duration in microseconds the injector is opened during priming. This is used in conjunction with parameter 2504 "Maximum Number of Primes" to insure starting with out "flooding" the engine. Priming is accomplished by turning on the ECM without turning the engine over. Each time the throttle is squeezed from fully closed too nearly fully open, the fuel. pump will be turned on and the injectors will be opened for the duration specified in the control parameter 2503. In this way the operator can prime the engine by squeezing and releasing the throttle. The ECM will count how many priming pulses it has delivered. If the number goes over maximum as set by parameter 2504, it will shut off the fuel pump and return to the state it was in before priming began. Parameter 2505 "Maximum temperature before enrichment" is used with parameters 2506 and 2507. If either the head 103 or exhaust gas temperatures 104 goes over maximum 2505, the ECM 1 will enrich the engine with more fuel to try and bring the temperature back into operating range. If a temperature is sensed over maximum, the ECM continues to calculate the injector pulse width as always, except it increases the width by the percent enrichment factor 2506 or 2507. As the temperature increases, so does the fuel enrichment, causing the engine temperature to decrease. When the temperature returns to below the maximum specified, no fuel enrichment occurs. (see FIG. 30A). Parameter 2510 "choke release RPM" works with the choke parameters detailed in FIG. 29. The technician enters the desired RPM that turns off the choke enrichment into 2510. FIG. 30A details the fuel-metering algorithm. Parameter 2801 "Fuel map multiplication factor" allows the technician to scale the entire fuel map 2814 (FIG. 28) by this constant. This parameter is also found on FIG. 28, the parameter that may be edited in ether location. Parameters in table 2814 may also be changed in real time while the engine is running as detailed in FIG. 28. Parameter 2512 "Minimum Injector pulse width" sets the time in microseconds required to just open a particular manufacture injector. Parameter 2513 "Maximum Injector pulse width" sets the time in microseconds allowed on for a particular manufacture injector. Pressing the "Accept" button 2501 saves the edited values into the computers 3 local memory and closes window 2500. Pressing the "Cancel" button 2502 closes window 2500 without saving parameter changes. Edited parameters may be saved to disc and or transmitted to the ECM. FIG. 21 controls communications with the ECM 1. Parameters 2503–2525 are loaded into EEPROM for storage and into RAM for execution next time the engine is started. FIG. 23 details saving parameters to disc files. The instant invention provides the technician/user full control of critical parameters allowing ECM 1 to be installed on virtually any internal combustion engine. Thus giving the technician an easy to use GUI with the capability to modify and monitor previously unavailable in prior art critical operating parameters. In addition the ability to save parameters to disc and download to the ECM 1.

FIG. 26 is a GUI for editing ignition-timing settings. Window 2600 is opened when commanded by button 2006 when radio button 2008 is selected from window 2000 (FIG. 20). Parameters to be modified are uploaded from ECM 1 or read from disc files detailed in FIG. 22, loading parameter tables 2606 and 2607. Engine speed (RPM) entries in table 2606 may be edited by mouse/key strokes. The user may insert additional rows in tables 2606 and 2607 by selecting a table entry and pressing "Insert Row" 2602. Likewise the user may delete rows in tables 2606 and 2607 by selecting a table entry and pressing "Delete Row" 2604. Giving the user full editing capability not available in prior art. This editing capability allows the user to fine-tune the ignition timing at any RPM. The user may inspect and edit the "RPM" entry in table 2606 and corresponding "Firing Angle" entry 2907. Pressing the "Accept" button 2601 saves the edited values into the computers 3 local memory and closes window 2600. Pressing the "Cancel" button 2605 exits window 2600 without saving parameter changes. Edited parameters may be saved to disc and or sent to the ECM. FIG. 21 controls communications with the ECM 1. FIG. 23 details saving parameters to disc files. The technician/user has full control of all the parameters giving adjustment control previously unavailable in prior art. Tables 2606 and 2607 are loaded into EEPROM for storage and into RAM for execution. This editing capability allows the user to fine-tune the ignition timing at any RPM. The user may inspect and edit the "RPM" entry in table 2606 and corresponding "Firing Angle" entry 2907. Pressing the "Accept" button 2601 saves the edited values into the computers 3 local memory and closes window 2600. Pressing the "Cancel" button 2605 exits window 2600 without saving parameter changes. Edited parameters may be saved to disc and or sent to the ECM. FIG. 21 controls communications with the ECM 1. FIG. 23 details saving parameters to disc files. The technician/user has full control of all the parameters giving adjustment control previously unavailable in prior art. Tables 2606 and 2607 are loaded into EEPROM for storage and into RAM for execution. The instant invention converts the commonly accepted RPM and "firing angle" into tooth number and fraction of a "tooth" used by the TPU 23. This reduces the computational load on the ECM 1 while giving precise engine timing. Thus giving the technician an easy to use GUI with the capability to modify and monitor previously unavailable critical operating parameters. In addition the ability to save parameters to disc and download to the ECM while the engine is running. The instant invention converts the commonly accepted RPM and "firing angle" into tooth number and fraction of a "tooth" used by the TPU 23. This reduces the computational load on the ECM CPU 22 while giving precise engine timing. Thus giving the technician an easy to use GUI with the capability to modify and monitor previously unavailable critical operating parameters. In addition, the ability to save parameters to disc, download new parameters to the ECM while the engine is running. Gone are the days of timing lights.

FIG. 27 is a screen graphic for selecting and calibrating the various sensors. Graphic 2700 allows the technician to add, delete, and change installed engine sensors. This may be required to replace sensors that are not available. Add a sensor that was not installed on the "stock" factory engine. Or remove a sensor such as the bank angle sensor 2714. That may not be installed for non-motorcycle applications. Pull down 2724 or horizontal 2704 menu allows the user to select from the available TPS sensors. Fields 2704A, 2704B, 2704C allow the user to set the minimum, maximum and default values for the TPS sensor respectively. Pull down 2725 or horizontal 2705 menu allows the user to select from the available MAP sensors. Fields 2705A, 2705B, 2705C allow the user to set the minimum, maximum and default values for the MAP sensor respectively. Pull down 2726 or horizontal 2706 menu allows the user to select from the available RAM sensors. Fields 2706A, 2706B, 2706C allow the user to set the minimum, maximum and default values for the RAM sensor respectively. Pull down 2727 or horizontal 2707 menu allows the user to select from the available BARO sensors. Fields 2707A, 2707B, 2707C allow the user to set the minimum, maximum and default values for the BARO sensor respectively. Pull down 2728 or horizontal 2708 menu allows the user to select from the available IAT sensors. Fields 2708A, 2708B, 2708C allow the user to set the minimum, maximum and default values for the IAT sensor respectively. Pull down 2729 or horizontal 2709 menu allows the user to select from the available HT sensors. Fields 2709A, 2709B, 2709C allow the user to set the minimum, maximum and default values for the HT sensor respectively. Pull down 2730 or horizontal 2710 menu allows the user to select from the available EGT sensors. Fields 2710A, 2710B, 2710C allow the user to set the minimum, maximum and default values for the EGT sensor respectively. Pull down 2731 or horizontal 2711 menu allows the user to select from the available Crank Case temperature sensors. The following digital sensors require no calibration. Pull down 2732 or horizontal 2712 menu allows the user to select from the available Crank position sensors. Pull down 2733 or horizontal 2713 menu allows the user to select from the available cam position sensors. Pull down 2734 or horizontal 2714 menu allows the user to select from the available bank angle sensors. Button 2702 opens the "Unit Converter" window tool 500 (FIG. 5). The unit "Unit Converter" too is useful when setting up the sensor range fields. Button 2703 stops all editing activities and does not save any of the changes. Button 2701 accepts the changes and saves the parameters for down loading to the ECM or saving to file. Window 2100 (FIG. 21) controls ECM communication button 2101 sends the new parameters to the ECM. The instant inventions give the technician the unique ability to add, change or delete all engine sensors. In addition analog sensors may be calibrated to compensate for sensor drift or replacement. In addition default values of analog sensors may be edited. This is a significant improvement over prior art were the engine controller reported defective sensors. The flexible sensor configuration allows the ECM to be quickly adapted to virtually any internal combustion engine type, or allowing upgrading to premium sensors for special requirements.

FIG. 28 is a GUI for editing the fuel map settings. Window 2800 is opened when commanded by button 2006 when radio button 2007 is selected from window 2000 (FIG. 20). Parameters to be modified are uploaded from ECM 1 or read from disc files detailed in (FIG. 22) loading parameter tables 2813, 2814 and 2815. All Engine speed (RPM) entries in arrays 2813. 2814 and 2815 may be edited by mouse/key strokes. Also the user may insert additional rows in tables 2813 and 2814 by selecting a array entry and pressing "Insert Row" 2808 to a maximum of "16". The maximum number of rows and columns is offered by way of example and not as a limitation. These limits are somewhat arbitrary and were selected to handle most common engines. Likewise the user may delete rows in tables 2213 and 2814 by selecting a table entry and pressing "Delete Row" 2809 to a minimum of "5". Also the user may insert additional columns in tables 2815 and 2814 by selecting an array entry and pressing "Insert Column" 2810 to a maximum of "26". The maximum number of rows and columns is offered by way of example and not as a limitation. These limits are somewhat arbitrary and were selected to handle most common engines. Likewise the user may delete columns in tables 2815 and 2814 by selecting a table entry and pressing "Delete Column" 2811 to a minimum of "7". Like wise the minimum number of rows and columns is offered by way of example and not as a limitation, When the ECM operates, it reads the fuel map from its EEPROM loads to RAM and scales it by the fuel map multiplication factor 2801. The scale factor is given in percent so a value of 100 means the fuel map will be unchanged, a value greater than 100 will increase the time of each fuel map entry and a number less than 100 will decrease the time of each entry. Each time the ECM calculates an injector pulse width, it checks the calculated width versus the minimum and maximum injector pulse widths given in the control parameter table. If the calculated value is below minimum, the given minimum will be used. If it is above maximum, the given maximum will be used. This prevents the injector from operating outside of optimal ranges. The extensive online editing capability gives the technician control of the fuel delivery not available in prior art. With a dynamometer the technician may optimize the engine over its full operating range. Also Unique to this instant invention is the variable RPM 2815 and Throttle 2813 indices. This is particularly useful as most IC engines do not have a linear power curve. The ability to edit the indexing to the fuel map allows the ECM to be adapted to engines with narrow power bands. Or to optimize an engine for maxim efficiency over a narrow RPM range. Additionally each injector may be assigned a custom map or scaled from a common map 2814. The ability to optimize and tune critical parameters at important speeds/RPM is unique. Coupled with the ability to fine tune the timing 2600 (FIG. 26.) gives the designer or technician a powerful tool for optimizing engine performance previously unavailable.

FIG. 29 is a GUI for editing choke settings. Window 2900 is opened when commanded by button 2009 from window 2000 (FIG. 20). Parameters to be modified are uploaded from ECM 1 or read from disc files detailed in FIG. 22, loading parameter tables 2903, 2904, and 2905. Head Temperature (HT) entries in table 2903 may be edited by mouse/key strokes. The user may edit the corresponding percent Fuel Enrichment value in table 2904 and Throttle Position Zero counts in table 2905. Pressing the "Accept" button 2901 saves the edited values into the computers 3 local memory and closes window 2900. Pressing the "Cancel" button 2902 exits window 2900 without saving parameter changes. Edited parameters may be saved to disc and or sent to the ECM. FIG. 21 controls communications with the ECM 1. FIG. 23 details saving parameters to disc files. The technician/user has full control of all the parameters giving adjustment control previously not available in prior art. Tables 2903, 2904 and 2905 are loaded into EEPROM for storage and into RAM for execution. Current engine temperature is looked up in table 2903, the corresponding idle motor stepper position from table 2905 is sent to stepper motor 6. Unlike prior art the technician may precisely adjust the idle and enrichment from cold to hot engine. This instant invention does not over choke a warm or hot engine. Like wise the percent Fuel Enrichment may be precisely controlled as a function of Head Temperature (HT). Typically the mixture as enriched at low HT and no additional enrichment is needed once temperature is reached, detailed in (FIG. 30). The instant invention gives the technician an easy to use GUI, with the capability to modify and monitor previously unavailable critical operating parameters. In addition the ability to save parameters to disc and download to the ECM while the engine is running. Each time the head temperature is measured, it is checked to see if it is over this maximum level. If it is, no choking will take place. It the temperature is below maximum, the engine RPMS are checked to see if they are greater than the choke release RPM given in the control parameters table. If the RPMs are greater than the choke release RPMs given, no choking will take place. If the head temperature is below maximum and the RPMs are below the choke release RPMs, the choke enrichment table is entered using the head temperature. The corresponding percent of enrichment given is used to increase the injector pulse width and hence choke the engine. The choke table is 10 by 3 with the first column 2903 being the head temperature and the second column 2904 being the percent enrichment, where 100 in this field results in no change to the injector pulse times. The choke table lists the percent enrichment for the engine versus the head temperature.

The third column 2905 in the table is throttle position idle settings. For each head temperature value given, the column 2905 contains the number of counts a stepper motor attached to the throttle should advance, thus limiting the lowest value the throttle position sensor can put out. This effectively holds the throttle open some amount, so that more fuel will be given to the engine, during cases of low temperature, at idle.

Figure 29A:
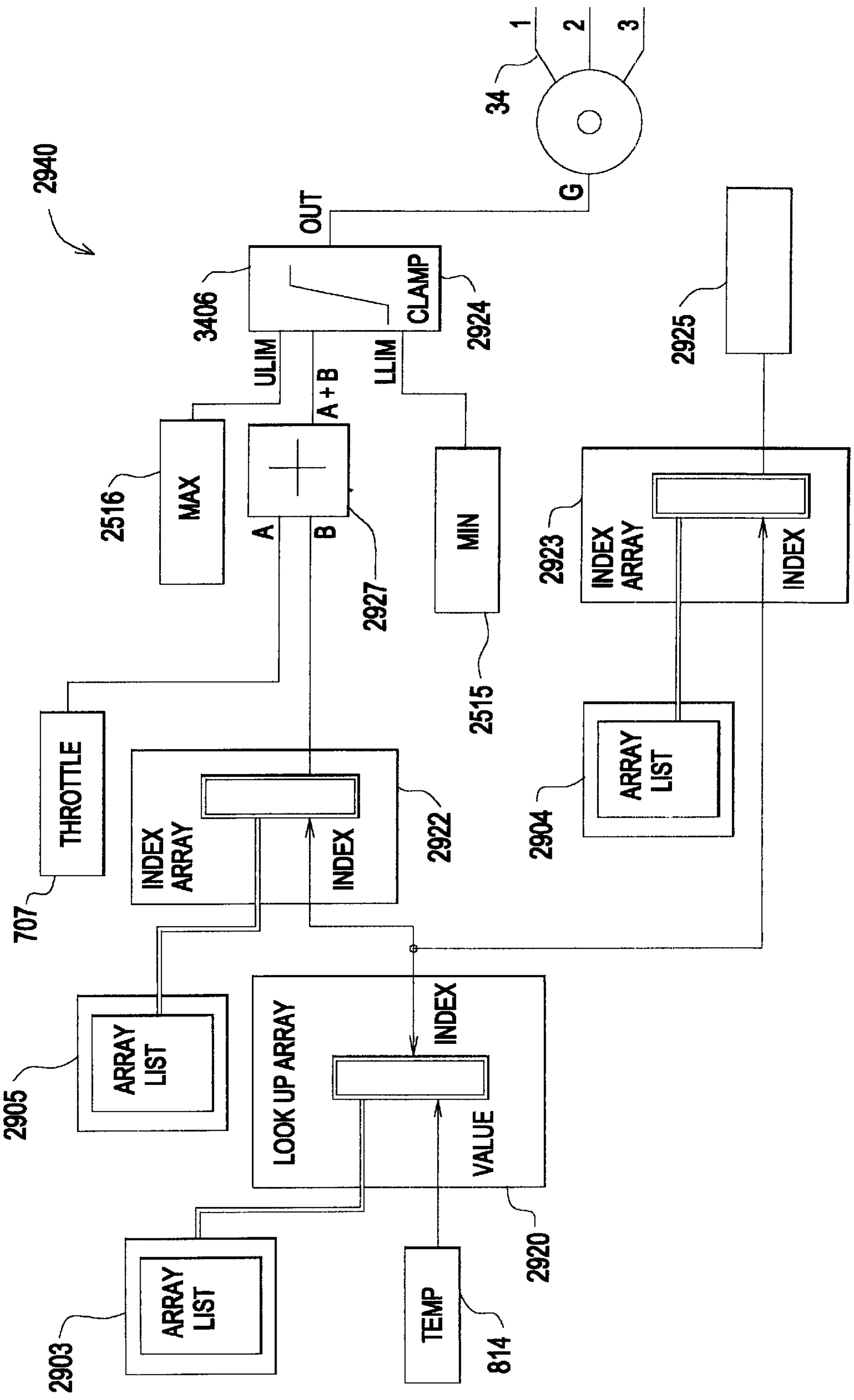
FIG. 29A is a data flow diagram of the choke compensation system.

FIG. 29A is a data flow diagram 2940 of the choke operation. ADC 27 reads engine temperature sensor 17. Sensor type selection via 2709, parameters 2709A and 2709B are used to calibrate the engine temperature reading 814. Temperature mapping array 2903 is searched by look up operation 2920 for a greater than or equal to temperature 814. The index or location of the match from 2920 is used to index arrays 2905 and 2904. Operation 2923 reads the fuel enrichment value from array 2904. The choke enrichment value 2925 is used in FIG. 30A in the calculation of the injector drive. Operation 2922 reads the throttle offset value from array 2905. Operation 2927 adds the offset to the current throttle position 707. Operation 2924 checks the calculated throttle position against maximum value 2516 and minimum throttle values 2515. The throttle position or appropriate limit value is transmitted to the stepper motor driver 34. The instant invention gives the user the ability to fine tune the low temperature enrichment and precise throttle valve control.

FIGS. 30 and 30A are data flow diagrams detailing the fuel algorithm. Air pressure sensor 10 is digitized by ADC 27 scaled to engineering units in block 3023 to variable 717. Air pressure 717 is multiplied by 100 by 3006 then divided by 2991 in 3007. Block 3001 multiplies "fuel map multiplier" 2801 with the resulting quotient from 3007. Product of 3001 is divided by 100 in block 3002. The use of integer math is performed for execution speed reasons not as a limitation. As other more expensive CPU's with floating point capability could be used to achieve substantially similar results. Air pressure sensor 15 is digitized by ADC 27 scaled to engineering units in block 3024 to "air temperature" variable 813. Air temperature in centigrade 813 is added to 273 by 3008 then divided by 27300 in 3012. The resulting quotient is multiplied by the quotient from 3002 in block 3003. Product 3003 is divided by constant 100 in block 3009. Head/water temperature sensor 9 is digitized by ADC 27 scaled to engineering units in block 3007 to "Head temperature" variable 814. Exhaust temperature 16 is digitized by ABC 27 scaled to engineering units in block 3010 to "EGT" variable 815. If EGT sensor is installed software switch 2710 selects EGT sensor data 815 else it defaults to the Head/water temperature 814 (See Sensor Select FIG. 27). HT or EGT in centigrade is subtracted from 2505 (FIG. 25) "Max temperature before enrichment" by 3014. Limit Block 3015 returns the difference or "1" for a negative difference. If the EGT sensor is installed switch 3027 selects user defined enrichment factor parameters 2506 or 2507 (FIG. 25). The difference from 3015 is multiplied by selected "% enrichment/(Degree)" parameter 2506 or 2507 the resulting product 3012 is then divided by 100 in 3013. The resulting quotient from 3013 is multiplied by the quotient from 3009 in block 3016. The choke enrichment computed in 2925 (FIG. 29A). The "Fuel enrichment" value is presented to switch 3019. RPM as read by crankshaft sensor 12 and computed by TPU 23 into variable 706 is compared to "choke release RPM" parameter 2510 in block 3018. If RPM 706 is greater than 2510 the computed choke enrichment from 2925 is selected by 3019 else "100" is selected (no enrichment). The product from 3016 is multiplied by the "Choke Fuel enrichment" factor in 3017. The resulting product of 3017 is divided or scaled by "100" in block 3004. The computation of the fuel is continued in FIG. 30A. The source code is found in computer program listing appendix. The user programmable sensor selection and calibration is new to the art. Referring to FIG. 30A. FIG. 30A is the continuation of FIG. 30. Throttle position sensor (TPS) 11 is digitized by ABC 27 output of ABC is applied to input limit block 3053. Output of 3053 is limited by "minimum throttle counts" 2515 and "maximum throttle counts" 2516. Current throttle position is subtracted from the previous reading stored in delay block 3054 in operation 3055. Operation 3056 limits the maximum rate of change in throttle position to the value 3051. Constant 3051 is computed from the user programmable maximum throttle slew rate 2517 (FIG. 25). Output of 3056 supplies the internal RPM value 707 used in various calculations and for display and data logging. Array 2813 is indexed in operation 3032 by instantaneous throttle position 707. Array 2815 is indexed in operation 3031 by Instantaneous RPM 706. Operations 3031 and 3032 allow custom mapping or indexing into the fuel map 2814. Indexing operation 3033 uses the index values from 3031 and 3032 to look up the instantaneous fuel map value. The current cylinder 3111 is used to index fuel map multiplication factor array 2801. This allows each injector to have a unique scaling factor for each injector. This feature may be used to compensate for injector cylinder displacement or cylinder temperature. The output of index operation 3032 is multiplied by the current fuel map value in operation 3034 resulting product 3034 is scaled by 100 in operation 3033. Battery voltage 705 indexes injector battery compensation array 2404 in operation 3035. The output of operation 3035 is multiplied by the battery correction in operation 3030. Product 3030 is scaled by 100 in operation 3036. The interim fuel compensation value 3005 from FIG. 30 is multiplied by the output of 3036 in 3037. Operation 3038 scales the output of 3037 by 100. Output of 3030 is scaled by 100 in operation 3036. Operation 3037 multiplies the interim product 3005 and output of 3036. Operation 3038 scales product 3037 by 100. Operation 3062 multiplies the interim injector value 3038 by 256. Operation 3063 scales the product 3062 output by 100. Operation 3066 limits the output of 3063 within "minimum injector" 2512 and "maximum injector" 2513. The TPU 23 automatically updates internal counters to output buffers 31 to drive injector(s) 8. The user program the limits of the injectors keeping the injectors within optimal operating ranges. Interim injector value 3005 is multiplied by 3030 fuel (FIG. 30A) as measured by ADC is looked up in array 2903 the percent Fuel Enrichment is linearly interpolated between corresponding entries in array 2904 the resulting Fuel Enrichment value 710 is used compute the final injector on time. Output of 3066 is limited by "minimum injector" 2512 and "maximum injector" 2513. Current throttle position 121 is subtracted from the previous reading stored in delay block 354. The difference output of 355 is applied to lower limit and input of block 356. Upper limit of 356 is provided by the output quotient of 351. In this way the maximum rate if change in throttle command may be limited. This rate is given in the maximum throttle slew rate control parameter. Each time the throttle position is read it is compared to the previous reading. If the position has changed at a greater rate than allowed, the throttle position used to index into the fuel map will be the previous position plus the maximum it is allowed to change in the time since the last reading. This slew rate is for increasing throttle position only and does not apply to decreasing throttle position.

Figure 31:
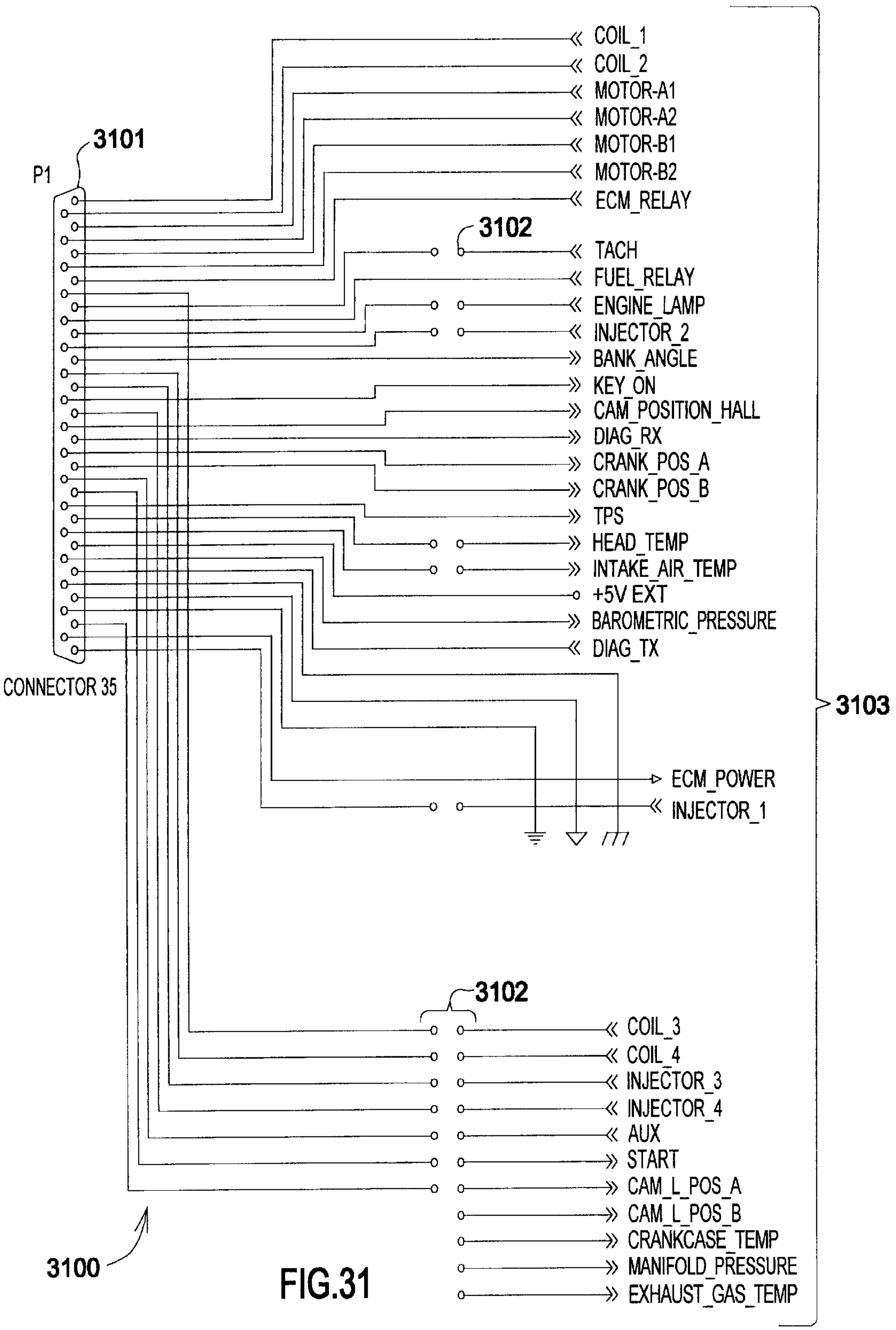
FIGS. 31, 31A–F is the schematic drawing of the ECM.
Figure 31A:
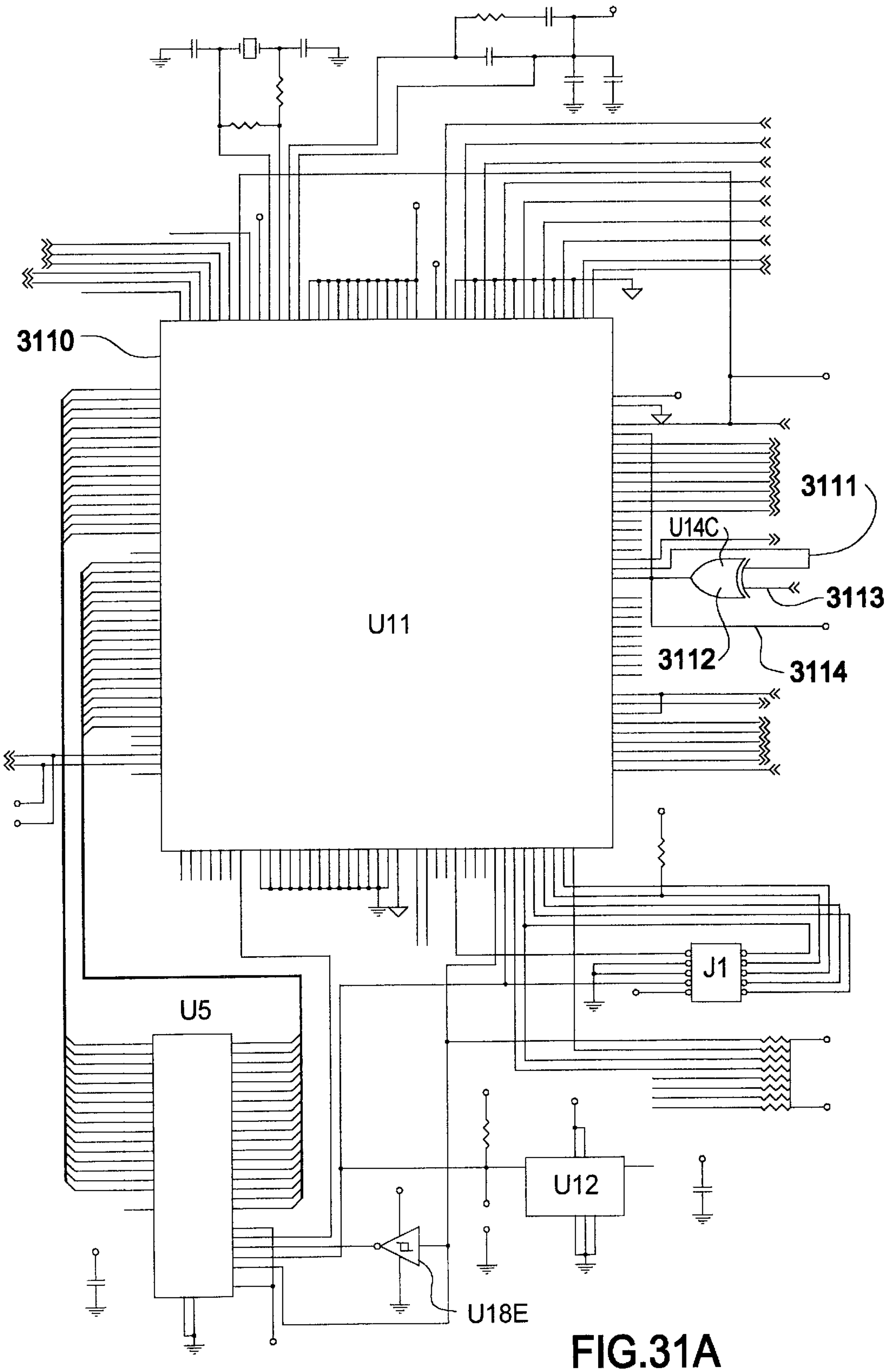
Figure 31B:
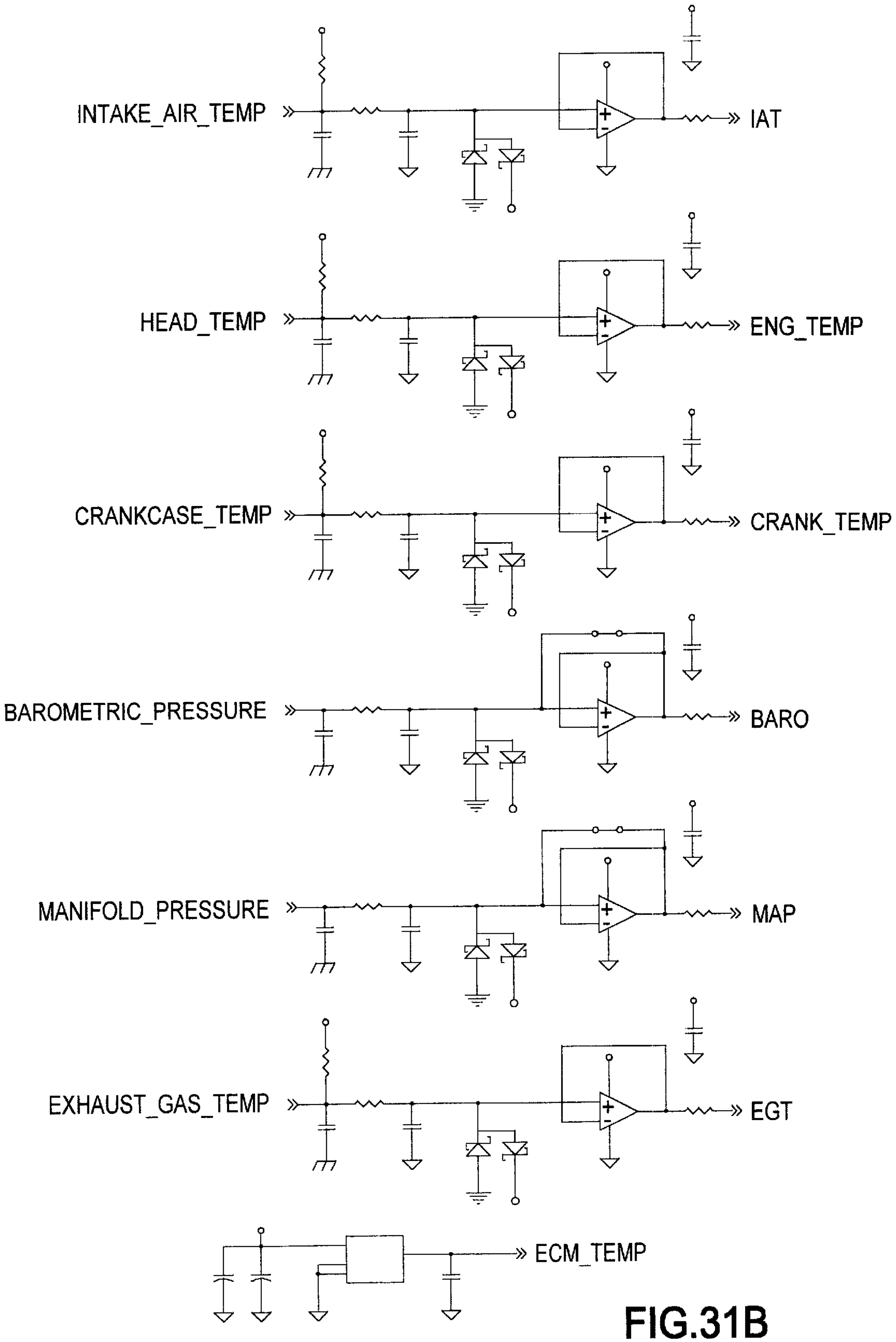
Figure 31C:
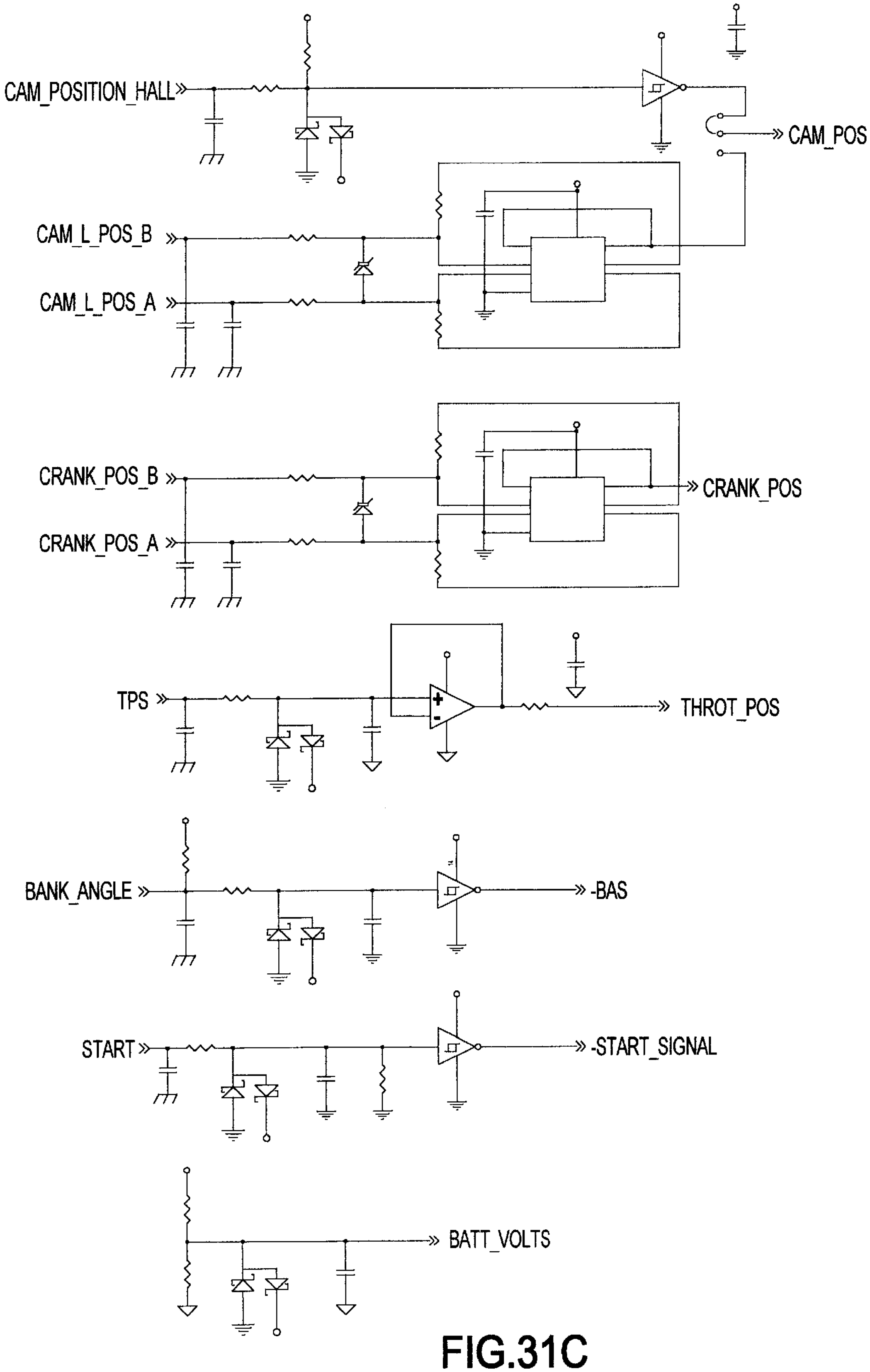
Figure 31D:
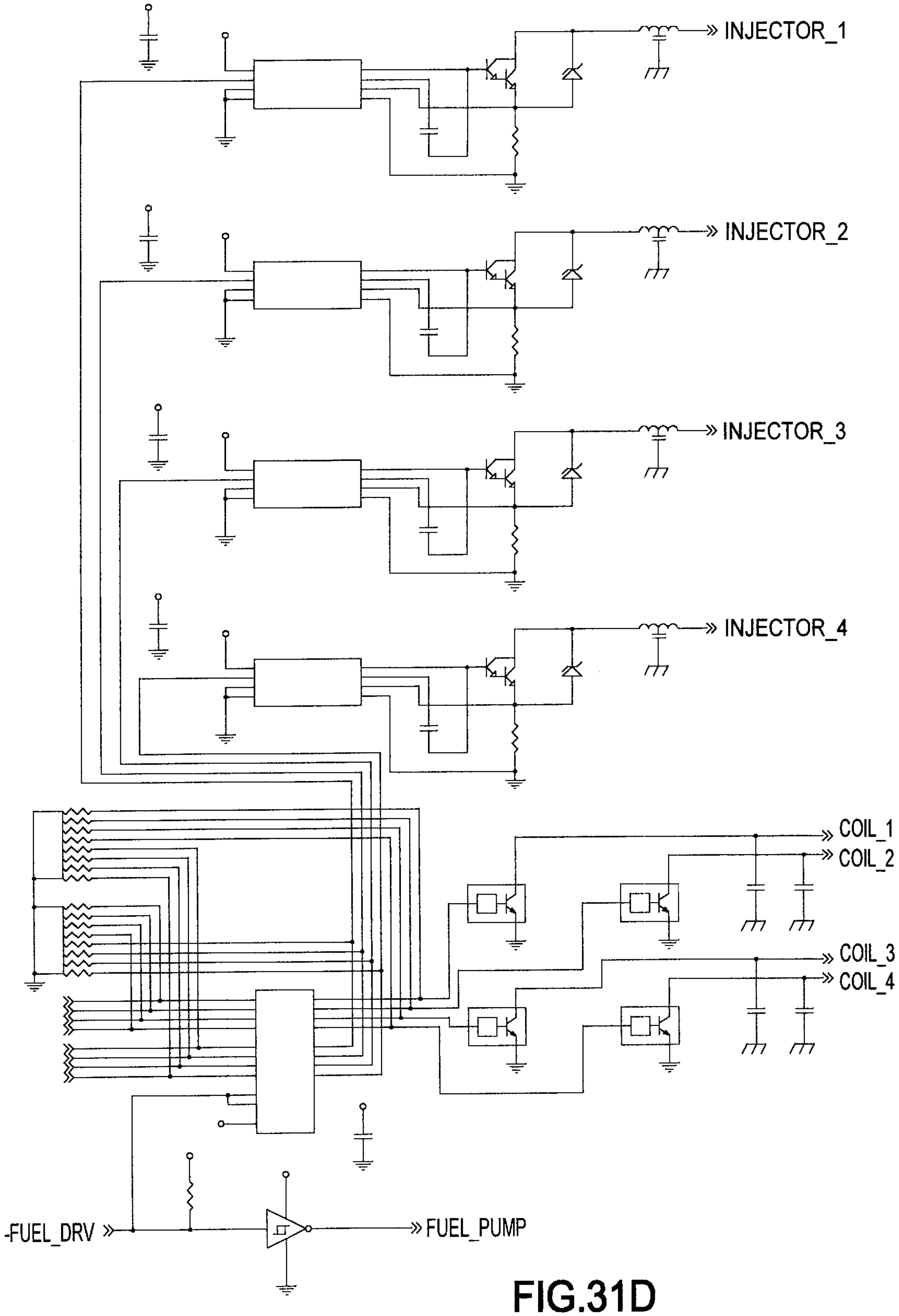
Figure 31E:
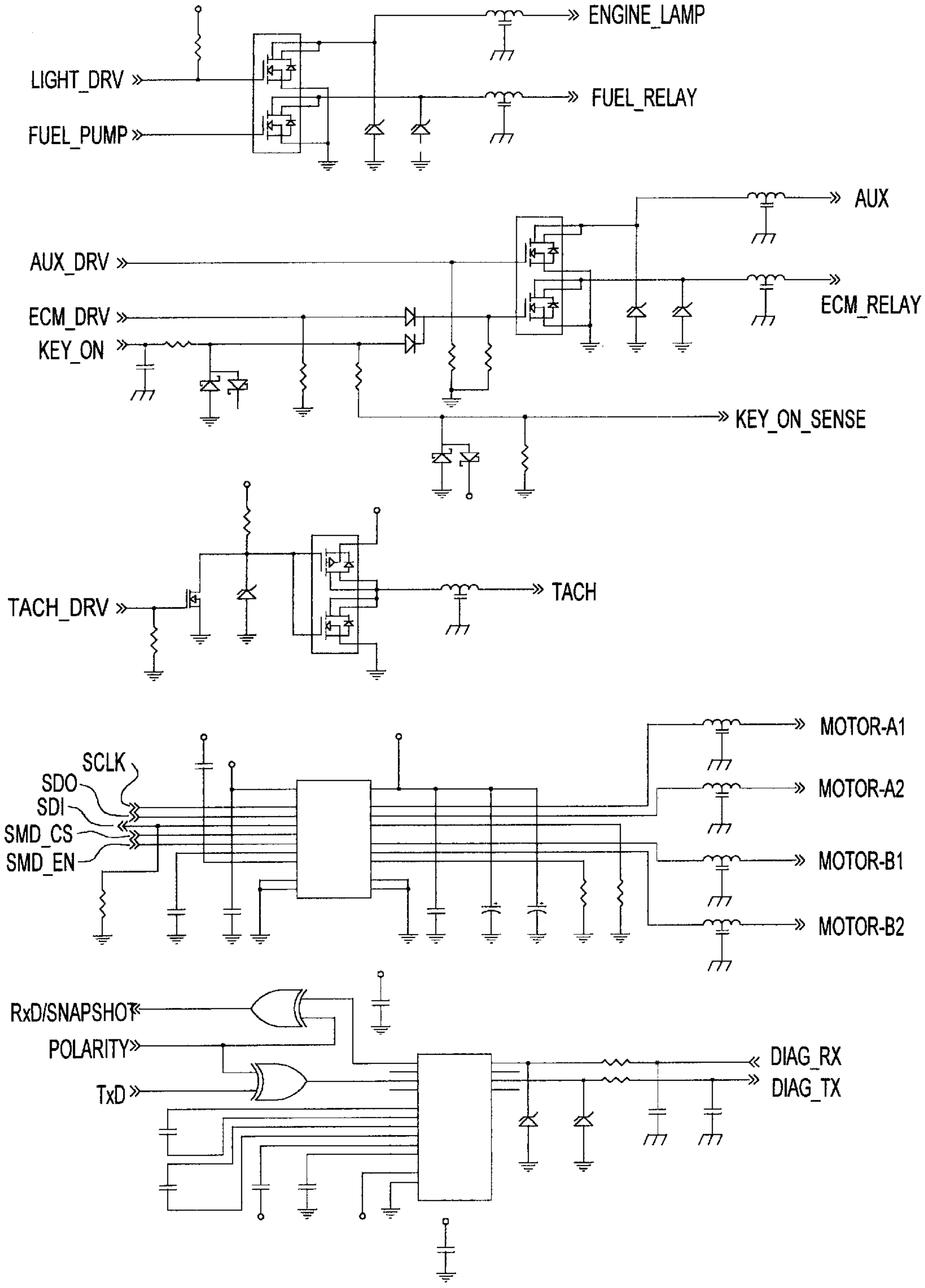
Figure 31F:
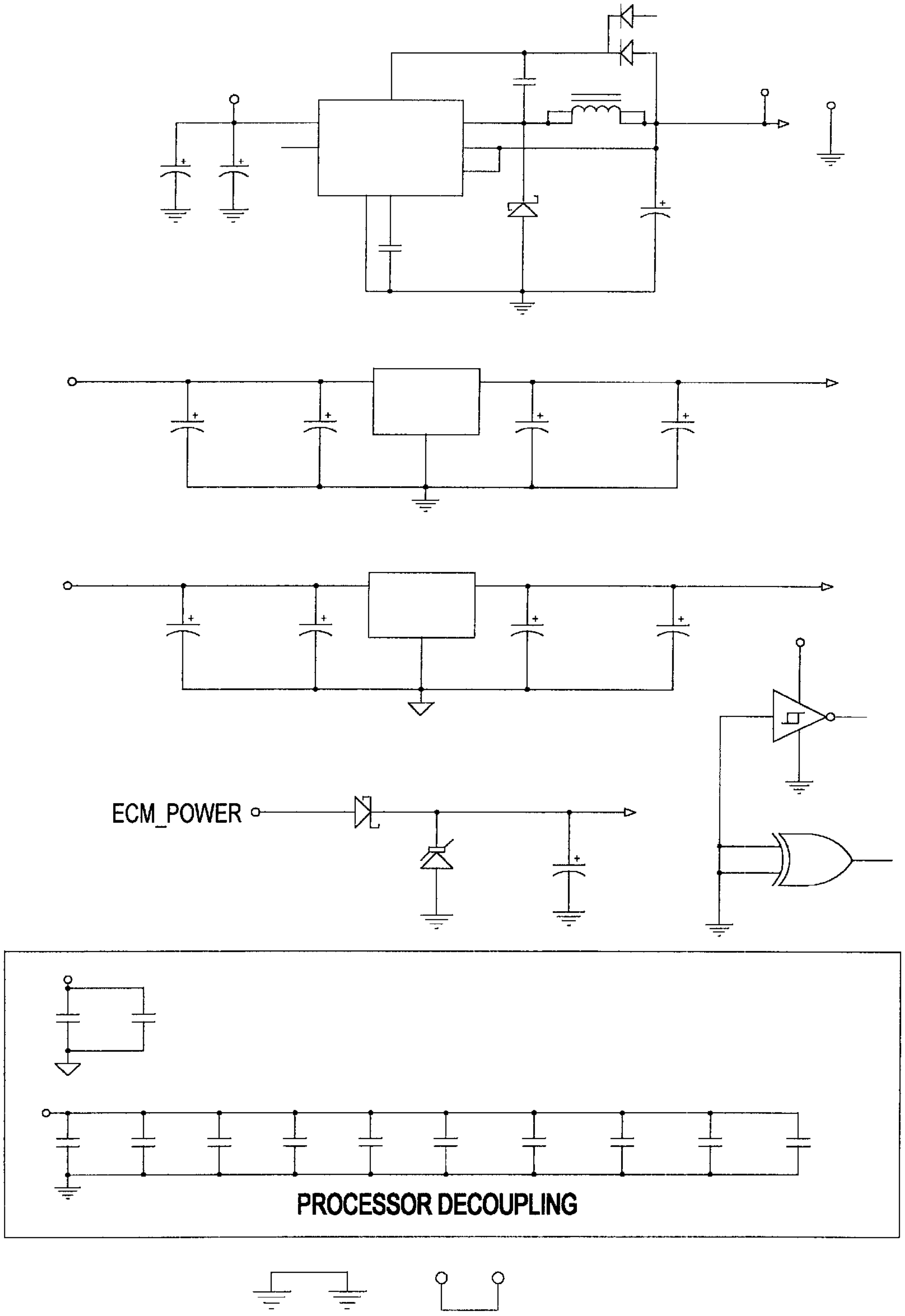

FIG. 31 is the multi page listing of the ECM 1 electrical schematic drawings. The universal jumper adapter 3100 assembly has a external connector 3101 that interfaces to the external wiring harness. Configuration Jumpers 3102 allows the ECM to be configured to work with a variety of engine types. This feature allows the ECM to be inexpensively reconfigured to be installed on many engine types with simple jumper changes. Signals on 3103 are buffered and filtered by the circuitry in FIGS. 31B–F.

FIG. 31A is a schematic drawing of the ECM CPU, the Motorola MC68376 processor 3110. "Virtual tooth" signal is generated on output of 3114 of OR gate 3112. Output of crank position (tooth) sensor is applied to input 3113. Time processor unit (TPU) generates a synthetic tooth 3111 to input of OR gate 3112. A composite signal 3114 containing the virtual tooth and real teeth is applied to the clock input of the TPU. FIGS. 3H–I is a flow chart detailing the operation of the software. Software flow charts detailed in FIGS. 3A–K outlines the ECM 1 source listing. Computer file "mainECM.c" part of program listing appendix this program performs injector duration calculations detailed in flow chart FIG. 30. Computer source file "mainECM.c" communicates with computer 3 (FIG. 1) reading and updating graphic screen parameters (see FIGS. 6, 7, 8, 9, 10, 11, 12, 13, 16, and 21). Computer file "Global.c" contains code for ECM to computer communications. Computer file "Global.h" details global variables used in the ECM computations. Computer file "Ecm.h" defines variables for the "C" complier. Computer file "flasher.c" contains source code for the ECM to perform flash memory 26 (FIG. 1A) utility operations. Computer file "flashld.c" contains source code for the ECM 1 to perform communications with flash memory 26 and time processor 23 (FIG. 1A) operations. Computer file "Reg-376.h" defines processor register variables for the "C" compiler. Computer file "ECM.s" contains assembly source code for the ECM 1 to initialize and operate the internal peripherals such as the TPU 23, A/D converter 27, oscillator 21 and generate the "missing tooth" signal 3111 (FIG. 1A). Computer file "ECMboot.s" part of program listing appendix is the source listing to initialize the interrupts, serial communication ports 35 and copy variables to RAM 25 (FIG. 2). Computer file "Flash-as.s" part of program listing appendix source computes a check sum to verify the flash memory 26 (FIG. 2) was updated correctly. Computer file "Reg-376.s" defines processor register variables for the assembler. Computer file "Ecmboot.prm'part of program listing appendix sets up the starting addresses of the flash memory 26 (FIG. 2) and the processor interrupt vectors. The ECM 1 communicates with computer 3 running machine code compiled from the following Microsoft® Visual Basic source files listed in program listing appendix. Visual basic is offered by way of example and not limitation as the same functionality may be implemented in other languages such as "C". Computer file "ECM.vbp" part of program listing appendix is the source Microsoft® Visual Basic "make" file to compile the final machine executable program. This executable program communicates parameters with the ECM 1 for display, storage and modifications via a series Graphical user interface taught herein.

The following Visual Basic files frmFirmware.frm, frmChokeTable.frm, frmCommunications.frm", "frmComWorking.frm", "frmControlTable.frm", "frmControlTable2.frm", "frmDivision.frm", "frmEngineMonitor.frm", "frmSensorTable.frm", "frmUnitConverter.frm', and "frmViewErrors.frm" define the GUI appearance for the respective windows 2200, 2900, 400, 1500, 2600, 1600, 600, 2100, 2700, 2500, 500 and 1210.

Figure 32:
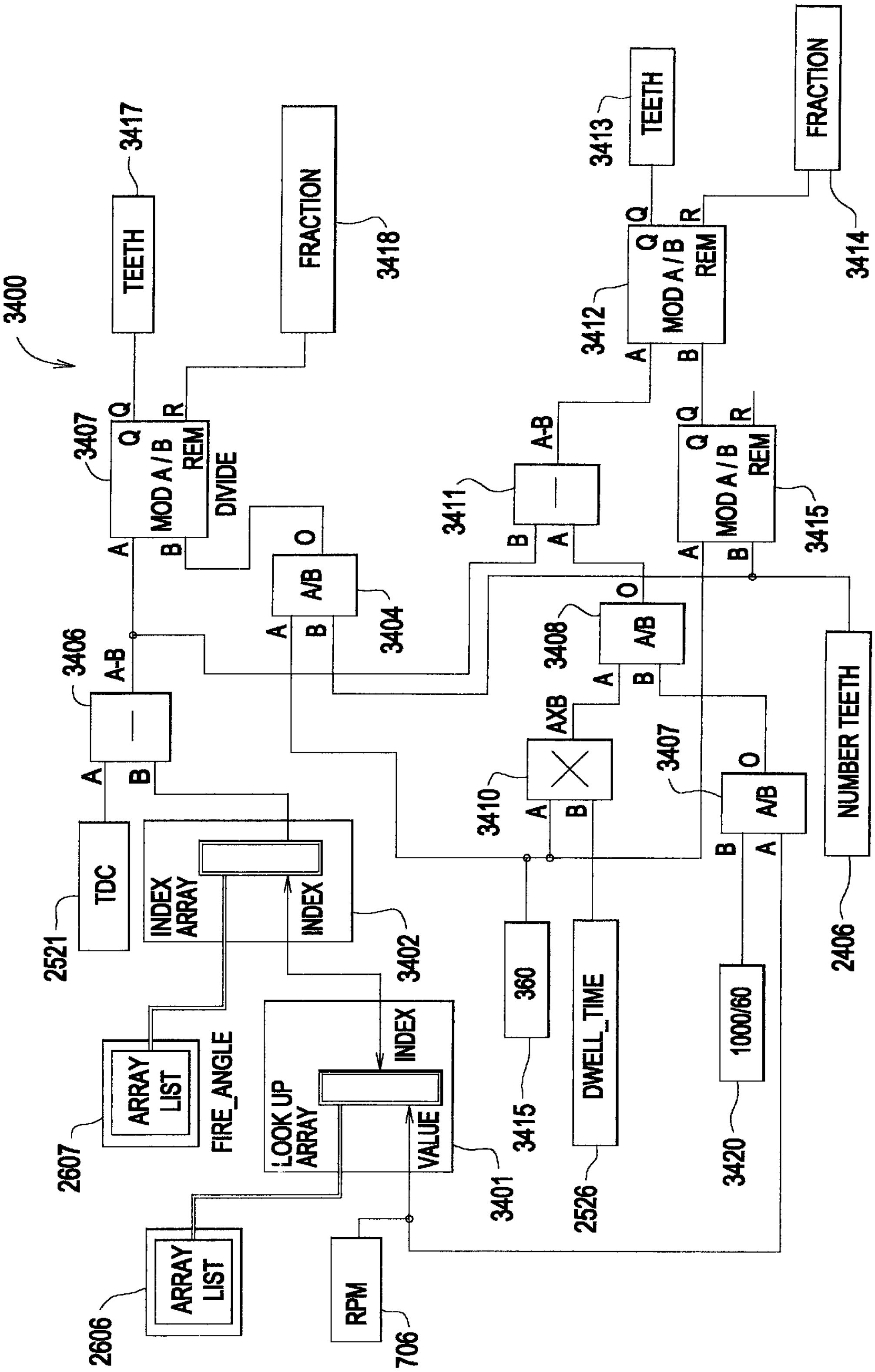
FIG. 32 is a data flow diagram of the spark timing.

Computer file "modVariables.bas" part of program listing appendix is the Microsoft® Visual Basic source listing of the global variables. Computer file "GridEditor.bas" part of program listing appendix is the Microsoft® Visual Basic source listing to perform the editing of the table values 2814 (FIG. 28). Computer file "modConversions.bas" part of program listing appendix is the Microsoft® Visual Basic source listing to perform unit and conversion of the GUI 2700 (FIG. 27) values. Visual Basic source listing "modECMCommunications.bas" performs communications to the ECM 1 via GUI 2100. Visual Basic source listing "modGridSetup.bas" performs updates to numeric values in tables 904, 903, 2606 and 2607. FIG. 32 is a data flow chart 3400 detailing the spark timing. Array look up operation 3401 uses the instantaneous RPM 706 locate the corresponding RPM value in array 2606. The index or location of the match is applied to operation 3402 to index array 2607. The spark-firing angle is the difference 3406 between TDC 2521 and the spark advance angle output of 3402. Division operation 3404 calculates the number of degrees per tooth from constant (360) 3415 and number of teeth 2406. Operation 3417 converts the firing angle in degrees to tooth number 3417 and tooth fraction 3418. Operation 3410 multiplies 3415 and dwell time 2526. Division 3407 calculates the number of milliseconds per revolution of the engine from the ratio of RPM 706 and constant 3420 (1000/60). Division 3408 takes the ratio of 3410 and 3407 to generate the number of degrees of dwell time. Difference 3411 subtracts firing angle 3406 and dwell angle 3408 generating 3416. The ratio of 3416 and the Degrees per tooth 3415 is performed in division operation 3412. Operation 3416 generates the tooth number 3413 and fraction 3414 for transfer to the TPU. Parameters 3413 and 3414 set the starting point for the ignition coil(s). The TPU performs all of its timing calculations in teeth and fractions of a tooth. Parameters 3417, 3418, 3813, and 3414 are passes to TPU 23 for automatic control of the ignition drivers 32. The process is repeated for each spark plug. The ECM 1 configured in 2400. 2500 and 2600 with multiple plugs per combustion chamber or none in the case of many diesel applications.

Summary of Benefits and improvements

Claims:

1) The time processor unit reads the number of teeth and the missing tooth or teeth. The number of teeth is infinitely specifiable in the table section of the user interface, as is the number of missing teeth. The fact that our system works with any number of teeth and any number of missing teeth (interrupt) makes it unique.

2) The thermistor style and model used to monitor engine head temperature is unlimited due to the ability to adjust the parameters in the user interface section. This means that the user can monitor either cylinder head mass temp (in the case of air-cooled engines) or water or oil temp in the case of water or oil cooled engines.

3) The system can be used on any style of internal combustion engine including but, not limited to two cycle, four cycle, and diesel engines.

4) The fuel map (throttle position sample points x rpm sample points) is programmable or changeable real time (while the engine is running). This includes all of the features as seen on the fuel map user interface screen.

5) The fuel map (matrix) is changeable in size from as small as 4×4 to as large as 16×25. The maximum of 16 vertical is for throttle position samples, with the maximum of 25 horizontal being rpm samples.

6) The rpm sample points on the map are infinitely selectable by the user in any degree of definition, not necessarily in a linear format. This allows the programmer (tuner) to choose large rpm spreads for non-critical areas of the map and yet a small rpm resolution in the more difficult or tuning sensitive rpm ranges.

7) The throttle position sensor (TPS) points can, like the rpm points, be infinitely selected in a non-linear fashion if so desired. This means the user can enter the minimum throttle count number on the top row and the wide open throttle count on the bottom row and either scale in a linear manner or generally scale the top 25%–35% of the map with greater user determined resolution.

8) The fuel map features built in editing features which are selectable by clicking on that feature box and then answering the prompts as per the users desires. These features are: 1) insert or delete either a row or column in the matrix 2) increase or decrease (by percentage) either a row or column 3) fuel map multiplication factor reads as 100=a 1 to 1 correlation of what the value of each cell is, 101, for instance=a one percent increase of the whole map (each value of each cell). When adding a row or column it automatically does a straight line fit (value averaging) between the two rows or columns.

9) The ignition map has infinitely definable rpm sample points that are derived by the user. A linear rpm progression can be used if desired. The rpm sample points/ignition degree advance matrix can be as small as four rows, or as large as 25 rows. As with the fuel map a row can be added or deleted. If a row is added it will automatically straight-line average between the rows.

10) The system has a built in run time clock. This time, in hours, minutes and seconds is Stored in RAM and updated only if the engine is running. This timekeeper is viewable Real time from the monitor engine screen it the engine is running or, from the view-snapshot screen if a "picture" is taken and downloaded. Finally, this time feature is viewable from the last 30–60 seconds run time screen an a reversing order in one second intervals.

11) The system can be configured to run 1+ cylinders and this is determined by the data entered by the user on the Table menu. By specifying the number of cylinders 1,2,3, etc. it will then require the user to specify when to fire those fuel injectors and spark plugs in degrees of crankshaft rotation, totaling 720 if 4-stroke, and 360 if 2-stroke.

12) The ignition has the ability of the user to specify the ignition dwell time (also known as coil saturation). This feature is accessible from the Table menu and allows the user to use differing brands or models of ignition coils with different characteristics or required dwell times.

13) The system allows adjustable delay angle (in degrees of crankshaft rotation) in order to synchronize the electronic signal read from the missing tooth as Top Dead Center (TDC) and true mechanical TDC. Mechanical TDC is the piston of cylinder #1 at TDC on the compression stroke.

14) when an electronic stepper motor is used for gold idle throttle opening (virtually all four stroke engines and some two stroke) the counts or amount the stepper opens the butterfly is infinitely programmable by the user. The stepper table is part of the choke table and the stepper feature is based on cylinder head temp.

15) Each fuel injector (can be more than one per cylinder) can either run from the data set in one master fuel map, or can be driven by a different fuel map (matrix) per injector.

16) If all injectors are driven by one master fuel map (matrix) then the fuel map multiplication factor (bottom of fuel map screen and Table) can either be the same per injector or each injector can have it's own multiplication factor.

17) The circuit board and hardware are protected from over voltage, voltage surges, or a crossing of polarity. This protection is done by rather than the use of an inline fuse block as is common.

18) The circuit board and hardware components incorporate state of the art RF filtering by such methods to protect the integrity of the systems signals as well as not to interfere with other exterior unrelated electronics.

19) This system as either a "closed loop" or an "open loop". It is a hybrid system that generally does not function as a closed loop until and if an exhaust gas temperature sensor (EGT) is used. The system becomes closed loop if with an EGT the predetermined temp threshold is exceeded.

20) Either a throttle position sensor (TPS) or a manifold absolute pressure sensor (MAP) can measure how far open the throttle is open. If using a MAP, in the sensor list the user needs to define, in Millbar, closed throttle and full throttle readings.

21) The system is not limited to closed loop, or always open loop. If the optional exhaust gas temperature sensor (EGT) is used, then the system functions as an open loop design until and if the exhaust temp exceeds the predetermined threshold at which time it functions as a closed loop. This is a hybrid system.

22) Each sensor is fully programmable. In the sensor table the user can specify the operating range of each sensor and scale what this means in temp, baro, etc.

23) In the sensor table is a built in calculator to enable the user to correlate temp. PSI, etc. into units of range for the ECM.

24) Within the built in calculator of the sensor table, the user can choose differing units of measure (degrees F., degrees C., or Kelvin) depending on users country of origin.

25) Each sensor has it's own programmable default value that is derived by and programmed by the user. If, for example, the barometric sensor functions between 30.7 inches of mercury and 17.0 inches of mercury and on an average day the sea level inches of mercury is 28.5, then if the baro sensor were to fail the system would proceed based on the default value supplied, 28.5 inches of mercury.

26) All sensors are toggle able. By this we mean that the user can turn on or off many of the sensors from the sensor table. Example: If the user wants to add an EGT, he/she would go into the sensor menu and turn that sensor on and establish operating parameters for that sensor.

27) The exhaust gas temperature (EGT) sensor and corresponding software are unique. Standard in the industry are thermocouples. Thermocouples suffer from many inherent problems such as slow response time, inaccuracy, and poor repeatability. Our system uses a very precise and specially manufactured high temperature thermistor, which is sampled 120 times per sec.

Although the present invention has been described with reference to preferred embodiments, numerous modifications and variations can be made and still the result will come within the scope of the invention. No limitation with respect to the specific embodiments disclosed herein is intended or should be inferred.

We claim:

1. In combination with an internal combustion engine, said engine having a timing gear which communicates angular timing position and RPM signals via a crankshaft sensor to an engine controller, said engine controller having a stored logic engine control system based on a timing gear having a single missing tooth, said engine controller outputting control signals to a fuel injector(s), wherein said timing gear has one or more missing teeth which are used as a reference position on the timing gear, the improvement comprising: a logic circuit simulator in the engine controller which electronically replaces the one or more missing teeth over the standard one missing tooth, thereby enabling the stored logic engine control system to function;

wherein the logic circuit simulator further comprises a crankshaft sensor signal processing module, a counter, a stored memory of tooth count and tooth speed, a simulator logic module and an output signal generator providing an electronic equivalent for the missing tooth (or teeth); and wherein the logic circuit simulator further comprises a user programmable variable module for defining a specified number of missing teeth.

2. The improvement of claim 1, further comprising a standalone command module having a communication link to the engine controller, and having a storage module for the user programmable variable module.

3. In a fuel injection control apparatus for an internal combustion engine, comprising:

a throttle actuator including a throttle valve for adjusting a drawn air amount to be drawn into said internal combustion engine;

an injector for adjusting a fuel injection amount to be injected to said internal combustion engine; various sensors for detecting a driving state of said internal combustion engine; and a control unit for calculating control amounts of said throttle actuator and said injector in accordance with said driving state; wherein said various sensors include:

a throttle opening degree sensor for detecting an opening amount of said throttle valve as a throttle opening degree;

a throttle position opening degree sensor for detecting an opening amount of a throttle as a throttle opening degree; and a crank angle sensor for detecting a crank angle signal indicative of a crank angle reference position for every cylinder;

said control unit calculates a target throttle opening degree corresponding to the control amount of said throttle actuator based on said throttle opening degree, and includes:

a throttle control apparatus for controlling an opening degree of said throttle valve toward said target throttle opening degree; engine revolution number detector for calculating the engine revolution number based on said crank angle signal; and an injector control apparatus for calculating a target fuel injection amount corresponding to the control amount of said injector based on said engine revolution number and said throttle opening degree, and for controlling the fuel injection amount of said injector toward said target fuel injection amount;

an improvement comprising:

a user programmable default module to continue engine control in an event of a sensor failure.

4. In a fuel injection control apparatus for an internal combustion engine, comprising:

a throttle actuator including a throttle valve for adjusting a drawn air amount to be drawn into said internal combustion engine;

an injector for adjusting a fuel injection amount to be injected to said internal combustion engine; various sensors for detecting a driving state of said internal combustion engine; and a control unit for calculating control amounts of said throttle actuator and said injector in accordance with said driving state; wherein said various sensors include:

a throttle opening degree sensor for detecting an opening amount of said throttle valve as a throttle opening degree;

a crank angle sensor for detecting a crank angle signal indicative of a crank angle reference position for every cylinder;

said control unit calculates a target throttle opening degree corresponding to the control amount of said throttle actuator based on said throttle opening degree, and includes:

a throttle control apparatus for controlling an opening degree of said throttle valve toward said target throttle opening degree; engine revolution number detector for calculating the engine revolution number based on said crank angle signal; and an injector control apparatus for calculating a target fuel injection amount corresponding to the control amount of said injector based on said engine revolution number and said throttle opening degree, and for controlling the fuel injection amount of said injector toward said target fuel injection amount;

an improvement comprising:

a user programmable table of sensor types to permit a change of sensor on the engine.

5. In a fuel injection control apparatus for an internal combustion engine, comprising:

a throttle actuator including a throttle valve for adjusting a drawn air amount to be drawn into said internal combustion engine;

an injector for adjusting a fuel injection amount to be injected to said internal combustion engine; various sensors for detecting a driving state of said internal combustion engine; and a control unit for calculating control amounts of said throttle actuator and said injector in accordance with said driving state; wherein said various sensors include:

a throttle opening degree sensor for detecting an opening amount of said throttle valve as a throttle opening degree;

a throttle position opening degree sensor for detecting an opening amount of a throttle as a throttle opening degree; and a crank angle sensor for detecting a crank angle signal indicative of a crank angle reference position for every cylinder;

said control unit calculates a target throttle opening degree corresponding to the control amount of said throttle actuator based on said throttle opening degree, and includes:

a throttle control apparatus for controlling an opening degree of said throttle valve toward said target throttle opening degree; engine revolution number detector for calculating the engine revolution number based on said crank angle signal; and an injector control apparatus for calculating a target fuel injection amount corresponding to the control amount of said injector based on said engine revolution number and said throttle opening degree, and for controlling the fuel injection amount of said injector toward said target fuel injection amount;

an improvement comprising:

a user programmable calibration module to permit precise calibration of sensor(s).

6. An engine control apparatus comprising:

a user programmable default module to continue engine control in an event of a sensor failure.

7. An engine control apparatus comprising:

a user programmable table of sensor types to permit a change of sensor on an engine.

8. The apparatus of claim 7, wherein the sensor type is an engine temperature sensor(s) ranging from cylinder head sensors to engine coolant sensors to crankshaft oil sensors.

9. The apparatus of claim 7, wherein the engine control apparatus further comprises a remote command module having a user interface and a communication link to an on-board computer.

10. An engine control apparatus comprising:

a user programmable calibration module to permit a precise calibration of a sensor.

11. An internal combustion engine controller comprising:

a user programmable module having variable parameters to control a plurality of different engines.

12. The apparatus of claim 11, wherein the variable parameters include a number of crankshaft teeth, a number of crankshaft missing teeth, a number of cylinder, a crankshaft position sensor type, a top dead center angle for each cylinder, a fuel injector firing angle for each cylinder an ignition coil dwell time, a fuel injector opening pulse width, a throttle position and rpm fuel map, and an engine temperature sensor type(s).

13. The apparatus of claim 11, wherein the user programmable module further comprises a remote command module having a user interface, a storage media, a communication link to an on-board engine controller, an on-board engine controller having a storage media, a processor and an input and an output module.

14. An engine control apparatus comprising:

a remote command module having a programmable module for parameters including engine sensor types, engine sensor calibration adjustments, engine timing adjustments, fuel injector pulse signals; and throttle position and rpm indexed fuel map parameters.

15. The apparatus of claim 14, wherein the indexed fuel map further comprises a variable rpm range selection and spacing and a variable throttle position range selection and spacing.

16. The apparatus of claim 15, wherein the indexed fuel maps further comprise a table driven selection of preprogrammed parameters.

17. The apparatus of claim 14 wherein the indexed fuel map further comprises a scaled factor module; thereby enabling a row and/or column of a fuel map table to be modified with a fixed percent change.

18. An engine control apparatus comprising:

a user programmable ignition timing table having a user programmable dwell time, thereby enabling the user to upgrade an engine ignition coil to faster dwell times.

19. The apparatus of claim 18, wherein the engine control apparatus further comprises a remote command module having a user interface, and a communication link to an on-board computer.

20. The apparatus of claim 19, wherein the remote command module further comprises a user programmable fuel map.

21. The apparatus of claim 20, wherein the remote command module further comprises a user programmable module for parameters including engine sensor types, engine sensor calibration adjustments, engine timing adjustments, and fuel injector pulse signals.

22. The apparatus of claim 21, wherein the remote command module further comprises a user programmable choke table having engine temperature variable, mixture enrichment percentage and throttle setting(s).

23. The apparatus of claim 18, wherein the ignition-timing table further comprises a variable rpm range selection and spacing, thereby enabling a global change of multiple parameters by a fixed percent change.

24. The apparatus of claim 23, wherein the ignition-timing table further comprises a table selection of preprogrammed parameters.

25. The apparatus of claim 18, wherein the ignition-timing table further comprises an individualized table for a spark plug.

26. An engine control apparatus comprising:

a user programmable choke table having an engine temperature input;

an engine speed controller; and wherein a user is enabled to program an engine idle speed during warm-up.

27. The apparatus of claim 26, wherein the engine control apparatus further comprises a remote commend module having a user interface, and a communication link to an on-board computer.

28. The apparatus of claim 17, wherein the remote command module further comprises a programmable fuel map.

29. The apparatus of claim 26, wherein the remote command module further comprises a programmable ignition-timing table.

30. The apparatus of claim 26, wherein the user programmable choke table further comprises an engine temperature variable, mixture enrichment percentage, and throttle setting(s).

31. An engine control apparatus comprising:

a user programmable top dead center calibration module to provide an entry of angular location for a missing tooth variable into an engine controller.

32. The apparatus of claim 31, wherein the engine control apparatus further comprises a remote command module having a user interface, and a communication link to an on-board computer.

33. The apparatus of claim 32, wherein the remote command module further comprises a user programmable fuel map.

34. The apparatus of claim 33, wherein the remote command module further comprises a user programmable ignition-timing table.

35. The apparatus of claim 34, wherein the remote command module further comprises a user programmable dwell timetable.

36. The apparatus of claim 34, wherein the remote command module further comprises a user programmable module for parameters including engine sensor types, engine sensor calibration adjustments, engine timing adjustments, and fuel injector pulse signals.

37. The apparatus of claim 34, wherein the user programmable command module further comprises a user programmable choke table.

38. An engine control apparatus comprising:

a user programmable engine temperature and throttle position module; and wherein a user can program a throttle position based on an engine temperature output signal.

39. The apparatus of claim 38, wherein the engine control apparatus further comprises a remote command module having a user interface, and a communication link to an on-board computer.

40. The apparatus of claim 39, wherein the remote command module further comprises a user programmable fuel map.

41. The apparatus of claim 40, wherein the remote command module further comprises a user programmable ignition-timing table.

42. The apparatus of claim 41, wherein the remote command module further comprises a user programmable dwell timetable.

43. The apparatus of claim 41, wherein the remote command module further comprises a user programmable module for parameters including engine sensor types, engine sensor calibration adjustments, engine timing adjustments, and fuel injector pulse signals.

44. The apparatus of claim 41, wherein the user programmable command module further comprises a user programmable choke table.

45. An engine control apparatus comprising:

a user programmable mechanical throttle position versus electronic throttle position module; and wherein a rate of engine acceleration is adjusted via sensing a rate of change of a mechanical throttle position and altering the electronic throttle position as desired, thereby allowing for a slower acceleration for a novice rider.

46. The apparatus of claim 45, wherein the engine control apparatus further comprises a remote command module having a user interface, and a communication link to an on-board computer.

47. The apparatus of claim 46, wherein the remote command module further comprises a user programmable fuel map.

48. The apparatus of claim 46, wherein the remote command module further comprises a user programmable ignition-timing table.

49. The apparatus of claim 48, wherein the remote command module further comprises a user programmable dwell timetable.

50. The apparatus of claim 48, wherein the remote command module further comprises a user programmable module for parameters including engine sensor types, engine sensor calibration adjustments, engine timing adjustments, and fuel injector pulse signals.

51. The apparatus of claim 48, wherein the user programmable command module further comprises a user programmable choke table.

52. An engine control apparatus comprising:

a user programmable individualized fuel injector scaling parameter module; and wherein an individual fuel injector setting can be modified by the user to account for mechanical variations in the engine.

53. An engine control apparatus comprising:

an exhaust gas temperature sensor and a user programmable closed loop controller module for maximum engine temperature control.

54. An engine control apparatus comprising:

an on-board computer having stored logic to control an ignition and a fuel injector system;

a remote command module having a user interface and a stored logic module to receive user definable parameters to transmit to the on-board computer via a communications link;

wherein the user definable parameters include a fuel map, an ignition-timing table and a fuel injector pulse signal table;

wherein the remote command module further comprises a computer having a keyboard, a screen, a processor, a data storage media and an interactive engine parameter change routine; and wherein the remote command module further comprises a sensor selection and calibration module, thereby enabling the user to choose different makes of sensors for the engine.

55. An engine control apparatus comprising:

a setup routine for operating two stroke and four stroke gas engines.

56. The apparatus of claim 55, wherein the setup routine further comprises a diesel engine setup.

* * * * *